(12) United States Patent
Stoller et al.

(10) Patent No.: US 11,558,997 B2
(45) Date of Patent: Jan. 24, 2023

(54) IMPLEMENTS AND APPLICATION UNITS HAVING A FLUID APPLICATOR WITH NOZZLES FOR PLACEMENT OF APPLICATIONS WITH RESPECT TO AGRICULTURAL PLANTS OF AGRICULTURAL FIELDS

(71) Applicant: PRECISION PLANTING LLC, Tremont, IL (US)

(72) Inventors: Jason Stoller, Eureka, IL (US); Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 98 days.

(21) Appl. No.: 16/318,663

(22) PCT Filed: Jul. 21, 2017

(86) PCT No.: PCT/US2017/043344
§ 371 (c)(1),
(2) Date: Jan. 17, 2019

(87) PCT Pub. No.: WO2018/017987
PCT Pub. Date: Jan. 25, 2018

(65) Prior Publication Data
US 2019/0246556 A1    Aug. 15, 2019

Related U.S. Application Data

(63) Continuation-in-part of application No. PCT/US2017/028187, filed on Apr. 18, 2017, and a
(Continued)

(51) Int. Cl.
*A01C 23/00* (2006.01)
*A01M 7/00* (2006.01)
(Continued)

(52) U.S. Cl.
CPC .......... *A01C 23/006* (2013.01); *A01C 23/007* (2013.01); *A01C 23/025* (2013.01);
(Continued)

(58) Field of Classification Search
CPC ... A01C 23/006; A01C 23/007; A01C 23/025; A01C 23/047; A01C 7/06; A01C 23/023;
(Continued)

(56) References Cited

U.S. PATENT DOCUMENTS

| 559,042 A | 4/1896 | Potter |
|---|---|---|
| 1,076,075 A | 10/1913 | Steele |

(Continued)

FOREIGN PATENT DOCUMENTS

| EP | 2644016 A1 | 10/2013 |
|---|---|---|
| EP | 3366134 A1 | 8/2018 |

(Continued)

OTHER PUBLICATIONS

European Patent Office, Search Report for related European Application No. 17786492.3, dated Dec. 13, 2019.
(Continued)

*Primary Examiner* — Christopher S Kim

(57) ABSTRACT

Described herein are implements and applicators for placement of fluid applications with respect to agricultural plants of agricultural fields. In one embodiment, a fluid applicator includes at least one applicator arm, a first nozzle disposed to apply fluid to a rhizosphere of the plants, and a second nozzle disposed to apply fluid between the row of plants.

24 Claims, 49 Drawing Sheets

Related U.S. Application Data continuation-in-part of application No. PCT/US2017/028186, filed on Apr. 18, 2017, and a continuation-in-part of application No. PCT/US2017/028190, filed on Apr. 18, 2017, said application No. PCT/US2017/028186 is a continuation-in-part of application No. PCT/US2017/028188, filed on Apr. 18, 2017, said application No. PCT/US2017/043344 is a continuation-in-part of application No. PCT/US2017/028189, filed on Apr. 28, 2017.

(60) Provisional application No. 62/442,895, filed on Jan. 5, 2017, provisional application No. 62/365,824, filed on Jul. 22, 2016.

(51) Int. Cl.
  *A01C 23/02* (2006.01)
  *A01M 21/04* (2006.01)
  *B05B 1/16* (2006.01)
  *A01C 23/04* (2006.01)
  *A01C 7/06* (2006.01)
  *A01B 79/00* (2006.01)

(52) U.S. Cl.
  CPC ........... *A01C 23/047* (2013.01); *A01M 7/006* (2013.01); *A01M 7/0042* (2013.01); *A01M 7/0075* (2013.01); *A01M 7/0089* (2013.01); *A01M 21/043* (2013.01); *B05B 1/1636* (2013.01); *A01B 79/005* (2013.01); *A01C 7/06* (2013.01); *A01C 23/023* (2013.01)

(58) Field of Classification Search
  CPC .. A01M 7/0042; A01M 7/006; A01M 7/0075; A01M 7/0089; A01M 21/043; B05B 1/1636; A01B 79/005
  USPC ........ 239/159, 160, 161, 163, 164, 166–168
  See application file for complete search history.

(56) References Cited

U.S. PATENT DOCUMENTS

| | | |
|---|---|---|
| 1,348,038 A | 7/1920 | Neumeyer |
| 1,526,642 A | 8/1921 | Nissley |
| 2,301,213 A | 9/1940 | Kang |
| 2,509,627 A | 5/1950 | Bickerton et al. |
| 2,706,133 A | 4/1955 | North, Jr. et al. |
| 3,117,725 A | 1/1964 | Palmer |
| 3,147,568 A | 9/1964 | Inhofer |
| 3,179,194 A | 4/1965 | Hunt |
| 3,377,028 A | 4/1968 | Bruggeman |
| 3,515,349 A | 6/1970 | Mecklin et al. |
| 3,711,029 A | 1/1973 | Bartlett |
| 3,724,760 A | 4/1973 | Smith |
| 4,184,551 A | 1/1980 | Orthman |
| 4,349,988 A | 9/1982 | Kotula et al. |
| 4,361,278 A | 11/1982 | Finley |
| 4,382,555 A | 5/1983 | Ucinhazska et al. |
| 4,439,948 A * | 4/1984 | Brown ................ A01M 7/0042 239/159 |
| 4,521,988 A | 6/1985 | Thacker |
| 4,538,532 A | 9/1985 | Coker |
| 4,574,715 A | 3/1986 | Dietrich, Sr. et al. |
| 4,650,124 A | 3/1987 | Connaughty et al. |
| 4,736,888 A | 4/1988 | Fasnacht |
| 4,842,195 A | 6/1989 | Koll et al. |
| 4,905,903 A | 3/1990 | Katzer |
| 4,930,581 A | 6/1990 | Fleischer et al. |
| 4,970,973 A | 11/1990 | Lyle et al. |
| 4,995,325 A | 2/1991 | Herriau et al. |
| 5,421,514 A | 6/1995 | McKenry |
| 5,499,685 A | 3/1996 | Downing, Jr. |
| 5,507,435 A | 4/1996 | Benest |
| 5,516,044 A | 5/1996 | Thorstensson |
| 5,526,982 A | 6/1996 | McKenzie |
| 5,566,628 A | 10/1996 | Schoenhofer |
| 5,613,635 A | 3/1997 | Harden et al. |
| 5,775,595 A | 7/1998 | Knodel et al. |
| 5,852,982 A | 12/1998 | Peter |
| 5,890,445 A | 4/1999 | Ridgley |
| 5,921,019 A | 7/1999 | Baek |
| 5,971,604 A | 10/1999 | Linga et al. |
| 6,036,057 A | 3/2000 | Poutiatine |
| 6,126,088 A | 10/2000 | Wilger et al. |
| 6,343,749 B1 | 2/2002 | Thom |
| 8,910,581 B2 | 12/2014 | Bassett |
| 9,167,745 B2 | 10/2015 | Muff |
| 2002/0189160 A1 | 12/2002 | Breitner |
| 2003/0019949 A1 | 1/2003 | Solie et al. |
| 2005/0011652 A1 | 1/2005 | Hua |
| 2005/0051068 A1 | 3/2005 | Swanson |
| 2005/0211802 A1 | 9/2005 | Newton |
| 2006/0118653 A1 | 6/2006 | Shivak |
| 2006/0283610 A1 | 12/2006 | Sugano et al. |
| 2007/0199487 A1 | 8/2007 | McLeod |
| 2009/0206180 A1 | 8/2009 | Wilson |
| 2011/0036008 A1 | 2/2011 | Hashimoto et al. |
| 2012/0167809 A1 | 7/2012 | Bassett |
| 2012/0247378 A1 | 10/2012 | Knobloch et al. |
| 2012/0255474 A1 | 10/2012 | Sauder et al. |
| 2013/0043326 A1 | 2/2013 | Muff |
| 2013/0074747 A1 | 3/2013 | Schaffert et al. |
| 2014/0026792 A1 | 1/2014 | Bassett |
| 2014/0048297 A1 | 2/2014 | Bassett |
| 2014/0361093 A1 | 12/2014 | Alig et al. |
| 2015/0156951 A1 | 6/2015 | Henry et al. |
| 2016/0084298 A1 | 3/2016 | Schaffert et al. |
| 2016/0120117 A1 | 5/2016 | Lawrence et al. |
| 2017/0265379 A1 | 9/2017 | Moore et al. |

FOREIGN PATENT DOCUMENTS

| | | |
|---|---|---|
| GB | 949583 A | 2/1964 |
| GB | 1049753 A | 11/1966 |
| GB | 1193963 A | 6/1970 |
| GB | 2019701 A | 11/1979 |
| WO | 2009102277 A1 | 8/2009 |
| WO | 2012094116 A1 | 7/2012 |
| WO | 2015154027 A1 | 10/2015 |

OTHER PUBLICATIONS

European Patent Office, Search Report for related European Application No. 17786491.5, dated Dec. 13, 2019.
European Patent Office, Search Report for related European Application No. 17786493.1, dated Dec. 13, 2019.
European Patent Office, Search Report for related European Application No. 17786494.9, dated Dec. 13, 2019.
European Patent Office, Search Report for related European Application No. 17786495.6 dated Dec. 13, 2019.
European Patent Office, Search Report for related European Application No. 17831984.4 dated Mar. 19, 2020.
European Patent Office, Search Report for related European Application No. 17831978.6 dated Mar. 20, 2020.
International Search Report and Written Opinion for PCT Application No. PCT/US17/28187, dated Jul. 18, 2017, 13 pages.
International Search Report and Written Opinion for PCT Application No. PCT/US17/28186, dated Jul. 18, 2017, 18 pages.
International Search Report and Written Opinion for PCT Application No. PCT/US17/28188, dated Sep. 5, 2017, 15 pages.
International Search Report and Written Opinion for PCT Application No. PCT/US17/28189, dated Sep. 5, 2017, 11 pages.
International Search Report and Written Opinion for PCT Application No. PCT/US17/28190, dated Jul. 3, 2017, 12 pages.
International Search Report and Written Opinion for PCT Application No. PCT/US17/043357, dated Oct. 20, 2017, 10 pages.
International Search Report and Written Opinion for PCT Application No. PCT/US17/043344, dated Nov. 28, 2017, 10 pages.

(56) References Cited

OTHER PUBLICATIONS

International Search Report and Written Opinion for PCT Application No. PCT/US17/043345, dated Sep. 29, 2017, 16 pages.
Transmittal of International Preliminary Report on Patentability for PCT Application No. PCT/US2017/043344, dated Oct. 2, 2018, 19 pages.
USPTO-PCT Receiving Office, IPRP for related International Application No. PCT/US2017/043344, dated Aug. 22, 2018.
USPTO-PCT Receiving Office, IPRP for related International Application No. PCT/US2017/043345, dated Jan. 22, 2020.
USPTO-PCT Receiving Office, IPRP for related International Application No. PCT/US2017/043357, dated Apr. 8, 2019.

* cited by examiner

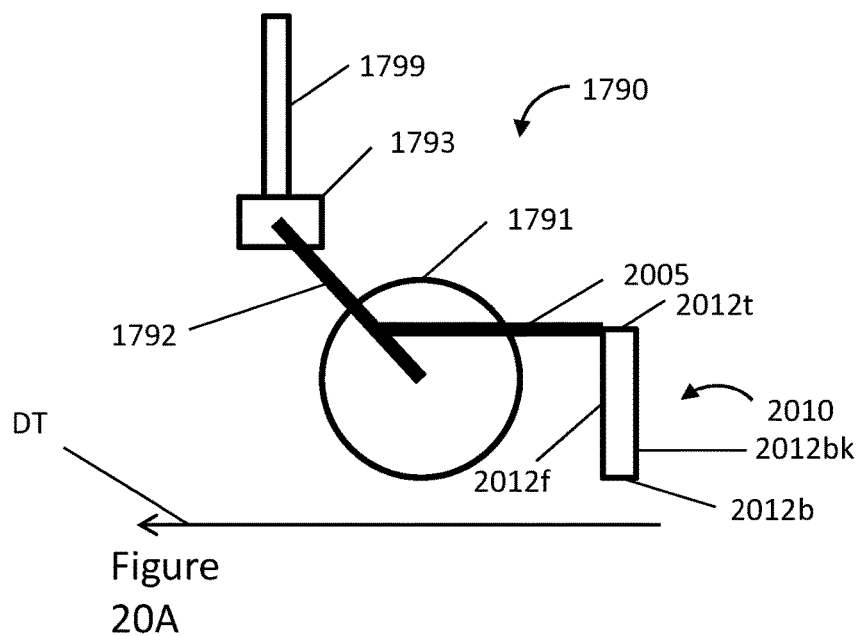
Figure 20A
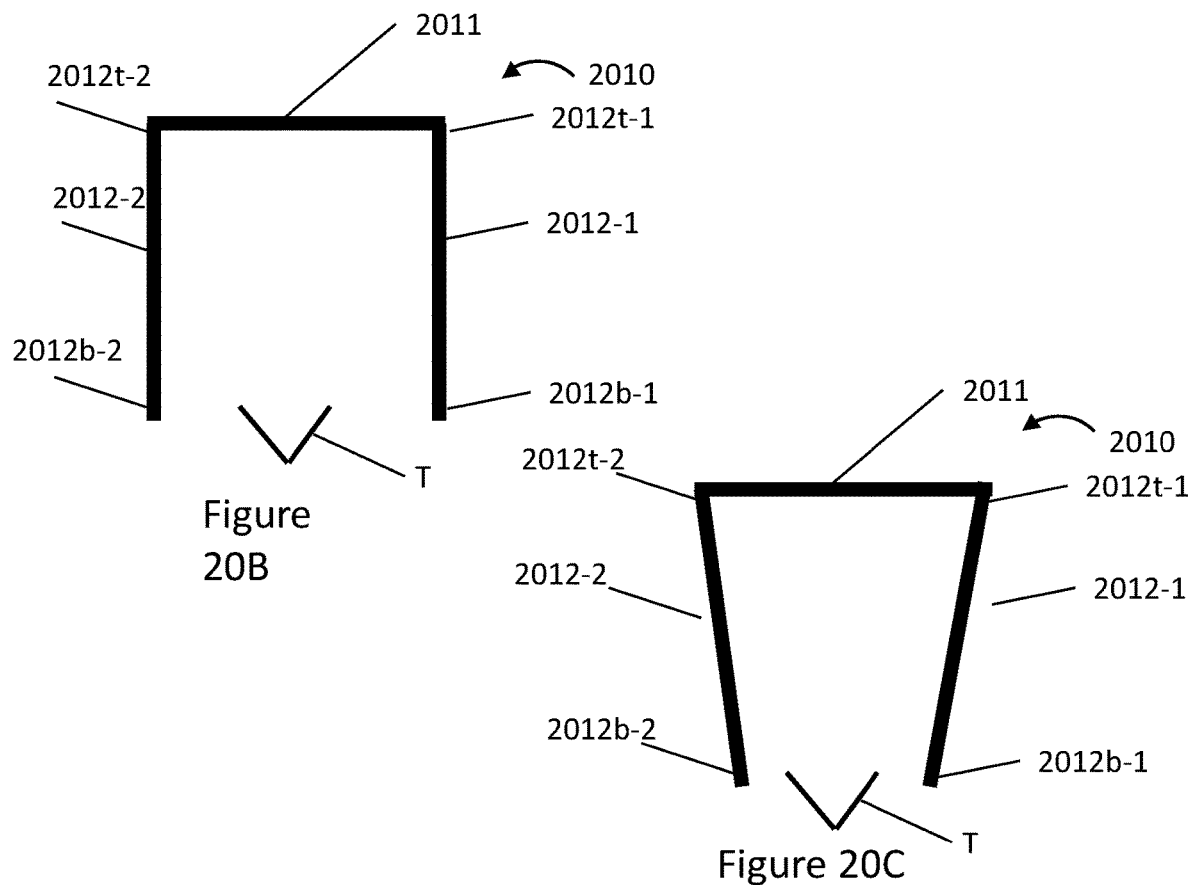
Figure 20B
Figure 20C

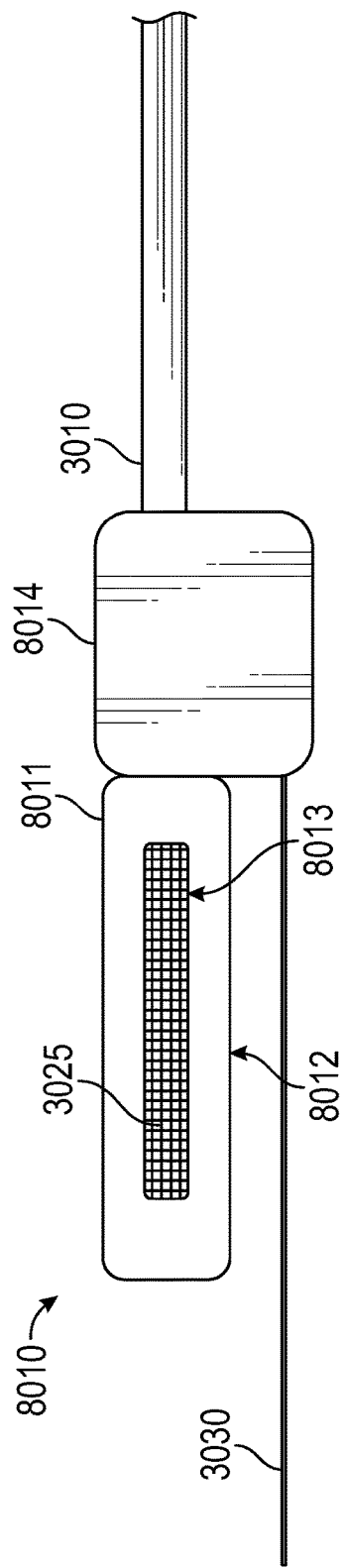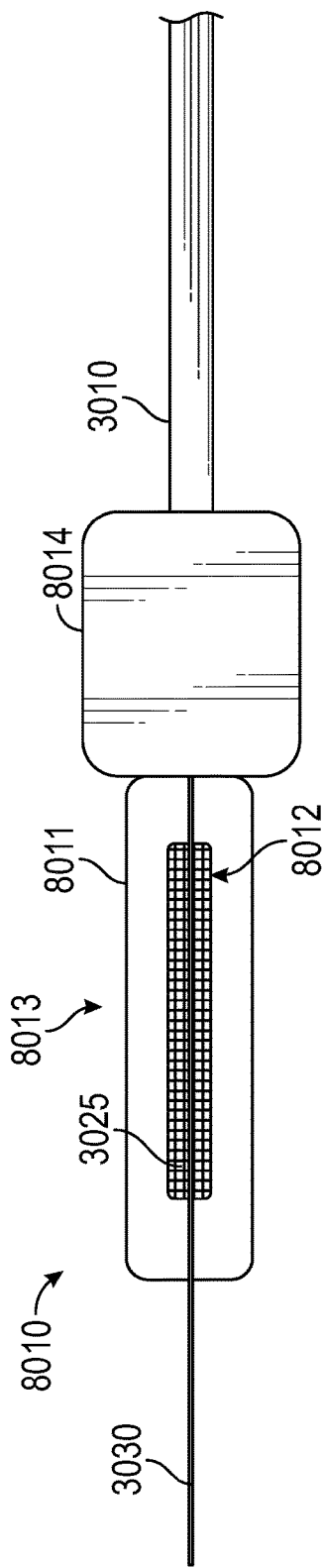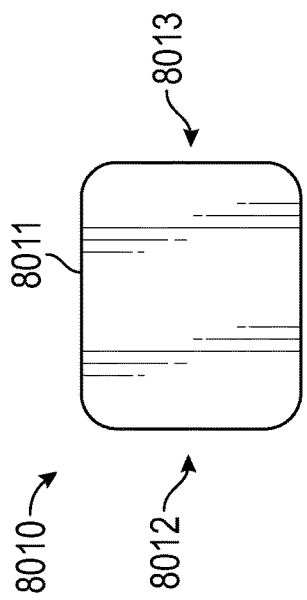

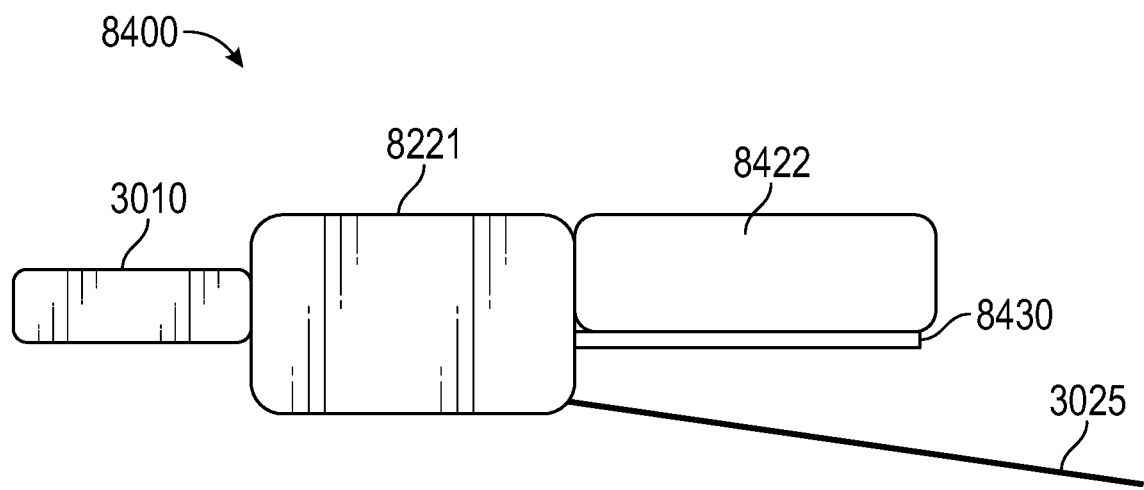
FIG. 39A
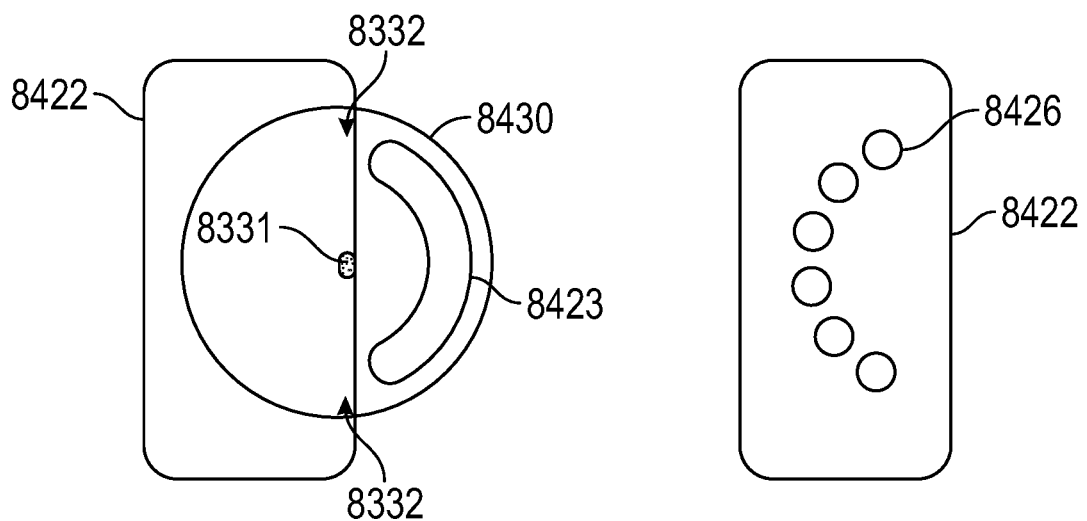
FIG. 39B
FIG. 39C and not by way of limitation, in the figures of the accompanying drawings and in which:

IMPLEMENTS AND APPLICATION UNITS HAVING A FLUID APPLICATOR WITH NOZZLES FOR PLACEMENT OF APPLICATIONS WITH RESPECT TO AGRICULTURAL PLANTS OF AGRICULTURAL FIELDS

RELATED APPLICATIONS

This application claims the benefit of U.S. Provisional Application No. 62/365,824, filed on Jul. 22, 2016 entitled: IMPLEMENTS AND APPLICATION UNITS FOR PLACEMENT OF APPLICATIONS WITH RESPECT TO AGRICULTURAL PLANTS OF AGRICULTURAL FIELDS; U.S. Provisional Application No. 62/442,895, filed on Jan. 5, 2017 entitled: IMPLEMENTS AND APPLICATION UNITS FOR PLACEMENT OF APPLICATIONS WITH RESPECT TO AGRICULTURAL PLANTS OF AGRICULTURAL FIELDS; and this application is a continuation-in-part of PCT Application No. PCT/US2017/028187, filed on Apr. 18, 2017, entitled: IMPLEMENTS AND APPLICATION UNITS FOR PLACEMENT OF APPLICATIONS WITH RESPECT TO AGRICULTURAL PLANTS OF AGRICULTURAL FIELDS; PCT Application No. PCT/US2017/028186, filed on Apr. 18, 2017, entitled: IMPLEMENTS AND APPLICATION UNITS TO ACTUATE AT LEAST ONE APPLICATOR ARM FOR PLACEMENT OF APPLICATIONS WITH RESPECT TO AGRICULTURAL PLANTS OF AGRICULTURAL FIELDS; PCT Application No. PCT/US2017/028188, filed on Apr. 18, 2017, entitled: IMPLEMENTS AND APPLICATION UNITS HAVING AT LEAST ONE APPLICATION MEMBER FOR PLACEMENT OF APPLICATIONS WITH RESPECT TO AGRICULTURAL PLANTS OF AGRICULTURAL FIELDS; PCT Application No. PCT/US2017/028189, filed on Apr. 18, 2017, entitled: IMPLEMENTS AND APPLICATION UNITS HAVING A TRENCH CLOSER FOR CLOSING OF A TRENCH DURING APPLICATIONS WITH RESPECT TO AGRICULTURAL PLANTS OF AGRICULTURAL FIELDS; PCT Application No. PCT/US2017/028190, filed on Apr. 18, 2017, entitled: IMPLEMENTS AND APPLICATION UNITS HAVING AT LEAST ONE FLEXIBLE OR PIVOTING APPLICATION MEMBER FOR PLACEMENT OF APPLICATIONS WITH RESPECT TO AGRICULTURAL PLANTS OF AGRICULTURAL FIELDS, the entire contents of which are hereby incorporated herein by reference.

TECHNICAL FIELD

Embodiments of the present disclosure relate to implements and application units for placement of fluid applications with respect to agricultural plants of agricultural fields.

BACKGROUND

Planters are used for planting seeds of crops (e.g., corn, soybeans) in a field. Planters may also be used for applying a fluid application (e.g., fertilizers, chemicals) to the soil or crops. Other fluid applicators include sprayers and sidedress bars. Applying the fluid application between rows can be challenging in terms of controlling this application for the different row units.

BRIEF DESCRIPTION OF THE DRAWINGS

The present disclosure is illustrated by way of example, and not by way of limitation, in the figures of the accompanying drawings and in which:

FIG. 20A is a side elevation view of a closer on a coulter wheel according to one embodiment.

FIG. 20B is a rear view of the closer of FIG. 20A according to one embodiment in which the top and bottom of the arms are equidistant to the axis through the trench and the front and back of the arms are equidistant to the axis through the trench.

FIG. 20C is a rear view of the closer of FIG. 20A according to one embodiment in which the bottom of the arms are closer to the axis through the trench than the top of the arms.

FIG. 29A is a side elevation view of a nozzle according to one embodiment.

FIG. 29B is a bottom elevation view of the nozzle of FIG. 29A.

FIG. 29C is an end view of a nozzle according to one embodiment.

FIG. 39A is a side elevation view of a nozzle according to one embodiment.

FIG. 39B is a bottom plan view of the nozzle and selector of FIG. 39A.

FIG. 39C is a bottom plan view of the nozzle of FIG. 39A.

SUMMARY

Figure 1:
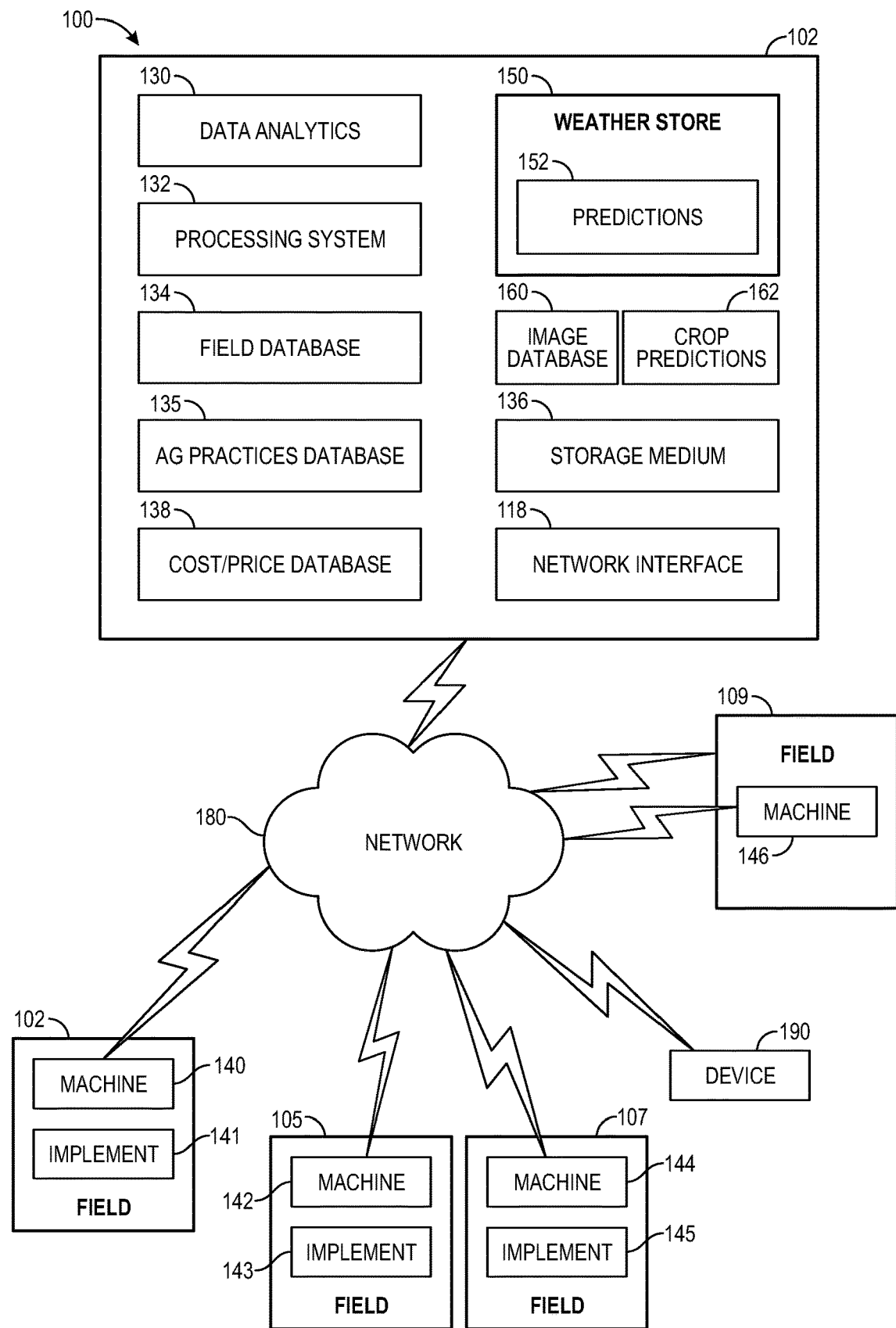
FIG. 1 shows an example of a system for performing agricultural operations of agricultural fields including operations of an implement having application units in accordance with one embodiment.

Described herein are systems, implements, and application units having mechanisms for placement of applications to agricultural plants of agricultural fields. In one embodiment, a fluid applicator for applying fluid to plants in rows in a field includes a frame, at least one applicator arm disposed in a rhizosphere of plants during fluid flow through the applicator, and a fluid conduit connected to the frame and disposed in the row between plants to deliver fluid to the row between plants.

In one embodiment, an application unit includes a frame to be positioned in operation between two rows of plants and a first plurality of flexible members coupled to the frame in operation such that the first plurality of flexible members guide a lateral position of the frame to be approximately equidistant from the two rows of plants based upon whether at least one flexible member of the first plurality of flexible members contacts one or more plants of the two rows of plants. The first plurality of flexible members include a plurality of fluid outlets for spraying crop input in close proximity to the rows of plants. In one example, the application unit also includes a second plurality of flexible members for guiding a lateral position of a base member that is coupled to the frame.

In one embodiment, an application unit comprising: a frame to be positioned in operation between first and second rows of plants; a first plant contacting member being pivotally coupled to the frame in operation such that the first plant contacting member to be deflected rearwardly with respect to a direction of motion of the frame upon the first plant contacting member contacting at least one of the plants of the first row of plants which causes a first change in orientation of the first plant contacting member with respect to the frame; and a first outlet for applying a liquid application to the first row of plants with the first outlet being mechanically linked to the first plant contacting member, wherein the first change in orientation causes a corresponding second change in orientation of the first outlet with respect to the frame.

In one embodiment, an application unit comprising: a frame to be positioned in operation between two rows of plants; a base member coupled to the frame, the base member to be positioned in proximity to a ground surface while in operation; and first and second plant guidance members coupled to the base member in operation such that the first and second plant guidance members guide a lateral position of the base member to be approximately equidistant from the two rows of plants based upon whether at least one of the first and second plant guidance members contacts one or more plants of the two rows of plants.

In one embodiment, an application unit comprising: a frame to be positioned in operation between two rows of plants; a base member coupled to the frame; and at least one linkage member for conveying fluid coupled to a biasing element of the base member in operation such that the biasing element biases an angular position of the at least one linkage member.

An application unit comprising: a frame to be positioned in operation between two rows of plants; and a first plurality of flexible members coupled to the frame in operation such that the first plurality of flexible members guide a lateral position of the frame to be approximately equidistant from the two rows of plants based upon whether at least one of the first plurality of flexible members contacts one or more plants of the two rows of plants.

In one embodiment, a fluid applicator for applying fluid to plants in rows in a field comprising: at least one applicator arm that is actuated by an actuator to move the applicator arm from a position in the row between plants to a position adjacent to the plant.

In one embodiment, a fluid applicator for applying fluids to plants in rows in a field comprising: a base, at least one flexible or pivoting application member connected to the base and disposed to apply fluid to the plants, and a stabilizer associated with the at least one flexible or pivoting application member, wherein the stabilizer comprises at least one of:

a) a spring disposed over the at least one flexible application member, b) a reinforcement that is disposed on or in the at least one application member and disposed along a length of the at least one application member, c) a wire attached to the at least one application member, the wire having a length to contact at least one plant, and d) a damper.

In one embodiment, a fluid applicator for applying fluids to plants in rows in a field comprising: a frame; a coulter connected to the frame and disposed to open a trench between the rows of plants; at least one application member connected to the frame or to the coulter and disposed to apply fluid to a rhizosphere of the plants.

In one embodiment, a fluid applicator for applying fluids to plants in rows in a field comprising: a base disposed between plants in adjacent rows, at least one application member connected to the base and disposed to apply fluid to the plants in a rhizosphere of the plants, and a nozzle disposed at an end of the application member for dispensing fluid from the application member to the plants in the rhizosphere of the plants.

In one embodiment, a trench closer for a fertilizer applicator comprising, a bar moved through a field transverse to a direction of travel, a fertilizer applicator connected to the bar for forming a trench in soil, wherein the fertilizer applicator comprises a coulter, a knife, or a coulter and a knife, and a trench closer disposed behind the fertilizer applicator in the direction of travel and connected to the fertilizer applicator or the bar, wherein the trench closer is not a disk that rolls in a direction of travel.

In another embodiment, a fluid applicator for applying fluid to plants in rows in a field includes at least one applicator arm, a first nozzle disposed to apply fluid to a rhizosphere of the plants, and a second nozzle disposed to apply fluid to between the row of plants.

In another embodiment, a nozzle includes a fluid inlet, a fluid outlet, and a rotatable member to rotate over the fluid outlet to selectively expose the fluid outlet to at least one opening to provide fluid flow from the fluid outlet through the opening. Upon the rotatable member rotating over the fluid outlet, a different number of openings is in fluid communication with the fluid outlet.

DETAILED DESCRIPTION

Described herein are systems, implements, and application units having mechanisms for placement of applications to agricultural plants of agricultural fields.

In an embodiment, an application unit includes a frame to be positioned in operation between first and second rows of plants, a first plant contacting member being pivotally coupled to the frame in operation such that the first plant contacting member to be deflected rearwardly with respect to a direction of motion of the frame upon the first plant contacting member contacting at least one of the plants of the first row of plants which causes a first change in orientation of the first plant contacting member with respect to the frame. A first outlet applies a fluid application to the first row of plants. The first change in orientation causes a corresponding second change in orientation of the first outlet with respect to the frame.

Each application unit includes components (e.g., planting contacting members, feelers, guidance members, linkage members, flexible members, etc) for obtaining a proper placement (e.g., orientation and/or positioning) of one or more fluid outlets with respect to rows of plants in an agricultural field. The fluid outlets are then able to precisely apply (spray or dribble) the fluid applications on a desired target region (e.g., rhizosphere, a bottom portion of a plant, root ball, crown, crown root, mesocotyl, below a first node of a plant) of rows of plants to more efficiently spray plants at a lower cost due to less wasted crop input (e.g., nutrients, fertilizer, fungicide, herbicide or insecticide).

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

FIG. 1 shows an example of a system 100 for performing agricultural operations (e.g., applying fluid applications to plants) of agricultural fields including operations of an implement having application units in accordance with one embodiment. For example and in one embodiment, the system 100 may be implemented as a cloud based system with servers, data processing devices, computers, etc. Aspects, features, and functionality of the system 100 can be implemented in servers, planters, planter monitors, sprayers, sidedress bars, combines, laptops, tablets, computer terminals, client devices, user devices (e.g., device 190), handheld computers, personal digital assistants, cellular telephones, cameras, smart phones, mobile phones, computing devices, or a combination of any of these or other data processing devices.

In other embodiments, the system 100 includes a network computer or an embedded processing device within another device (e.g., display device) or within a machine (e.g., planter, combine), or other types of data processing systems having fewer components or perhaps more components than that shown in FIG. 1. The system 100 (e.g., cloud based system) and agricultural operations can control and monitor fluid applications using an implement or machine. The system 100 includes machines 140, 142, 144, 146 and implements 141, 143, 145 coupled to a respective machine 140, 142, 144, 146. The implements (or machines) can include flow devices for controlling and monitoring fluid applications (e.g., spraying, fertilization) of crops and soil within associated fields (e.g., fields 102, 105, 107, 109). The system 100 includes an agricultural analysis system 102 that includes a weather store 150 with current and historical weather data, weather predictions module 152 with weather predictions for different regions, and at least one processing system 132 for executing instructions for controlling and monitoring different operations (e.g., fluid applications). The storage medium 136 may store instructions, software, software programs, etc for execution by the processing system and for performing operations of the agricultural analysis system 102. In one example, storage medium 136 may contain a fluid application prescription (e.g., fluid application prescription that relates georeferenced positions in the field to application rates). The implement 141 (or any of the implements) may include an implement 200 whose pump, flow sensors and/or flow controllers may be specifically the elements that are in communication with the network 180 for sending control signals or receiving as-applied data.

An image database 160 stores captured images of crops at different growth stages. A data analytics module 130 may perform analytics on agricultural data (e.g., images, weather, field, yield, etc.) to generate crop predictions 162 relating to agricultural operations.

A field information database 134 stores agricultural data (e.g., crop growth stage, soil types, soil characteristics, moisture holding capacity, etc.) for the fields that are being monitored by the system 100. An agricultural practices information database 135 stores farm practices information (e.g., as-applied planting information, as-applied spraying information, as-applied fertilization information, planting population, applied nutrients (e.g., nitrogen), yield levels, proprietary indices (e.g., ratio of seed population to a soil parameter), etc.) for the fields that are being monitored by the system 100. An implement can obtain fluid application data from the CMUs and provide this data to the system 100. A cost/price database 138 stores input cost information (e.g., cost of seed, cost of nutrients (e.g., nitrogen)) and commodity price information (e.g., revenue from crop).

The system 100 shown in FIG. 1 may include a network interface 118 for communicating with other systems or devices such as drone devices, user devices, and machines (e.g., planters, combines) via a network 180 (e.g., Internet, wide area network, WiMax, satellite, cellular, IP network, etc.). The network interface includes one or more types of transceivers for communicating via the network 180.

The processing system 132 may include one or more microprocessors, processors, a system on a chip (integrated circuit), or one or more microcontrollers. The processing system includes processing logic for executing software instructions of one or more programs. The system 100 includes the storage medium 136 for storing data and programs for execution by the processing system. The storage medium 136 can store, for example, software components such as a software application for controlling and monitoring fluid applications or any other software application. The storage medium 136 can be any known form of a machine readable non-transitory storage medium, such as semiconductor memory (e.g., flash; SRAM; DRAM; etc.) or non-volatile memory, such as hard disks or solid-state drive.

Figure 2:
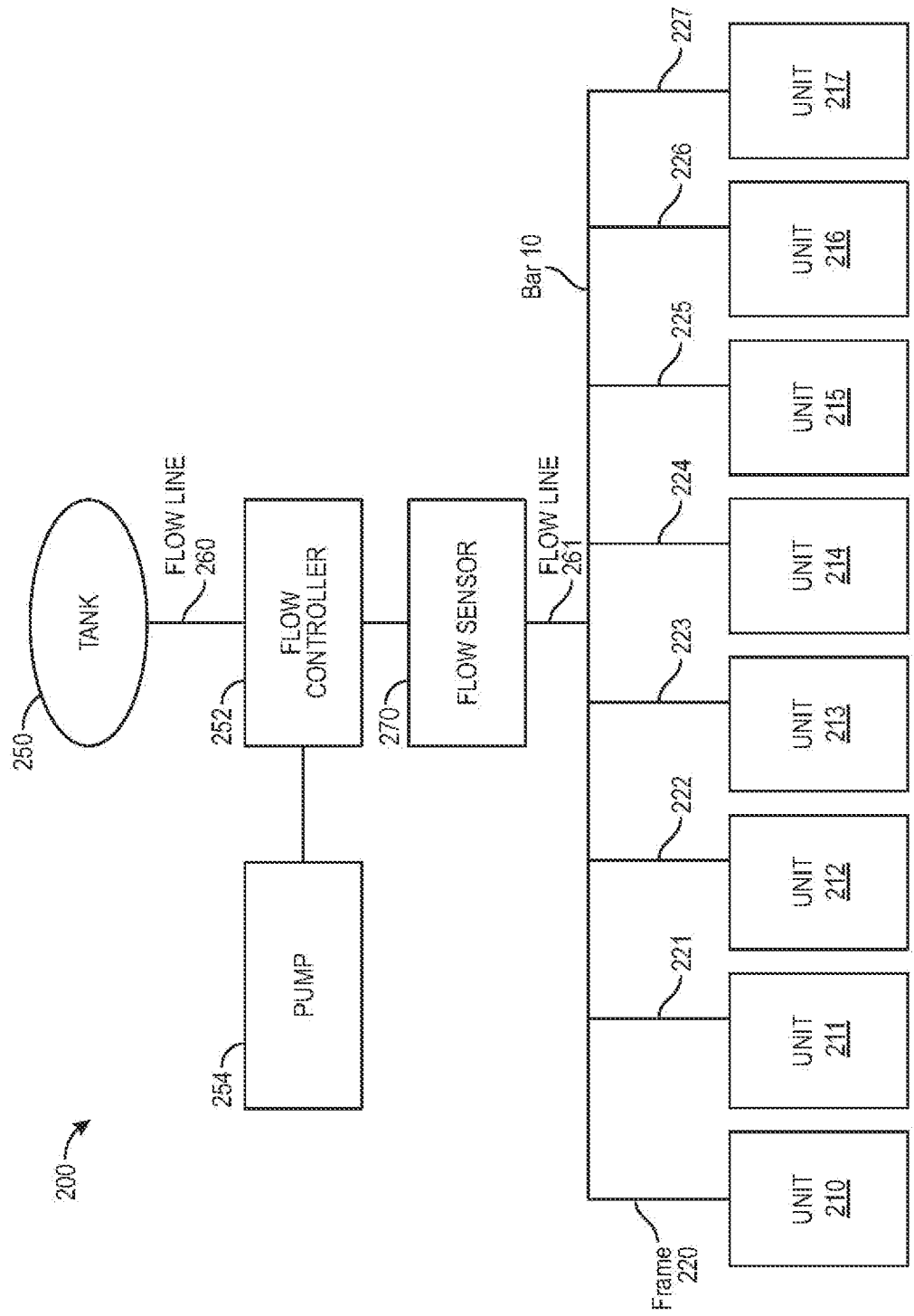
FIG. 2 illustrates an architecture of an implement 200 for delivering applications (e.g., fluid applications, fluid mixture applications) to agricultural fields in accordance with one embodiment.

While the storage medium (e.g., machine-accessible non-transitory medium) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals. FIG. 2 illustrates an architecture of an implement 200 for delivering applications (e.g., fluid applications, fluid mixture applications) to agricultural fields in accordance with one embodiment. The implement 200 includes at least one storage tank 250, flow lines 260 and 261, a flow controller 252 (e.g., valve), and at least one variable-rate pump 254 (e.g., electric, centrifugal, piston, etc.) for pumping and controlling application rate of a fluid (e.g., fluid application, semifluid mixture) from the at least one storage tank to different application units 210-217, respectively of the implement. At least one flow sensor 270 can be utilized on the implement 200 either row-by-row or upstream of where the fluid branches out to the application units as illustrated in FIG. 2. The flow controller 252 can be row-by-row as opposed to implement-wide as shown in FIG. 2.

The applications units are mechanically coupled to the frames 220-227 which are mechanically coupled to a bar 10. Each application unit 210-217 can include flow sensors and components having a placement mechanism (e.g., planting contacting members, feelers, guidance members) for obtaining a proper orientation and/or positioning of a fluid outlet with respect to a plant in an agricultural field. The application units can include any of the embodiments described herein in conjunction with FIGS. 3A, 3B, 4-11, and 13A and 13B.

Figure 3A:
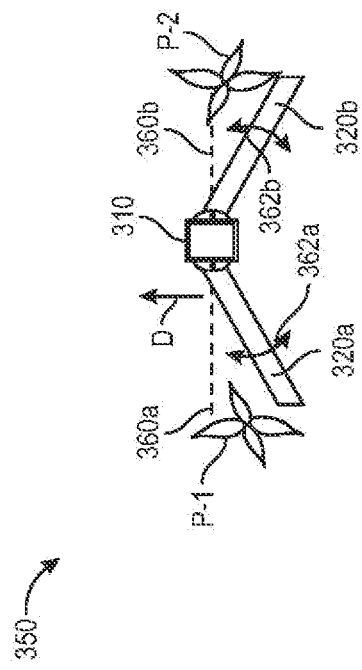
FIG. 3A illustrates a rear view of an application unit 300 (e.g., a fluid application unit) 300 for applying an application to plants P-1, P-2 (e.g., corn plants, soy bean plants, etc.) in accordance with one embodiment.

FIG. 3A illustrates a rear view of an application unit 300 (e.g., a fluid application unit) 300 for applying an application to plants P-1, P-2 (e.g., corn plants, soy bean plants, etc.) in accordance with one embodiment. It should be appreciated that the unit 300 is illustrated traveling in a direction D into the page in FIG. 3A (rear view 302) and traveling upward in FIG. 3B (top view 350) along a direction D. The application unit 300 is preferably mounted to a transversely extending bar 10 (e.g., toolbar or boom) drawn by a tractor or other implement. The application unit 300 preferably extends laterally between existing corn plants P-1, P-2 as the bar 10 traverses the field having a ground surface 390.

Figure 3B:
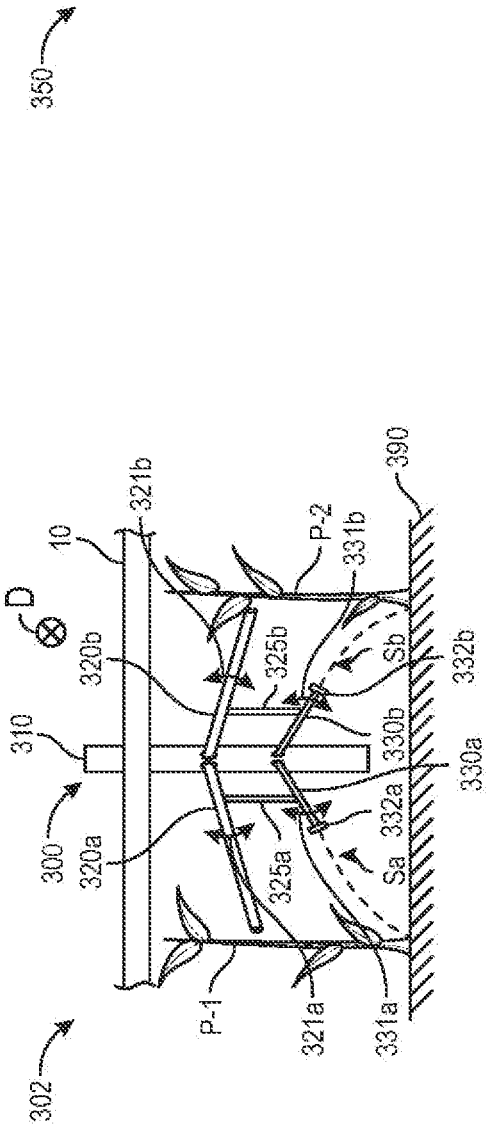
FIG. 3B illustrates a top view of an application unit 300 (e.g., a fluid application unit) 300 for applying an application to plants P-1, P-2 (e.g., corn plants, soy bean plants, etc.) in accordance with one embodiment.

Continuing to refer to FIG. 3A (rear view), the fluid application unit 300 preferably comprises a downwardly-extending frame 310 to which feelers 320a, 320b and fluid outlets 330a, 330b are preferably pivotally connected. As shown in FIG. 3B (top view 350), the feelers 320 preferably pivot with a range of angular motion 321a, 321b about an axis parallel to the frame 310, e.g., a vertical axis. In operation, when the feelers 320a, 320b contact passing plants (e.g., P-1, P-2), the feelers 320a, 320b preferably deflect rearwardly in a downward direction. A spring element (not shown) or other biasing element preferably biases the feelers 320a, 320b into a neutral position 360a, 360b to which the feeler preferably returns when not deflected by a plant or other obstacle. A length of the feelers 320a, 320b may be designed based on a row spacing (e.g., 20", 30", etc.) with each feeler 320a, 320b having a length of approximately one half of the row spacing between rows of plants. In one example, the feelers 320a, 320b may have adjustable lengths depending on the row spacing for a field.

Each feeler 320 is preferably operatively mechanically linked to one of the fluid outlets 330 such that a change in orientation of the feeler 320 relative to the frame 310 changes an orientation of the linked fluid outlet 330.

In the embodiment of FIG. 3A (rear view), rearward angular deflection of the feeler 320 (e.g., 320a, 320b) results in corresponding (e.g., equal) angular deflection with a range of angular motion 331a, 331b of the fluid outlet 330 (e.g., 330a, 330b) linked to the feeler. A rigid link 325 (e.g., 325a, 325b) constrains the fluid outlet 330 to pivot in a synchronized fashion with the feeler 320. The fluid outlet 330 preferably pivots about an axis which is preferably parallel to the frame 310. The pivot axis of the fluid outlet 330 is preferably parallel to and preferably substantially aligned with the pivot axis of the feeler 320. As a result, a spray S (e.g., pressurized spray Sa, Sb) emitted from the fluid outlet 330 (e.g., via orifices 332a, 332b) preferably disposed at a distal end of the outlet) is preferably oriented toward a plant P-1, P-2 contacted by the feeler 320.

In another embodiment, the fluid application unit 300 includes a single fluid outlet and a single feeler for spraying a single row of plants. In one example, the application unit 300 includes the feeler 320a and the fluid outlet 330a for spraying the row of plants P-1. The feeler 320b and fluid outlet 330b are not included in this example. A different application unit is provided for spraying the plants P-2.

In another example, the application unit 300 includes the feeler 320b and the fluid outlet 330b for spraying the row of plants P-2. The feeler 320a and fluid outlet 330a are not included in this example. A different application unit is provided for spraying the plants P-1.

In another embodiment, the fluid application unit 300 includes at least one fluid outlet (e.g., 330a, 330b) and no feelers 320, 320b and no link 325a, 325b. The at least fluid outlet is positioned and/or oriented to spray a fluid towards a base region of a plant (e.g., into soil within 3-4 inches of the base region of the plant, towards a region in which a base of the plant emerges from the soil).

It should be appreciated that each fluid outlet in the various embodiments described herein is preferably in fluid communication with a source (e.g., tank 250) containing an application (e.g., fluid application, crop inputs such as fertilizer, fungicide, herbicide or insecticide). Each fluid outlet described herein provides a pressurized spray (e.g., 1-200 psi, 5-100 psi, etc.) in a direction (e.g., substantially downward direction) towards a base region of a plant (e.g., into soil within 3-4 inches of the base region of the plant, towards a region in which a base of the plant emerges from the soil). In another example, at least one fluid outlet of an application unit provides a dribble of liquid (e.g., non-pressurized source) rather than a pressurized spray.

Figure 4:
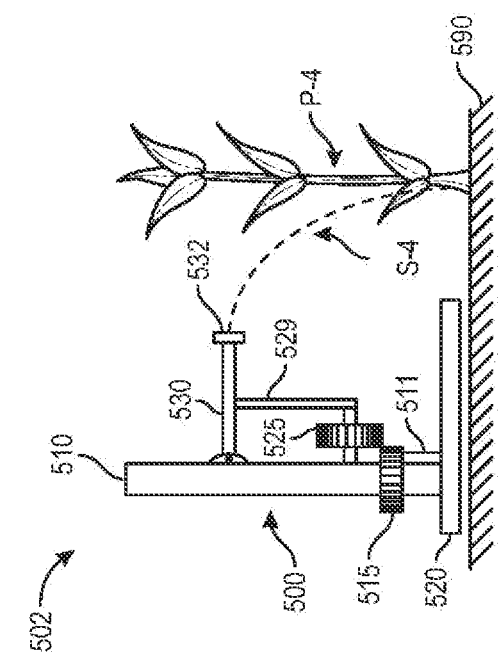
FIG. 4 illustrates an embodiment (rear view 402) of an application unit 400 (e.g., fluid application unit 400).

In the embodiment of an application unit 400 (e.g., fluid application unit 400) shown in FIG. 4 (rear view 402), the frame 410 supports a feeler 420 which preferably functions similarly to the unit 300 described above. The frame 410 may be coupled to a bar 10 in a similar manner as the frame 310 is coupled to the bar 10 in FIG. 3A. As described in more detail herein, rearward deflection (out of the page) of the feeler 420 preferably causes the fluid outlet 430 to deflect in a transverse vertical plane (e.g., generally up and down along the view of FIG. 4 (rear view)). In one example, when a transverse distance between frame 410 and an adjacent plant P-3 decreases, the feeler is pivoted rearward with respect to a neutral position of the feeler, preferably causing the fluid outlet 430 to pivot downward such that a spray S-3 emitted by the fluid outlet 430 (e.g., from a fluid orifice 432 preferably disposed at a distal end thereof) is directed more closely toward a bottom portion (e.g., root ball, crown, crown root, mesocotyl) of the plant. Conversely, when a transverse distance between frame 410 and an adjacent plant P-3 increases, a biasing element (not shown) causes the feeler to pivot forward with respect to a neutral position of the feeler, preferably causing the fluid outlet to pivot upward such that the spray S-3 is directed more closely toward the bottom portion of the plant or towards soil within 0-4 inches of the bottom portion of the plant.

Referring to the illustrated embodiment of FIG. 4 (rear view) in more detail, the feeler 420 preferably pivots about a central vertical axis of the frame 410, which is preferably round in cross-section. A link 411 preferably constrains a horizontal gear 415 to rotate about the central vertical axis of the frame 410. The central vertical axis is substantially perpendicular with respect to a ground surface 490. The horizontal gear 415 preferably drives a vertical gear 425 (e.g., teeth of gear 415 engage with teeth of gear 425), which preferably selectively raises or lowers the outlet 430, e.g., by winding or unwinding a support cable 429 which may be wound around a drive shaft of the vertical gear 425 at an upper end thereof and attached to the outlet 430 at a lower end thereof.

The embodiments described herein may include a pair of feelers each having an associated (e.g., linked) fluid outlet. In other embodiments, the fluid outlets may be constrained (e.g., by a linkage) to pivot at equal and opposite angles, and one of the outlets may be associated with (e.g., linked to) a single feeler.

The feelers 320, 420 described herein may contact the adjacent plants at any location. In a preferred embodiment, each feeler is preferably disposed to contact an adjacent plant on a stem or stalk thereof; for example, the feeler may be disposed adjacent the ground in order to contact the stalk at a location immediately above the soil (e.g., above the crown and below the lowest node of the plant). In some such embodiments, the fluid outlet may be disposed above the feeler instead of below the feeler as illustrated in FIG. 5 in accordance with one embodiment.

Figure 5:
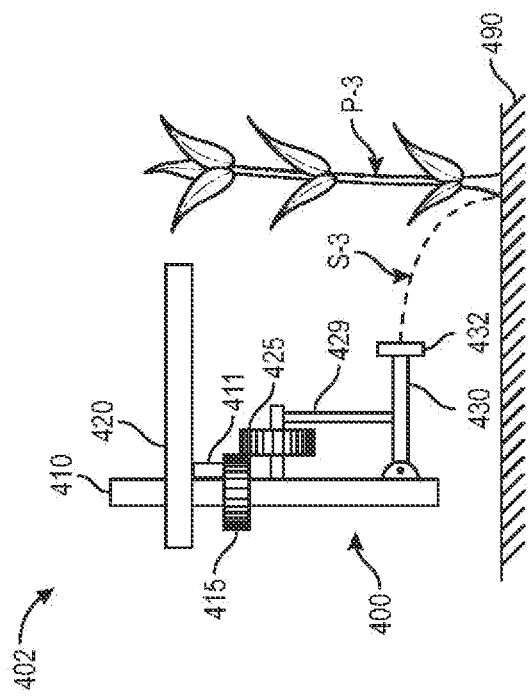
FIG. 5 illustrates an embodiment (rear view 502) of an application unit 500 (e.g., fluid application unit 500).

In the embodiment of an application unit 500 (e.g., fluid application unit 500) shown in FIG. 5 (rear view 502), the frame 510 supports a feeler 520 which preferably functions similarly to the unit 400 described above. As described in more detail herein, rearward deflection of the feeler 520 preferably causes the fluid outlet 530 to deflect in a transverse vertical plane (e.g., generally up and down along the view of FIG. 5 (rear view)). When a transverse distance between frame 510 and an adjacent plant P-4 decreases, the feeler 520 is pivoted rearward with respect to a neutral position of the feeler 520, preferably causing the fluid outlet 530 to pivot downward such that a spray S-4 emitted by the fluid outlet 530 (e.g., from a fluid orifice 532 preferably disposed at a distal end thereof) is directed more closely toward a bottom portion (e.g., root ball, crown, crown root, mesocotyl) of the plant that is in close proximity to a ground surface 590. Conversely, when a transverse distance between frame 510 and an adjacent plant P-4 increases, a biasing element (not shown) causes the feeler to pivot forward with respect to a neutral position of the feeler 520, preferably causing the fluid outlet 530 to pivot upward such that the spray S-4 is directed more closely toward the bottom portion of the plant (e.g., within 0-4 inches of the bottom portion of the plant).

Figure 6A:
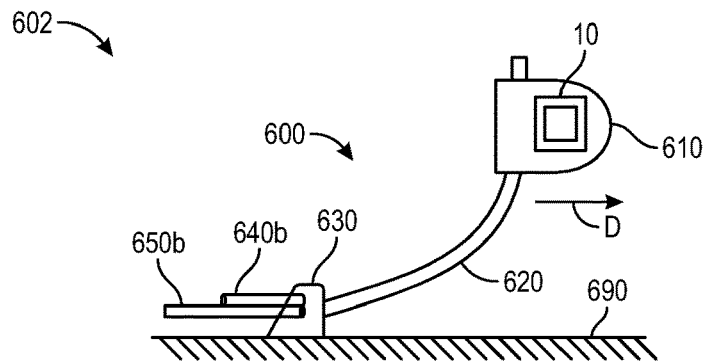
FIGS. 6A and 6B illustrate another embodiment of a fluid application unit 600.
Figure 6B:
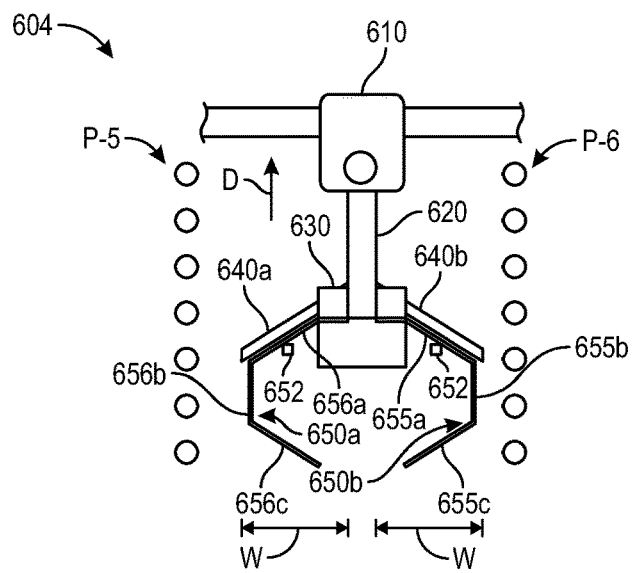

In still another embodiment of a fluid application unit 600 illustrated in FIG. 6A (side view 602) and FIG. 6B (top view 604), a downwardly and preferably rearwardly extending frame 620 (e.g., a flexible, or semi-flexible frame) is fixed to the bar 10 at an upper end thereof by a bracket 610. A base member 630 supported at a lower end of the frame 620 is preferably disposed adjacent a ground surface 690 and may have a lower curved surface for riding (continuously or discontinuously) along the ground surface. Fluid outlets 640a, 640b are preferably supported by the base member 630 and are preferably disposed to apply a fluid to the plants P-5, P-6 (e.g., at a lower portion of each plant such as at a crown thereof). The fluid outlets 640a, 640b may have orifices disposed at a distal end thereof for forming a spray which is preferably directed toward the plants. Guidance members 650a, 650b preferably guide the lateral position of the base member 630; e.g., contact between the guidance members 650a, 650b and stems of plants P-5, P-6 may deflect the frame 620 to allow the base member 630 to remain equidistant from each row of plants P-5, P-6 adjacent to the base member 630. The guidance members 650 are preferably made of a semi-flexible or semi-rigid material such as spring steel and may include a spring coil 652 for permitting the guidance member 650a, 650b to deflect when encountering obstacles. The guidance members 650 may include a first portion 655a, 656a extending outwardly and rearwardly toward the row of plants, a second portion 655b, 656b extending generally parallel to the row of plants, and a third portion 655c, 656c extending inwardly and rearwardly away from the row of plants. In one embodiment, all base members adjust their position with respect to the rows of plants.

A width (W) of the guidance members may be designed based on a row spacing (e.g., 20", 30", etc.) with each guidance member having a length of slightly less than approximately one half of the row spacing between rows of plants. In one example, the guidance members may have adjustable widths depending on the row spacing for a field.

In one example, the application unit 600 includes at least one fluid outlet (e.g., 640a, 640b) that sprays or dribbles fluid towards a base region of the plants P-5, P-6. The base member 630 contacts a ground surface 690 in a continuous or non-continuous manner along the ground surface. A flexible frame 620 couples the base member 630 to a bar 610. In another embodiment, the application unit 600 does not include guidance members 650a, 650b. At least one fluid outlet 640a, 640b sprays the fluid towards a base region of the plants P-5, P-6.

Figure 7:
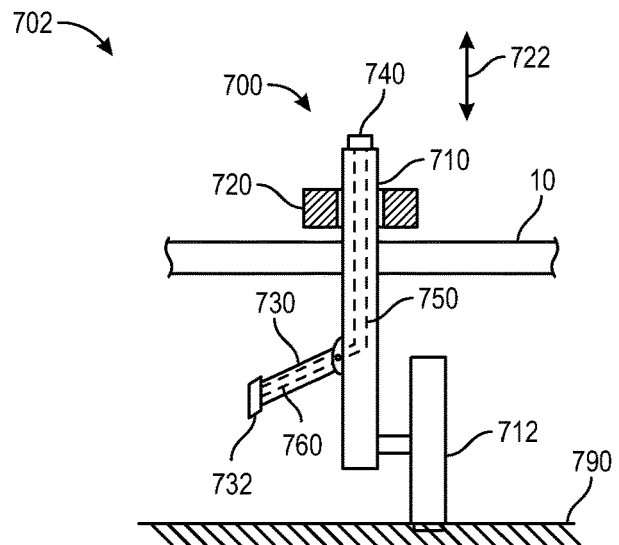
FIG. 7 illustrates another embodiment of a fluid application unit 700.

In another embodiment of a fluid application unit 700 illustrated in FIG. 7 (rear view 702), a downwardly extending frame 710 is preferably permitted to slide up and down as indicated by arrows 722 relative to the bar 10 but retained to the bar 10 by a collar 720 extending around the frame 710 at an upper end thereof. The unit 700 is preferably functionally similarly to the unit 300 except the unit 700 includes a ground engaging element 712, a collar 720, and an internal channel 750 for directing fluid through the frame 710. A ground-engaging element 712 (e.g., a wheel or ski) is preferably mounted to a lower end of the frame 710 and disposed to contact the ground during operation such that a fluid outlet 730 retains its position relative to the ground surface in operation. One or more feelers and related linkage mechanisms for reorienting the fluid outlet (as described herein according to various embodiments) may additionally be incorporated in the unit 700. The frame 710 may include a fluid inlet 740 that is in fluid communication with an internal channel 750 (e.g., formed within the frame and/or disposed within the frame) for directing fluid to the fluid outlet 730. The fluid outlet 730 may additionally include an internal channel 760 (e.g., formed as a part within fluid outlet 730 and/or disposed within the fluid outlet 730) for directing fluid to the distal end (e.g., orifice 732) of the fluid outlet 730. The channels 750 and 760 are preferably in fluid communication via a flexible conduit (not shown) such as a hose or tube. The fluid inlet 740 may be in fluid communication with a flexible conduit that is in fluid communication with a fluid source (e.g., tank).

Figure 8A:
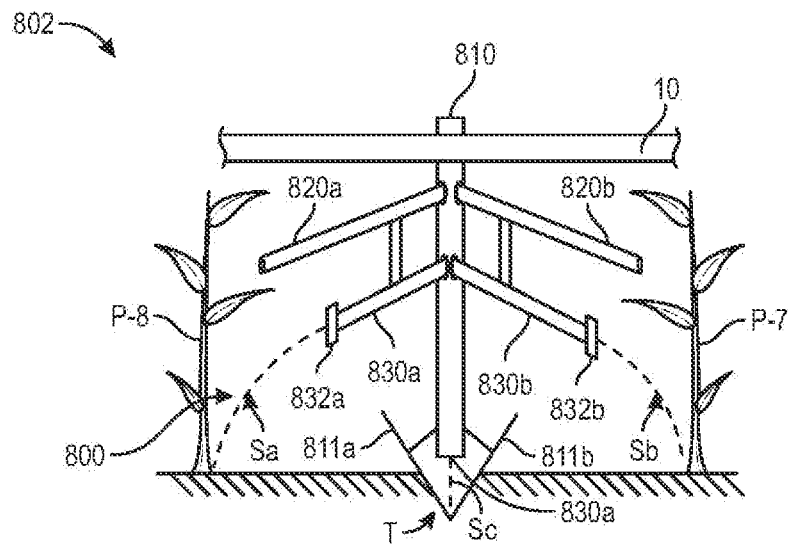
FIG. 8A illustrates an embodiment of a fluid application unit 800.

Referring to FIG. 8A (rear view 802), an embodiment of a fluid application unit 800 is illustrated which is substantially similar to the application unit 300 described herein, except that the frame 810 is coupled to or includes one or more opening discs 811*a*, 811*b* (e.g., vertical coulters, angled opening discs) for opening a trench T in the soil. The frame 810 preferably includes an internal or externally mounted conduit (not shown) for applying a crop input (e.g., fluid crop input such as anhydrous or other fertilizer, nutrients, etc.) into the trench T. The frame 810 may comprise an injection assembly (e.g., sidedress liquid fertilizer injection assembly or anhydrous injection assembly) such as those illustrated in FIG. 7 of U.S. Pat. No. 5,890,445, incorporated herein by reference or in U.S. Pat. No. 8,910,581, incorporated by reference; the fluid outlets 830*a*, 830*b*, and feelers 820*a*, 820*b*, as well as related linkage structure are preferably fixed to the sides of such an injection assembly for spraying a fluid on nearby plants P-6.

The fluid outlets 830*a*, 830*b* preferably pivot about an axis which is preferably parallel to the frame 810. The pivot axis of the fluid outlets 830*a*, 830*b* is preferably parallel to and preferably substantially aligned with the pivot axis of the feelers 820*a*, 820*b*. As a result, a spray S (e.g., Sa, Sb) emitted from the fluid outlets 830*a*, 830*b* (e.g., via orifices 832*a*, 832*b*) preferably disposed at distal ends of the outlets) is preferably oriented toward a plant P-7, P-8 contacted by the feelers 820*a*, 820*b*. A lower end of the frame 810 may also contain a fluid outlet 830*c* for emitted a spray Sc into the trench T. It should be appreciated that each fluid outlet 830*a*, 830*b* in the various embodiments described herein is preferably in fluid communication with a source (e.g., tank 250) containing an application (e.g., fluid application, crop inputs such as fertilizer, fungicide, herbicide or insecticide).

The optional feelers 820 described herein may contact the adjacent plants at any location. In a preferred embodiment, each feeler 820 is preferably disposed to contact an adjacent plant on a stem or stalk thereof; for example, the feeler may be disposed adjacent the ground in order to contact the stalk at a location immediately above the soil (e.g., above the crown and below the lowest node of the plant). In some such embodiments, the fluid outlet 830 may be disposed above the feeler 820 instead of below the feeler 830 as illustrated in FIG. 3 in accordance with one embodiment.

In another example, the application unit 800 does not include the optional feelers 820*a*, 820*b*. At least one fluid outlet (e.g., 820*a*, 820*b*) sprays or dribbles fluid towards a base region of the plants P-7, P-8 while the fluid outlet 830*a* sprays or dribbles the fluid into the trench T. A distal end of at least one fluid outlet (e.g., 820*a*, 820*b*) extends closer (e.g., within 0-6 inches) to a base region of the plants when the liquid is dribbled towards the base region of the plants in comparison to when the fluid is sprayed.

Figure 8B:
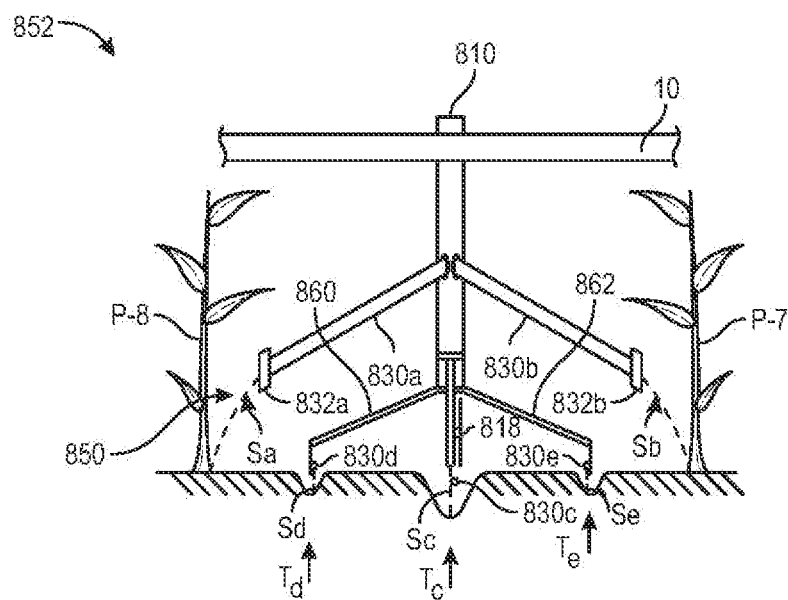
FIG. 8B illustrates an embodiment of a fluid application unit 850.

Referring to FIG. 8B (rear view 852), an embodiment of a liquid application unit 850 is illustrated which is substantially similar to the application unit 300 described herein, except that the frame 810 is coupled to or includes one or more opening discs 818 (e.g., vertical coulter) for opening a trench Tc in the soil, optional trench forming members 860 and 862 (e.g., scrapers, knives) for opening shallow trenches Td and Te, respectively, in the soil, and no feelers. One or more feelers and related linkage mechanisms for reorienting the fluid outlet (as described herein according to various embodiments) may additionally be incorporated in the unit 850.

The frame 810 preferably includes an internal or externally mounted conduit (not shown) for applying a crop input (e.g., liquid crop input such as anhydrous or other fertilizer, nutrients, etc.) into the trenches. The frame 810 may comprise an injection assembly (e.g., sidedress liquid fertilizer injection assembly or anhydrous injection assembly) such as those illustrated in FIG. 7 of U.S. Pat. No. 5,890,445, incorporated herein by reference or in U.S. Pat. No. 8,910,581, incorporated by reference; the fluid outlets 830*a*, 830*b*, as well as related linkage structure are preferably fixed to the sides of such an injection assembly for spraying or dribbling a liquid on nearby plants. The fluid outlets 830*a*, 830*b* preferably pivot about an axis which is preferably parallel to the frame 810. The fluid outlet 830*c* is formed near a disc 818 and the fluid outlets 830*d*, 830*e* are formed near a corresponding trench forming member 860, 862. As a result, a spray S (e.g., Sa, Sb, Sd, Se) or dribble emitted from the fluid outlets preferably disposed at distal ends of the outlets) is preferably oriented toward plants P-7, P-8. A lower end of the frame 810 may also contain a fluid outlet 830*c* for emitted a spray Sc into the trench T. It should be appreciated that each fluid outlet in the various embodiments described herein is preferably in fluid communication with a source (e.g., tank 250) containing an application (e.g., fluid application, crop inputs such as fertilizer, fungicide, herbicide or insecticide).

In one example, a tractor or other implement pulls multiple side dressing fertilizer coulter units (e.g., application unit 850) for forming a trench Tc having a depth (e.g., 4-8 inches, approximately 5-7 inches, etc.). The crop may be at a seedling stage when fertilizer is typically applied as a side dressing slightly offset laterally from each row of seedlings. Each application unit includes a frame (not shown), a coulter disc or wheel 818 for forming a deeper trench having a depth (e.g., 4-8 inches, approximately 5-7 inches, etc.) with a lateral position approximately equidistant between the plants P-7, P-8, a trench forming member 860 (e.g., scratching knife 860) for opening a shallow trench Td having a shallow depth (e.g., 0-4 inches, 0-2 inches, approximately 1 inch) in proximity to a row of plants P-8 (e.g., a lateral position within 5-10 inches of the plants P-8), and a trench forming member 862 (e.g., scratching knife 862) for opening a shallow trench having a shallow depth (e.g., 0-4 inches, 0-2 inches, approximately 1 inch) in proximity to a row of plants P-7 (e.g., a lateral position within 5-10 inches of the plants P-7). The frame 810 preferably includes an internal or externally mounted conduit (not shown) for applying a crop input (e.g., fluid crop input such as anhydrous or other fertilizer, nutrients, etc.) with fluid outlets into a respective trench. Each knife may be associated with a respective covering tine (e.g., rake, closing wheel) for closing the shallow trench to retain the crop input in the soil (or ground) and prevent the crop input from being volatilized.

In another example, the disc 818 and fluid outlet 830*c* are not included in the application unit 850 and at least one of the members 860 and 862 is included in the application unit 850. In another example, only one of the trench forming members 860 and 862 is included in the application unit 850.

Figure 9A:
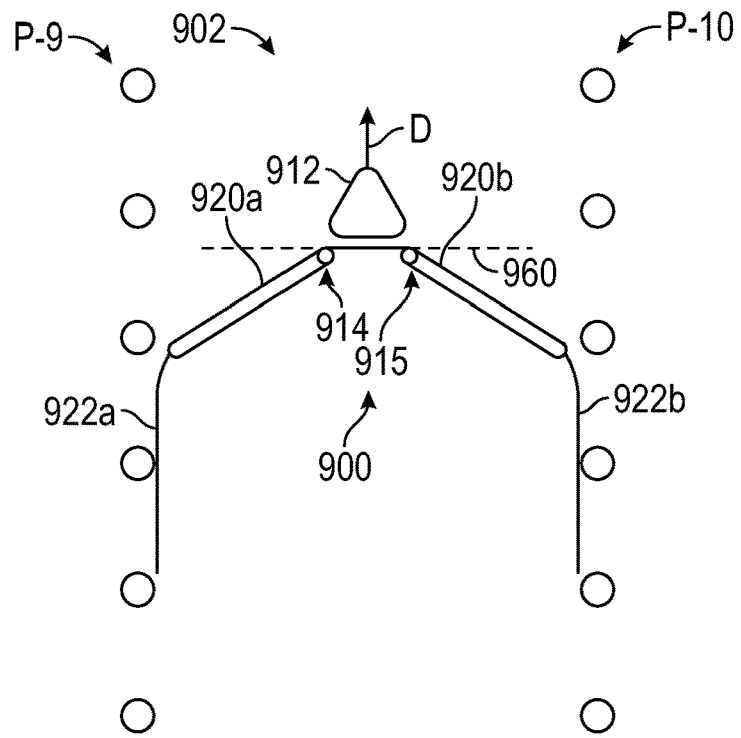
FIG. 9A illustrates a top view 902 of an application unit 900 (e.g., a fluid application unit) 900 for applying an application to plants P-9, P-10 (e.g., corn plants, soy bean plants, etc.) in accordance with one embodiment.

FIG. 9A illustrates a top view 902 of an application unit 900 (e.g., a fluid application unit) 900 for applying an application to plants P-9, P-10 (e.g., corn plants, soy bean plants, etc.) in accordance with one embodiment. It should be appreciated that the unit 900 is illustrated traveling in a direction D upwards in FIGS. 9A and 9B. The application unit 900 is preferably mounted to a transversely extending bar 10 (e.g., toolbar or boom) drawn by a tractor or other implement. The application unit 900 preferably extends laterally between existing corn plants as the bar 10 illustrated in FIG. 9C traverses the field having a ground surface 990.

Figure 9B:
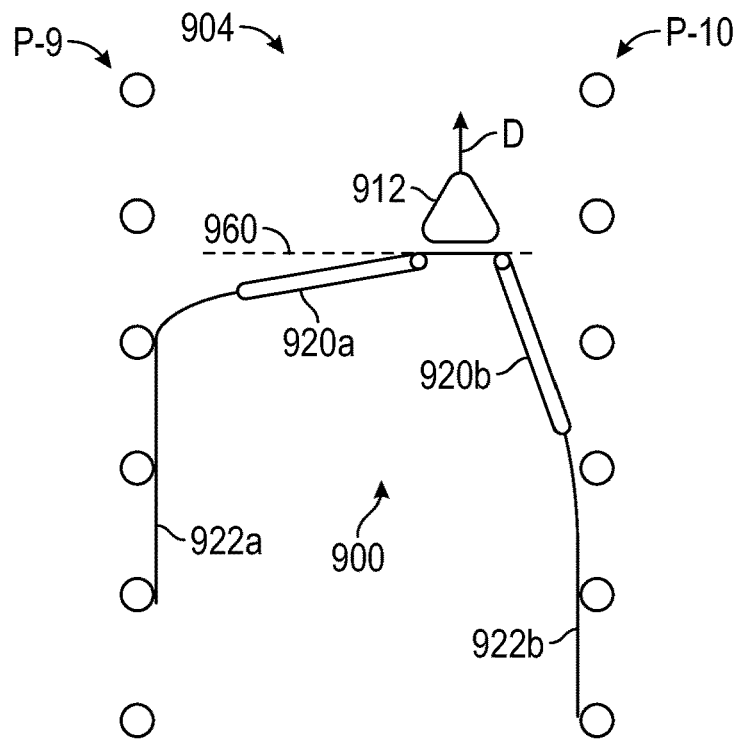
FIG. 9B illustrates a top view 904 in which the linkage members 920a, 920b are biased in a non-centered position between rows of plants in accordance with one embodiment.

In FIG. 9A (top view), the fluid application unit 900 preferably comprises a base 912 to which linkage members 920a, 920b are preferably pivotally connected. The linkage members 920a, 920b are coupled to flexible members 922a, 922b that may contact the rows of plants in operation. In operation, when the flexible members 922a, 922b contact passing plants (e.g., P-9, P-10), the flexible members 922a, 922b preferably cause rearwardly deflection of the linkage members 920a, 920b from a neutral position 960 to a rearward deflection position as illustrated in FIGS. 9A and 9B. A spring element 914, 915 or other biasing element (e.g., spring and hinge) preferably biases the linkage members 920a, 920b into a neutral position 960 to which the linkage members 920a, 920b preferably return when not deflected by a plant or other obstacle. A length of the linkage members 920a, 920b and flexible members 922a, 922b may be designed based on a row spacing (e.g., 20", 30", etc.) with each linkage member 920a, 920b having a length of approximately one half of the row spacing between rows of plants. In one example, the linkage members 920a, 920b may have adjustable lengths depending on the row spacing for a field.

FIG. 9A illustrates a top view 902 in which the linkage members 920a, 920b are biased in a centered position between rows of plants such that the base 912 is approximately equidistant from the plants P-9 and P-10. FIG. 9B illustrates a top view 904 in which the linkage members 920a, 920b are biased in a non-centered position between rows of plants such that the base 912 is laterally positioned closer to the plants P-10 than the plants P-9.

Figure 9C:
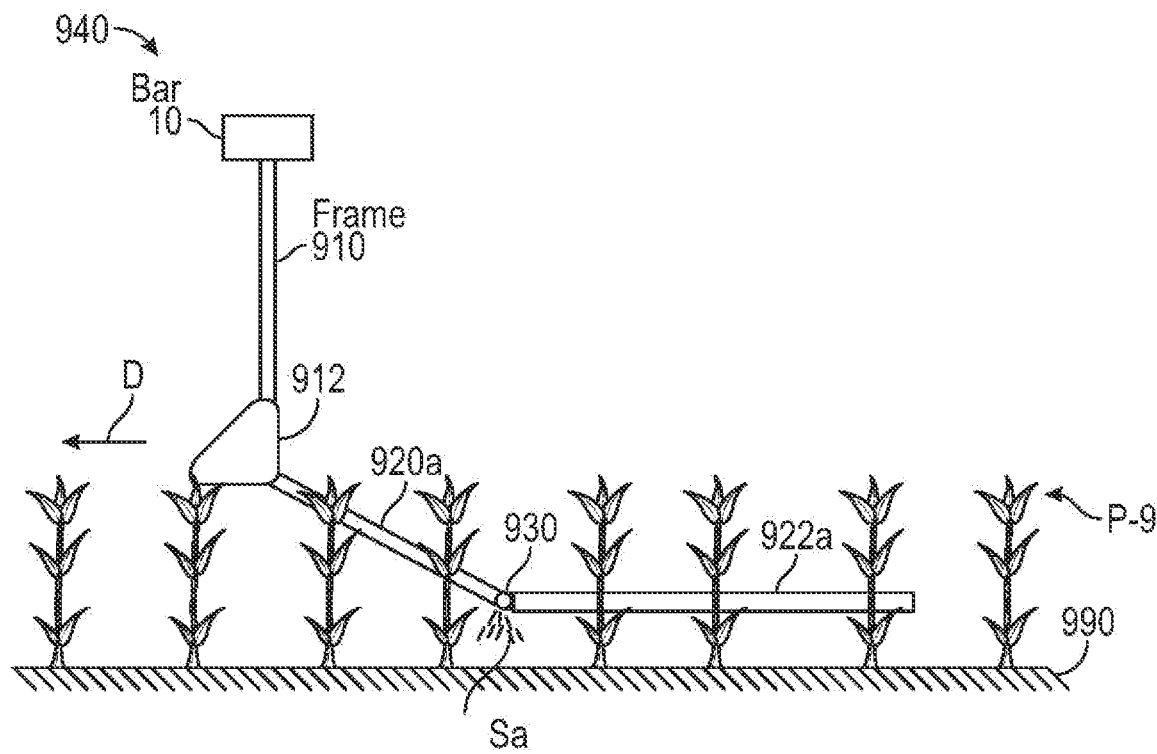
FIG. 9C illustrates a side view 940 of the application unit 900 in accordance with one embodiment.

FIG. 9C illustrates a side view 940 of the application unit 900 in accordance with one embodiment. The application unit 900 is preferably mounted to a transversely extending bar 10 (e.g., toolbar or boom) drawn by a tractor or other implement. A frame 910 (e.g., rigid frame) is coupled to the bar 10 and the base 912. In one example, the base 912 is positioned a certain distance above the ground 990, the linkage members 920a, 920b slope downwards towards the ground, and the flexible members 922a, 922b are positioned in a horizontal plane slightly above the ground (e.g., 1-12 inches above the ground).

A fluid outlet 930 can be positioned with respect to the linkage member 920a, 920b or flexible members 922a, 922b for spraying a fluid in close proximity to the plants. In one example, the fluid outlet 930 is positioned at a distal end of the linkage member 920a, 920b and generates a spray Sa that sprays in a downward directions towards a base region of plants P-9. It should be appreciated that each fluid outlet 930 in the various embodiments described herein is preferably in fluid communication with a source (e.g., tank 250) containing an application (e.g., fluid application, crop inputs such as fertilizer, fungicide, herbicide or insecticide).

Figure 9D:
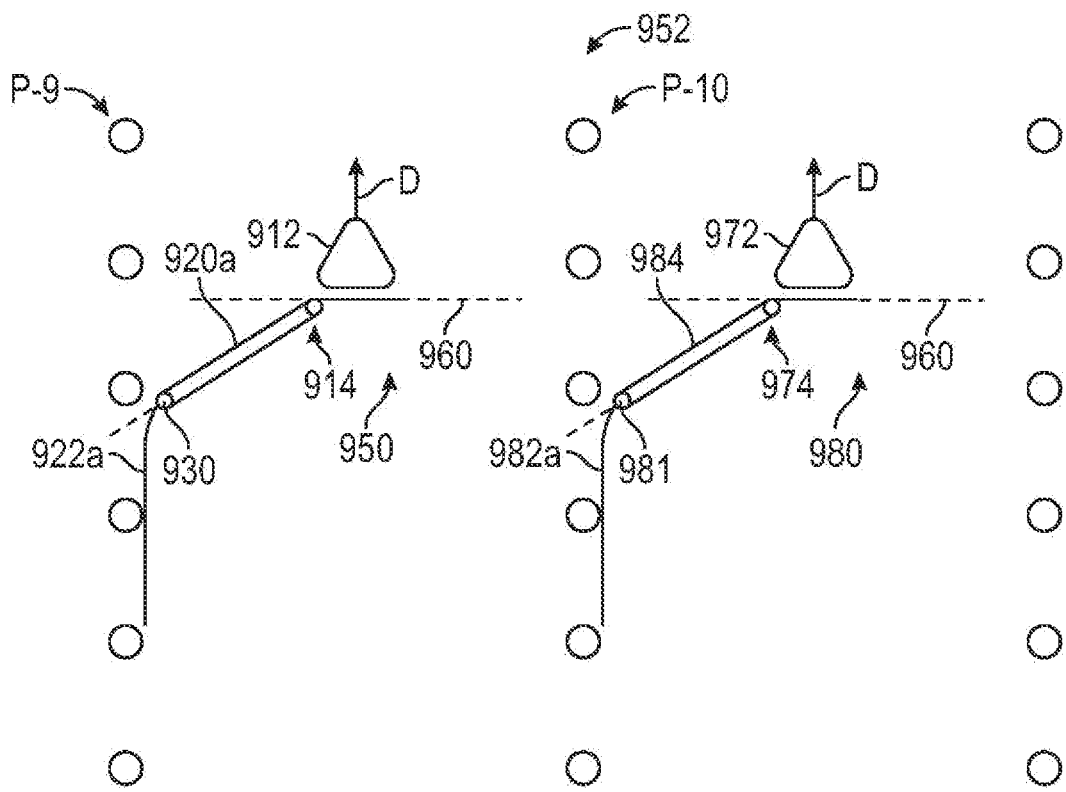
FIG. 9D illustrates a top view 952 of application units 950, 980 (e.g., a fluid application unit) for applying an application to plants P-9, P-10 (e.g., corn plants, soy bean plants, etc.) in accordance with one embodiment.

FIG. 9D illustrates a top view 952 of application units 950, 980 (e.g., a fluid application unit) for applying an application to plants P-9, P-10 (e.g., corn plants, soy bean plants, etc.) in accordance with one embodiment. The application units 950, 980 are preferably mounted to a transversely extending bar 10 (e.g., toolbar or boom) drawn by a tractor or other implement. The application units 950, 980 preferably extend laterally between existing corn plants as the bar 10 illustrated in FIG. 9C traverses the field having a ground surface 990.

In FIG. 9D (top view 952), the fluid application units 950 and 980 preferably each comprise a base 912, 972 to which linkage members 920, 984 are preferably pivotally connected. The base 912 and 972 are each coupled with a frame to a bar 10. The linkage members 920, 984 are coupled to flexible members 922a, 982a that may contact the rows of plants in operation. In operation, when the flexible members 922a, 982a contact passing plants (e.g., P-9, P-10), the flexible members 922a, 982a preferably cause rearwardly deflection of the linkage members 920, 984 from a neutral position 960 to a rearward deflection position as illustrated in FIG. 9D. A spring element 914, 974 or other biasing element (e.g., spring and hinge) preferably biases the linkage members 920, 984 into a neutral position 960 to which the linkage members preferably return when not deflected by a plant or other obstacle. A length of the linkage members 920, 984 and flexible members 922a, 982a may be designed based on a row spacing (e.g., 20", 30", etc.) with each linkage member 920, 984 having a length of approximately one half of the row spacing between rows of plants. In one example, the linkage members 920, 984 may have adjustable lengths depending on the row spacing for a field. Fluid outlets 930, 981 can be positioned with respect to the linkage members 920, 984 or flexible members 922a, 982a for spraying a fluid in close proximity to the plants. In one example, the fluid outlet is positioned at a distal end of the linkage members 920, 984 and generates a spray or dribble that applies in a downward direction towards a base region of plants P-9, P-10.

At least one of the frame 910 and base (e.g., 912, 972) illustrated in FIGS. 9A-9D may be coupled to or include one or more opening discs/coulter (e.g., 811a, 811b, 818, 1318, etc.) for opening a trench in the soil and also optional trench forming members (e.g., trench forming members 860, 862, 1360, 1362, scrapers, knives) for opening shallow trenches in the soil.

Figure 10:
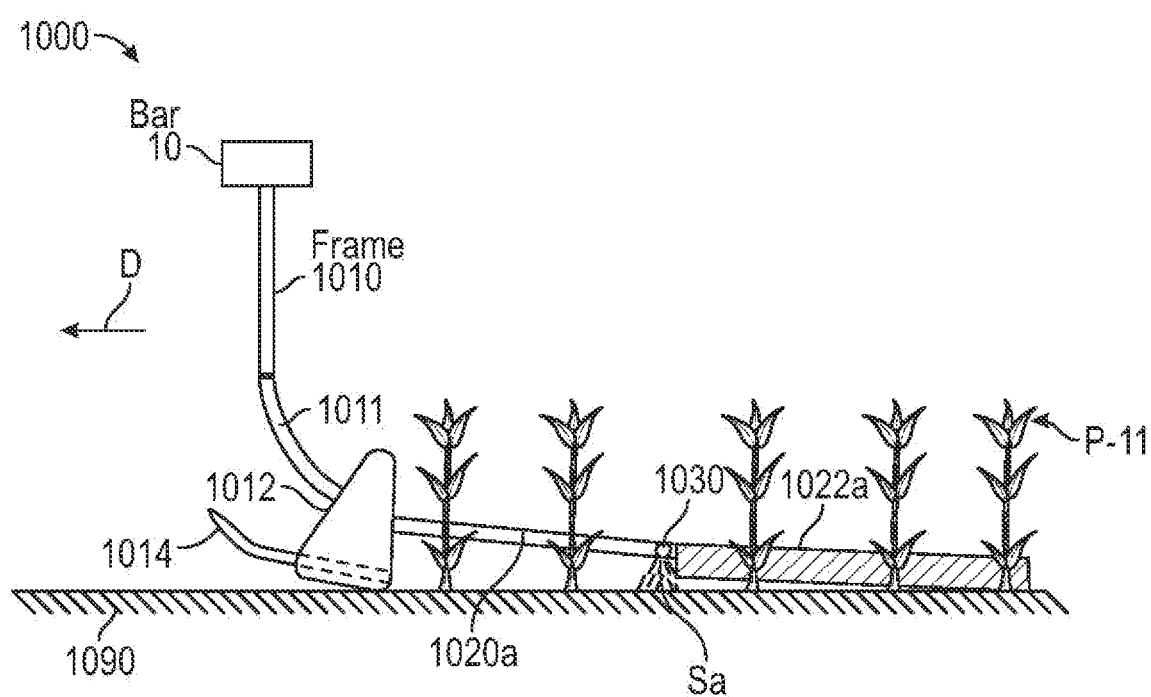
FIG. 10 illustrates a side view of an application unit 1000 in accordance with one embodiment.

FIG. 10 illustrates a side view of an application unit 1000 in accordance with one embodiment. The application unit 1000 is preferably mounted to a transversely extending bar 10 (e.g., toolbar or boom) drawn by a tractor or other implement. A frame 1010 (e.g., rigid frame 1010) is coupled to the bar 10, a flexible frame 1011, and a base 1012. The base 1012 can be coupled to a sloped member 1014 (e.g., ski, ground contacting member) and a linkage member 1020a which is coupled to a flexible member 1022a. In one example, these components of the application unit 1000 function in a similar manner in comparison to the frame, base, linkage members, and flexible members of the application unit 900 except that the base 1012 and flexible member 1022a (or any other flexible member) at least partially contact the ground 1090 while in operation with the application unit 1000 moving in a direction D that is substantially parallel with respect to a row of plants P-11. The sloped member 1014 can partially contact the ground or be in close proximity to the ground to provide a more uniform ground surface for the base 1012 which partially contacts the ground.

A fluid outlet 1030 can be positioned with respect to the linkage member or flexible members for spraying a fluid in close proximity to the plants. In one example, the fluid outlet is positioned at a distal end of the linkage member 1020a and generates a spray Sa that sprays in a downward direction towards a base region of plants P-11. It should be appreciated that each fluid outlet 1030 in the various embodiments described herein is preferably in fluid communication with a source (e.g., tank 250) containing an application (e.g., fluid application, crop inputs such as fertilizer, fungicide, herbicide or insecticide).

In another embodiment, the application unit 1000 does not include flexible member 1022a and the frame 1011 or the frame 1010 may also be optional. At least one fluid outlet (e.g., 1030) sprays the fluid towards a base region of the plants P-11.

Figure 11:
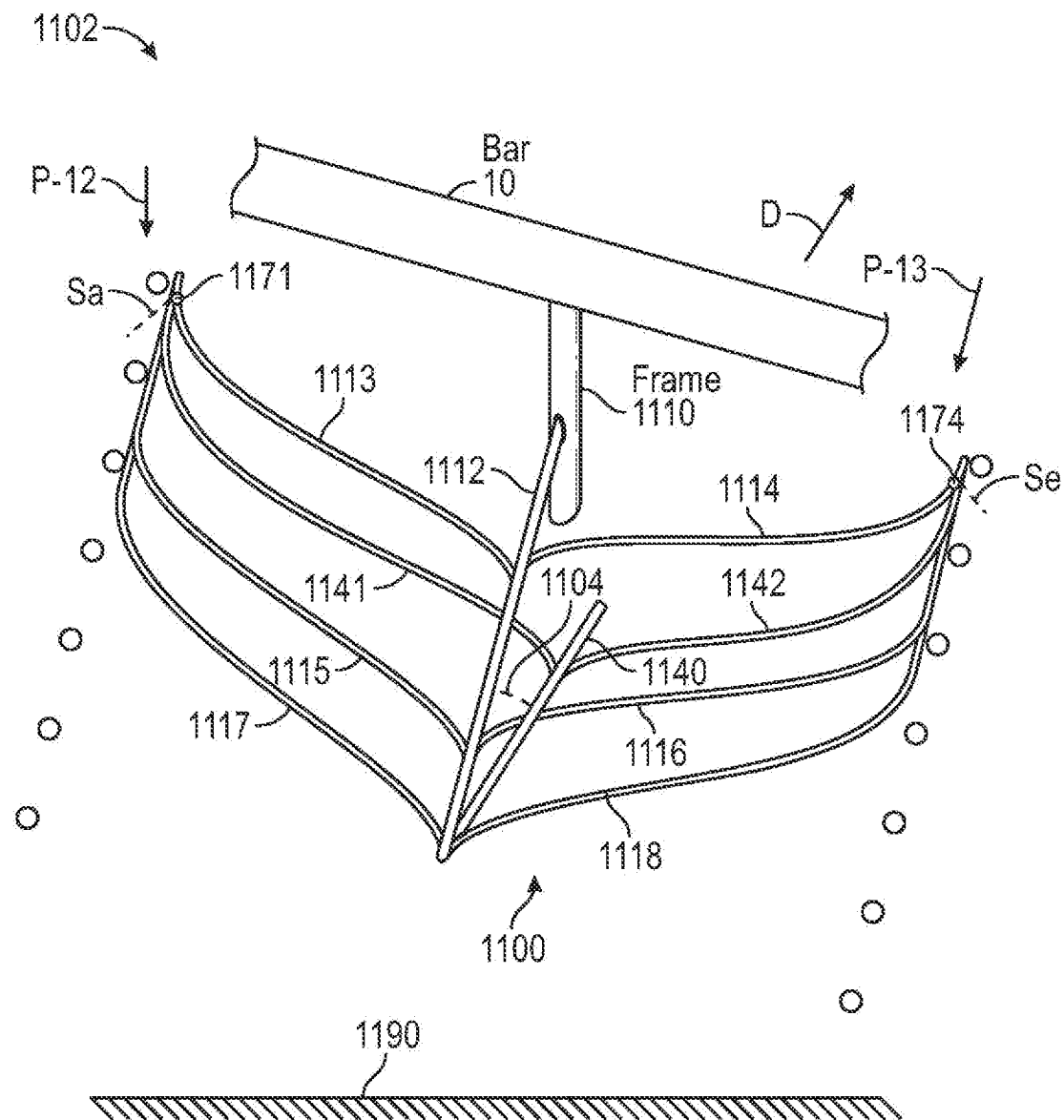
FIG. 11 illustrates a rear view 1102 of an application unit 1100 in accordance with one embodiment.

FIG. 11 illustrates a rear view 1102 of an application unit 1100 in accordance with one embodiment. The application unit 1100 is preferably mounted to a transversely extending bar 10 (e.g., toolbar or boom) drawn by a tractor or other implement. A frame 1110 (e.g., rigid frame 1110) is coupled to the bar 10, a frame 1112 which is coupled to an optional base member 1140 having an angle 1104 with respect to the frame 1112. The base member 1140 is positioned in a plane (e.g., a substantially horizontal plane) above the ground 1190. The frame 1112 provides support for flexible members 1113-1118 and the base member 1140 may also provide support for additional flexible members (e.g., 1141-1142). The flexible members have a neutral position that is parallel to a longitudinal axis of the bar 10 if the flexible members are not in contact with plants or other objects. In operation in which the application unit 1100 moves in a direction D, the flexible members contact rows of plants and bend to provide a lateral position of the frame 1110, 1112, and base member 1140 that is approximately equidistant with respect to rows of plants. The flexible members are arranged on the frame 1112 and optional base member 1140 in a leaf like shape and pattern of flexible members. A distal region of at least a plurality of the flexible members contains fluid outlets 1171 and 1174 for spraying fluid in close proximity to the plants.

In one example, the fluid outlets are positioned approximately 0-10 inches from a distal end of a distal region of the flexible members and generate sprays Sa and Se that spray in a downward direction towards a base region of plants P-12, P-13. It should be appreciated that each fluid outlet in the various embodiments described herein is preferably in fluid communication with a source (e.g., tank 250) containing an application (e.g., fluid application, crop inputs such as fertilizer, fungicide, herbicide or insecticide). Each fluid outlet described herein provides a pressurized spray (e.g., 1-200 psi, 5-100 psi, etc.) in a substantially downward direction towards a base region of a plant. Alternatively, a fluid outlet may dribble liquid (non-pressurized).

Figure 12:
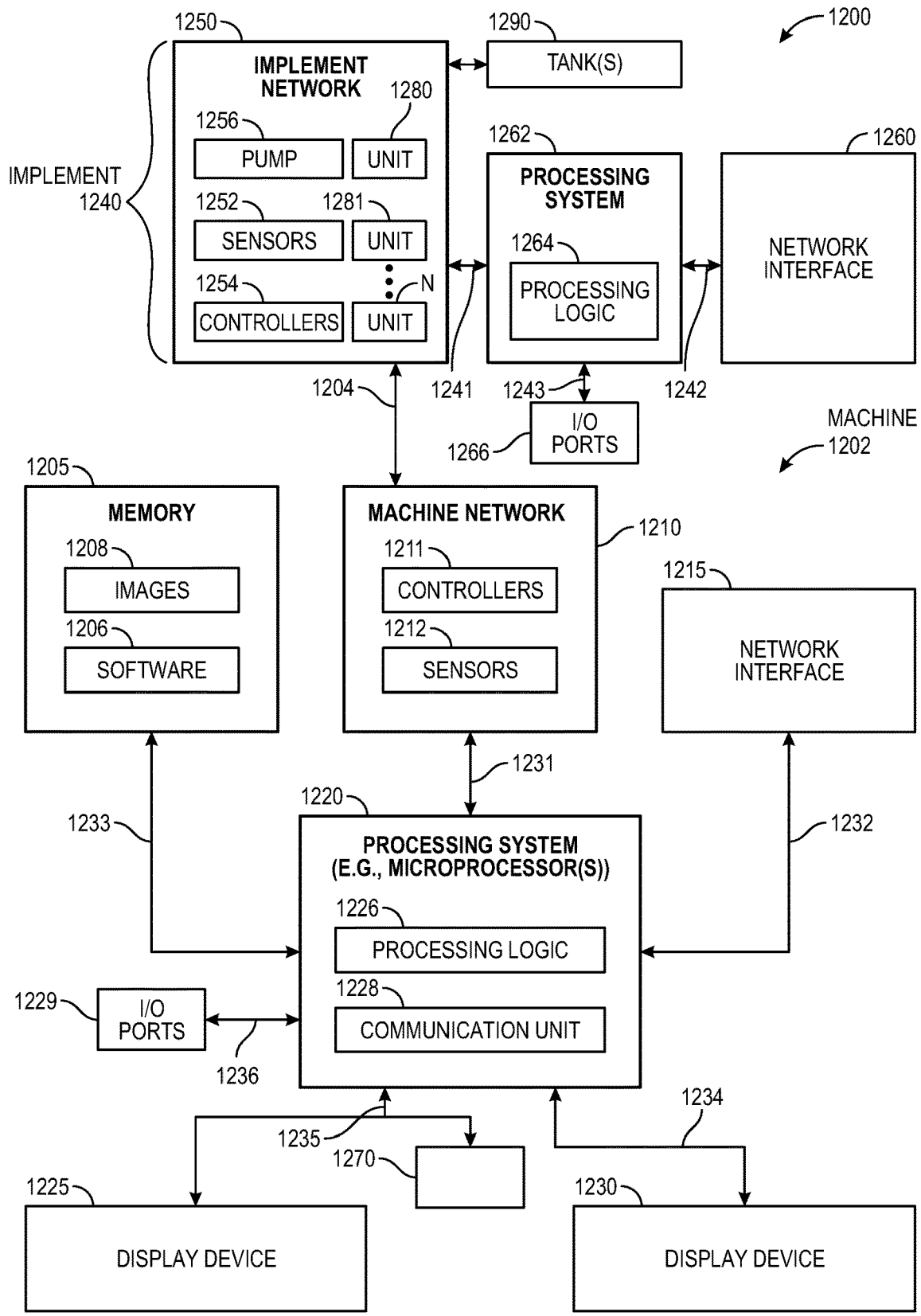
FIG. 12 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 12 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for fluid applications of a field. The flow rate of a fluid application for each row unit of the implement can be associated with locational data at time of application to have a better understanding of the applied fluid for each row and region of a field. Data associated with the fluid applications can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, fluid application data, flow rates, etc.). The system 1200 includes memory 1205 for storing data and programs for execution (software 1206) by the processing system. The memory 1205 can store, for example, software components such as fluid application software for analysis of fluid applications for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1231-1236, respectively.

Display devices 1225 and 1230 can provide visual user interfaces for a user or operator. The display devices may include display controllers. In one embodiment, the display device 1225 is a portable tablet device or computing device with a touchscreen that displays data (e.g., fluid application data, captured images, localized view map layer, high definition field maps of as-applied fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g, a controller area network (CAN) serial bus protocol network, an ISOBUS network, etc.) includes a pump 1256 for pumping fluid from a storage tank(s) 1290 to application units 1280, 1281, . . . N of the implement, sensors 1252 (e.g., speed sensors, seed sensors for detecting passage of seed, downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., fluid application data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 13A:
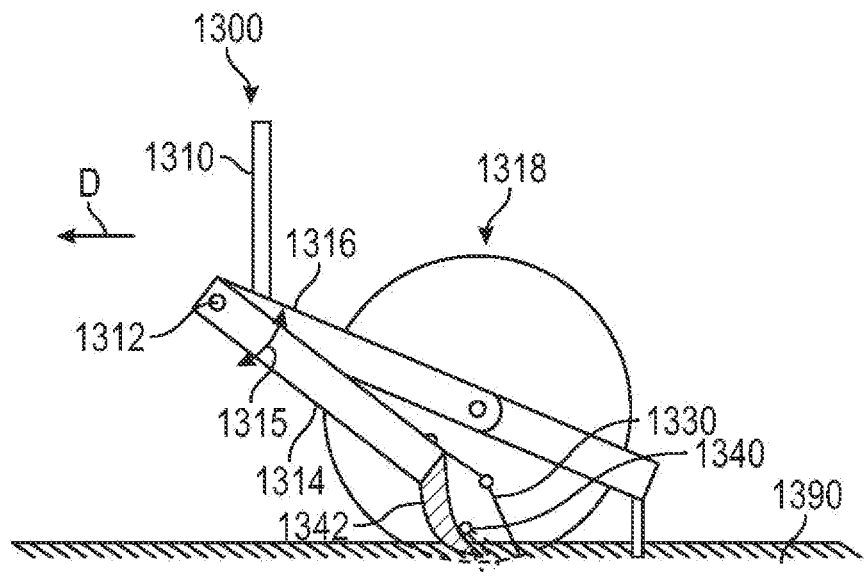
FIG. 13A (side view) illustrates an embodiment of a fluid application unit 1300.

Referring to FIG. 13A (side view), an embodiment of a fluid application unit 1300 is illustrated in accordance with one embodiment. A tractor or other implement pulls multiple side dressing fertilizer coulter units (e.g., application unit 1300). The crop may be at a seedling stage when fertilizer is typically applied as a side dressing slightly offset laterally from each row of seedlings. Each application unit includes a frame 1310, a member 1316 for supporting a coulter wheel 1318 (e.g., single disc, double disc), a member 1314 for supporting a shallow trench forming member 1342 (e.g., scratching knife 1342) for opening a shallow trench in the soil having a shallow depth (e.g., 0-4 inches, 0-2 inches, approximately 1 inch). The frame 1310 preferably includes an internal or externally mounted conduit (not shown) for applying a crop input (e.g., fluid crop input such as anhydrous or other fertilizer, nutrients, etc.) with a fluid outlet 1340 into the shallow trench. A covering tine 1330 (e.g., rake, closing wheel) closes the shallow trench to retain the crop input in the soil (or ground 1390). A spring pivot 1312 allows the member 1314 and fluid outlet 1340 to pivot with a range of motion 1315 with respect to the member 1316.

The frame 1310 may comprise an injection assembly (e.g., sidedress liquid fertilizer injection assembly or anhydrous injection assembly) such as those illustrated in FIG. 7 of U.S. Pat. No. 5,890,445, incorporated herein by reference or in U.S. Pat. No. 8,910,581, incorporated by reference. The frame 1310 and application unit 1300 can be used in combination with any other embodiments of the present disclosure. In one example, the feelers 820a, 820b and fluid outlets 830a, 830b of FIG. 8 are used in combination with the frame 1310 and application unit 1300.

Figure 13B:
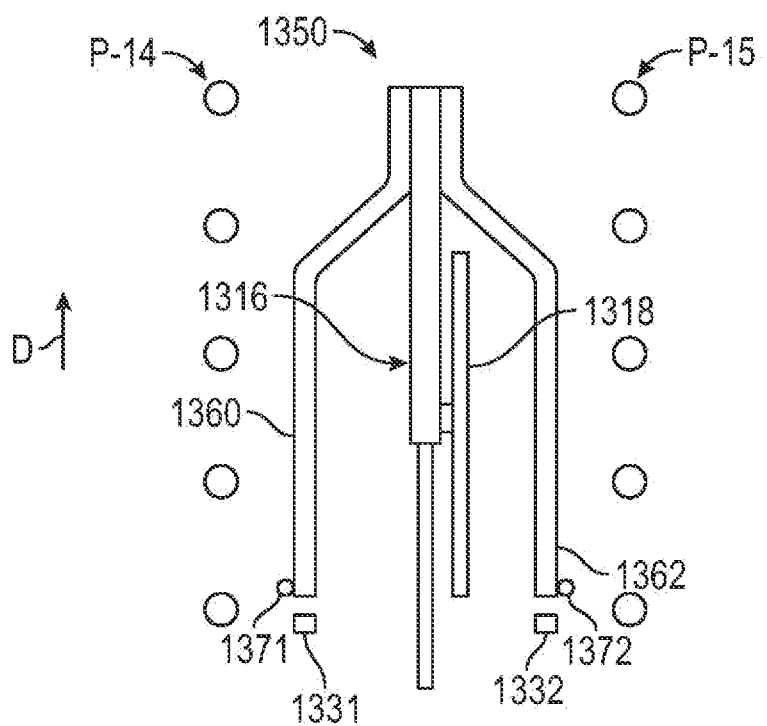
FIG. 13B (top view) illustrates an embodiment of a liquid application unit 1350 having multiple trench forming members (e.g., knives) and fluid outlets.

FIG. 13B (top view) illustrates an embodiment of a liquid application unit 1350 having multiple trench forming members (e.g., knives) and fluid outlets in accordance with one embodiment. A tractor or other implement pulls multiple side dressing fertilizer coulter units (e.g., application unit 1350) for forming a trench having a depth (e.g., 4-8 inches, approximately 5-7 inches, etc.). The crop may be at a seedling stage when fertilizer is typically applied as a side dressing slightly offset laterally from each row of seedlings. Each application unit includes a frame (not shown), a coulter wheel 1318 for forming a deeper trench having a depth (e.g., 4-8 inches, approximately 5-7 inches, etc.), a trench forming member 1360 (e.g., scratching knife 1360) for opening a shallow trench having a shallow depth (e.g., 0-4 inches, 0-2 inches, approximately 1 inch) in proximity to a row of plants P-14, and a trench forming member 1362 (e.g., scratching knife 1362) for opening a shallow trench having a shallow depth (e.g., 0-4 inches, 0-2 inches, approximately 1 inch) in proximity to a row of plants P-15. The frame preferably includes an internal or externally mounted conduit (not shown) for applying a crop input (e.g., fluid crop input such as anhydrous or other fertilizer, nutrients, etc.) with fluid outlets 1371-1372 into a respective trench. Each knife may be associated with a respective covering tine 1331-1332 (e.g., rake, closing wheel) for closing the shallow trench to retain the crop input in the soil (or ground) and prevent the crop input from being volatilized.

In another example, the knife 1342, fluid outlet 1340, and member 1314 may optionally be included with the application unit 1350, coupled to the member 1316, and have a lateral position that is approximately equidistant with respect to the rows of plants P-14, P-15. The knife 1360 has a lateral position that is approximately within 5-10 inches of the plants P-14 while the knife 1362 has a lateral position that is approximately within 5-10 inches of the plants P-15. In this manner, crop input can be supplied at any desired location at any desired depth within approximately 5 inches of a row of plants. Any desired percentage of crop input can be applied to each fluid outlet 1340, 1371-1372 for optimal plant growth. In one example, a first percentage of a crop input is applied to the fluid outlet 1340 and a second percentage of a crop input is applied to the fluid outlets 1371 and 1372.

Where reference is made to a fluid/liquid as to any of the various embodiments disclosed herein, it should be appreciated that any fluid may be similarly transferred and applied by such embodiments; e.g., in a liquid, gaseous, dense phase or transitional phase.

For each of the fluid application unit embodiments described herein, multiple units are preferably disposed along the length of the bar, e.g., such that one, two or more rows of plants are disposed between each unit.

Figure 14:
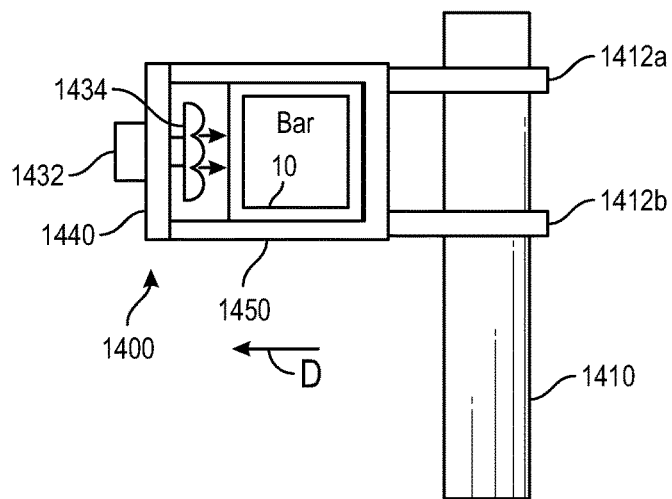
FIG. 14 illustrates an adjustable bracket 1400 for coupling any of the frames described herein to a bar 10 in accordance with one embodiment.

FIG. 14 illustrates an adjustable bracket 1400 for coupling any of the frames described herein to a bar 10 in accordance with one embodiment. The bracket 1400 is preferably adjustable such that the frame (e.g., frames 310, 410, 510, 610, 710, 810, 910) of any of the embodiments disclosed herein may be mounted to any bar (e.g., bar 10) having variable size and cross-sectional shape. In the illustrated embodiment, a rotating member 1432 (e.g., dial 1432) may be manipulated or rotated by the installer to adjust a position of a retaining member 1434 in order to retain the bracket 1400 on bars 10 having various widths. In the illustrated embodiment the bracket 900 includes two separable portions 1440, 1450 which may be separated for installation and then secured to one another such as by bolts (not shown). The frame 1410 may be fixed to the bracket 1400 by U-bolts 1412a, 1412b and/or by any quick coupling structure known in the art.

Figure 15A:
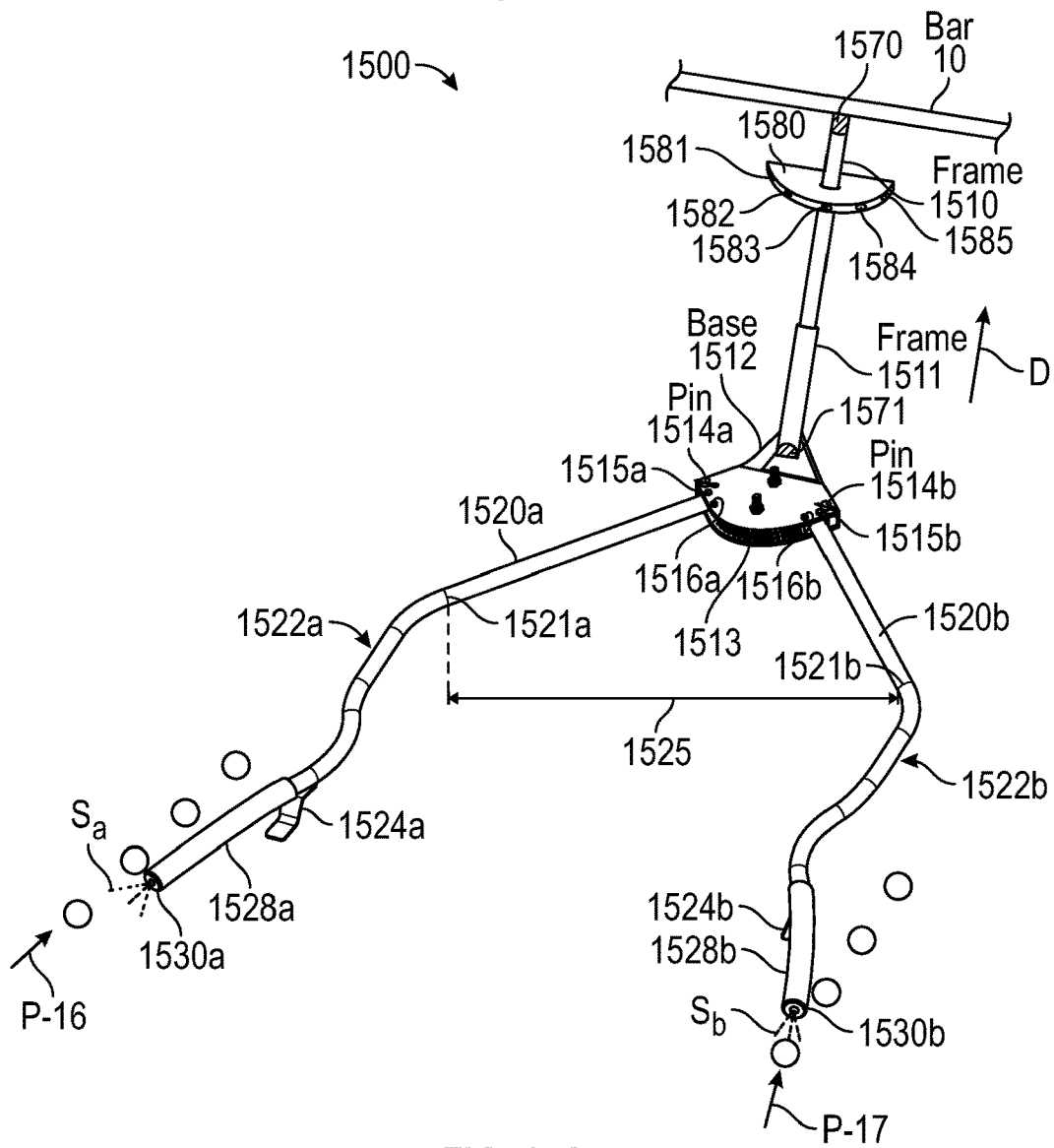
FIG. 15A illustrates an isometric view of an application unit 1500 in accordance with one embodiment.

FIG. 15A illustrates an isometric view of an application unit 1500 in accordance with one embodiment. The application unit 1500 is preferably mounted to a transversely extending bar 10 (e.g., toolbar or boom) drawn by a tractor or other implement. A frame 1510 (e.g., rigid frame 1510) is coupled to the bar 10, a frame 1511 (flexible frame, rigid frame), and a base 1512. It should be appreciated that frame 1510 and 1511 could be a unitary part. The base 1512 includes a biasing element 1513 (e.g., spring) to bias or position linkage members 1520a, 1520b outwards towards rows of plants P-16, P-17. The base 1512 also includes pins 1514a, 1514b positioned in holes to set a width for biasing of the linkage members for different crop row spacing. The base 1512 includes additional holes 1515a, 1515b and 1516a, 1516b to reduce a width of the linkage members 1520a, 1520b to adjust for different crop row spacing or for different types of crops. For a turn of a tractor and an implement having a plurality of application units 1500, the biasing element and pins cause the flexible members to flex inwards.

Optionally, a rotating swivel 1570 or 1571 can be disposed between bar 10 and frame 1510 and/or between frame 1511 and base 1512. The degree of rotation can be any desired degree, but actual rotation will be limited by the movement in the rows. Having a rotating swivel 1570 or 1571 provides more flexibility during use to keep application unit 1500 in the row without providing too much force on the plants.

The biasing element 1513 biases angular positions of the first and second linkage members 1520a and 1520b such that distal ends 1521a, 1521b of the linkage members have a spacing 1525 that is similar to a row spacing of the rows of plants P-16, P-17.

Figure 15B:
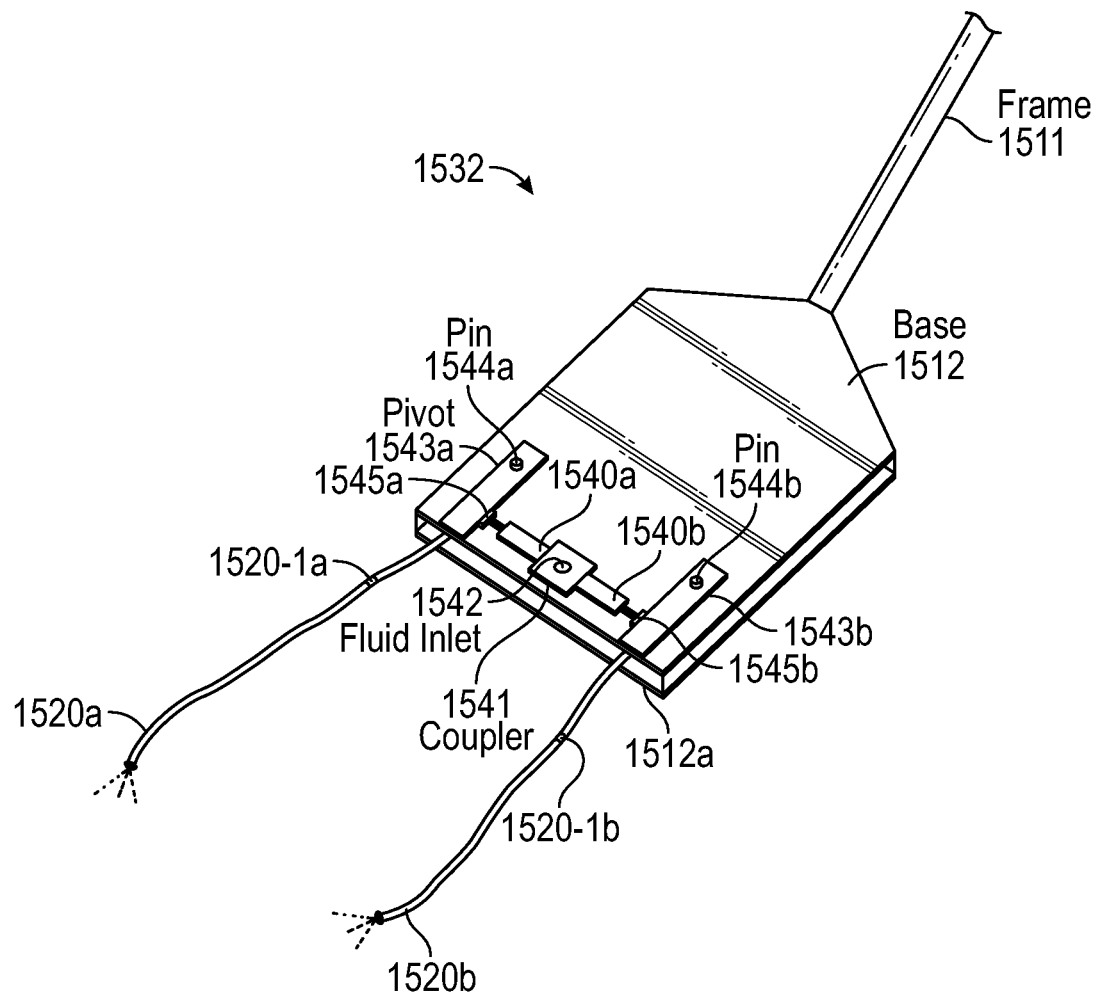
FIG. 15B illustrates an isometric view of a fluid biasing system for use with application unit 1532 in accordance with one embodiment.

In another embodiment, biasing element 1513 can be replaced with a pressure actuated biased return pistons 1540a and 1540b shown in an isometric view of an application unit 1532 in FIG. 15B. Pressure actuated biased return pistons 1540a and 1540b are oppositely disposed and coupled with a coupler 1541, which has a fluid inlet 1542 for supplying pressure to pressure actuated biased return pistons 1540a and 1540b through the coupler 1541. The pistons in the pressure actuated biased return pistons 1540a and 1540b are in communication with pivots 1543a and 1543b, respectively, disposed on base 1512 at the edges of base 1512. Pivots 1543a and 1543b are disposed on base 1512 via pins 1544a and 1544b, respectively. Linkage members 1520a and 1520b are disposed on pivots 1543a and 1543b, respectively. Linkages 1520a and 1520b have fluid inlets 1520-1a and 1520-1b, respectively, and are in fluid communication with the fluid system. Pressure actuated biased return pistons 1540a and 1540b connect to pivots 1543a and 1543b between pins 1544a and 1544b and base edge 1512a. As shown in FIG. 15B, pressure actuated biased return pistons 1540a and 1540b are directly connected to pivots 1543a and 1543b, respectively, but they could also be connected through optional pivot connections 1545a and 1545b, respectively, similar to connectors 1705a and 1705b in FIG. 17A.

Figure 17A:
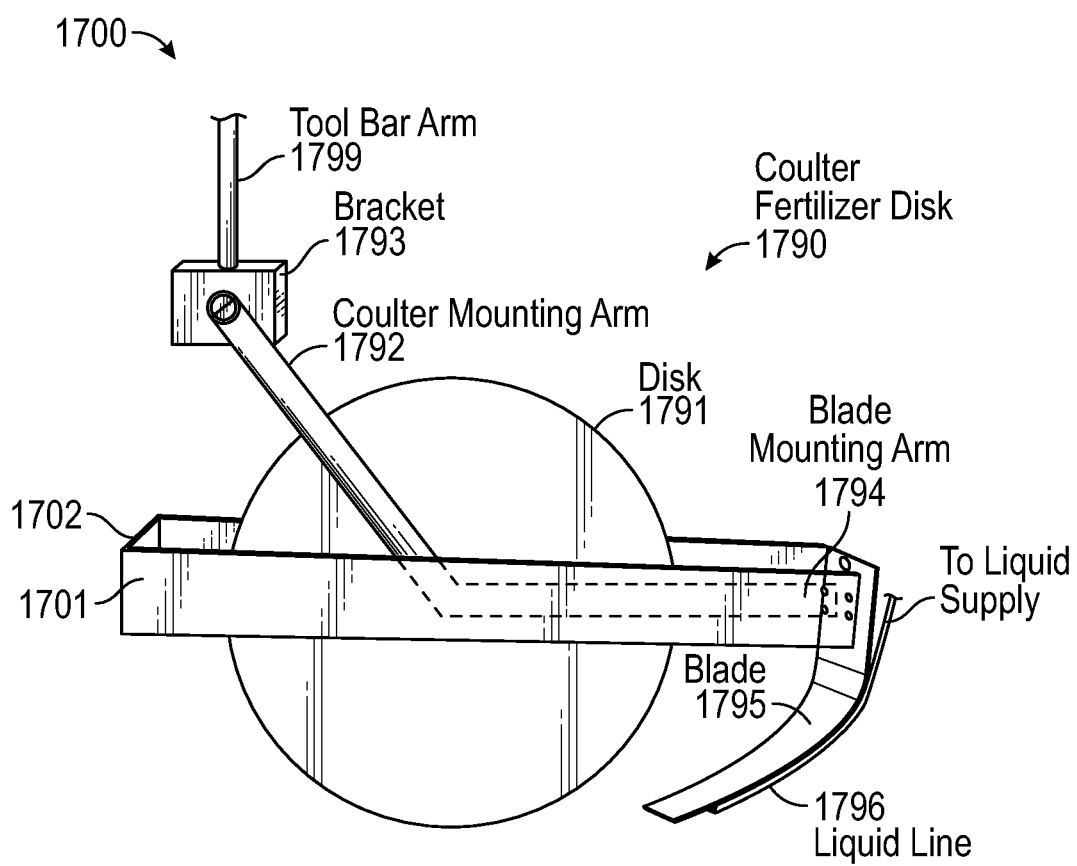
FIG. 17A illustrates an isometric view of an application unit 1700 in accordance with one embodiment.

Similar to as shown in FIG. 15B for the pressure actuated biased return pistons that are similar to the pressure actuated biased return pistons in FIG. 17A, any of the embodiments in FIGS. 17D to 19C can also be disposed on base 1512.

The fluid to drive the pistons can be from the fluid, or it can be from a pneumatic or hydraulic system on the toolbar (not shown). With the fluid system, when fluid is applied, the pressure in the fluid system will cause the pressure actuated biased return pistons 1540*a* and 1540*b* to bias outwards to the edge of base 1512. When the fluid application is turned off, the biased return in the pressure actuated biased return pistons 1540*a* and 1540*b* will bias the piston toward the middle of base 1512. For the pneumatic or hydraulic system, these can be activated manually or automatically when the fluid system is turned on.

The benefit of having the dual direction biasing is that the linkage members 1520*a* and 1520*b* will bias outwards towards the plants during fluid application, and will bias toward the middle of the row when the fluid system is not on. By having the linkage members 1520*a* and 1520*b* bias toward the middle of the row, application unit (e.g., 1500, 1532, etc.) can be reversed down the row. This can be helpful when steering causes misalignment in a row, and the application unit (e.g., 1500, 1532) needs to back up to correct the steering. If linkage members 1520*a* and 1520*b* are always biased towards the plants, they would catch and fold over the plants if run in a reversed direction.

The linkage members 1520*a*, 1520*b* are coupled to flexible members 1522*a*, 1522*b* respectively. In one example, the linkage members position the flexible members 1522*a*, 1522*b* in close proximity to a target region of the plants. The flexible members 1522*a*, 1522*b* can be any type of flexible material (e.g., hoses) or can be replaced with pipes. It should be appreciated that linkage members 1520*a*, 1520*b* and flexible members 1522*a*, 1522*b*, respectively, can be made as unitary parts. In one example, these components of the application unit 1500 function in a similar manner in comparison to the frame, base, linkage members, and flexible members of the application unit 1000 with the ground contacting members 1524*a*, 1524*b* (e.g., ski, skid, wear element, etc.) at least partially contacting the ground while in operation with the application unit 1500 moving in a direction D that is substantially parallel with respect to rows of plants P-16 and P-17. The ground contacting members 1524*a*, 1524*b* substantially prevent the flexible members 1522*a*, 1522*b* from contacting the ground and thus reduce wear on the flexible members 1522*a*, 1522*b*. The ground contacting members 1524*a*, 1524*b* also position the flexible members 1522*a*, 1522*b* to be slightly elevated (e.g., 0 to 3 inches) above the ground.

Fluid outlets 1530*a*, 1530*b* (e.g., spray nozzle, drip mechanism) are positioned with respect to a distal portion 1528*a*, 1528*b* of flexible members 1522*a*, 1522*b* for spraying a fluid in close proximity to the plants. In one example, the fluid outlets are positioned at a distal end of the distal portions of the flexible members and generate a spray Sa, Sb that sprays in a downward direction towards a base region of plants P-16, P-17, respectively. It should be appreciated that each fluid outlet in the various embodiments described herein is preferably in fluid communication with a source (e.g., tank 250) containing an application (e.g., fluid application, crop inputs such as fertilizer, fungicide, herbicide or insecticide).

In another embodiment, the application unit 1500 optionally includes a housing member 1580 for positioning a plurality of fluid outlets (e.g., 1581-1585) at a plurality of different angles (e.g., angled down towards ground, angle outwards from the housing member 1580) having a maximum range of approximately 180 degrees. Additional or fewer fluid outlets can be positioned with the housing member 1580. Each fluid outlet can have a fixed position or an adjustable angular position for spraying a fluid towards a base region of the plants or towards a certain target region between the rows of plants P-16, P-17. The fluid sprayed by the fluid outlets 1581-1585 can be the same fluid that is spraying by the fluid outlets 1530*a*, 1530*b* or this fluid can be different. In one example, the fluid outlets 1581-1585 spray a fungicide.

The frame (e.g., 1510, 1511), base, linkage members, and flexible members preferably include an internal or externally mounted conduit (not shown) for applying a crop input (e.g., fluid crop input such as anhydrous or other fertilizer, nutrients, etc.) towards a target region of the plants or into trenches. The frame may comprise an injection assembly (e.g., sidedress liquid fertilizer injection assembly or anhydrous injection assembly) such as those illustrated in FIG. 7 of U.S. Pat. No. 5,890,445, incorporated herein by reference or in U.S. Pat. No. 8,910,581, incorporated by reference; the fluid outlets, as well as related linkage structure are preferably fixed to the sides of such an injection assembly for spraying or dribbling a liquid on nearby plants or towards a target region of the plants.

Figure 16:
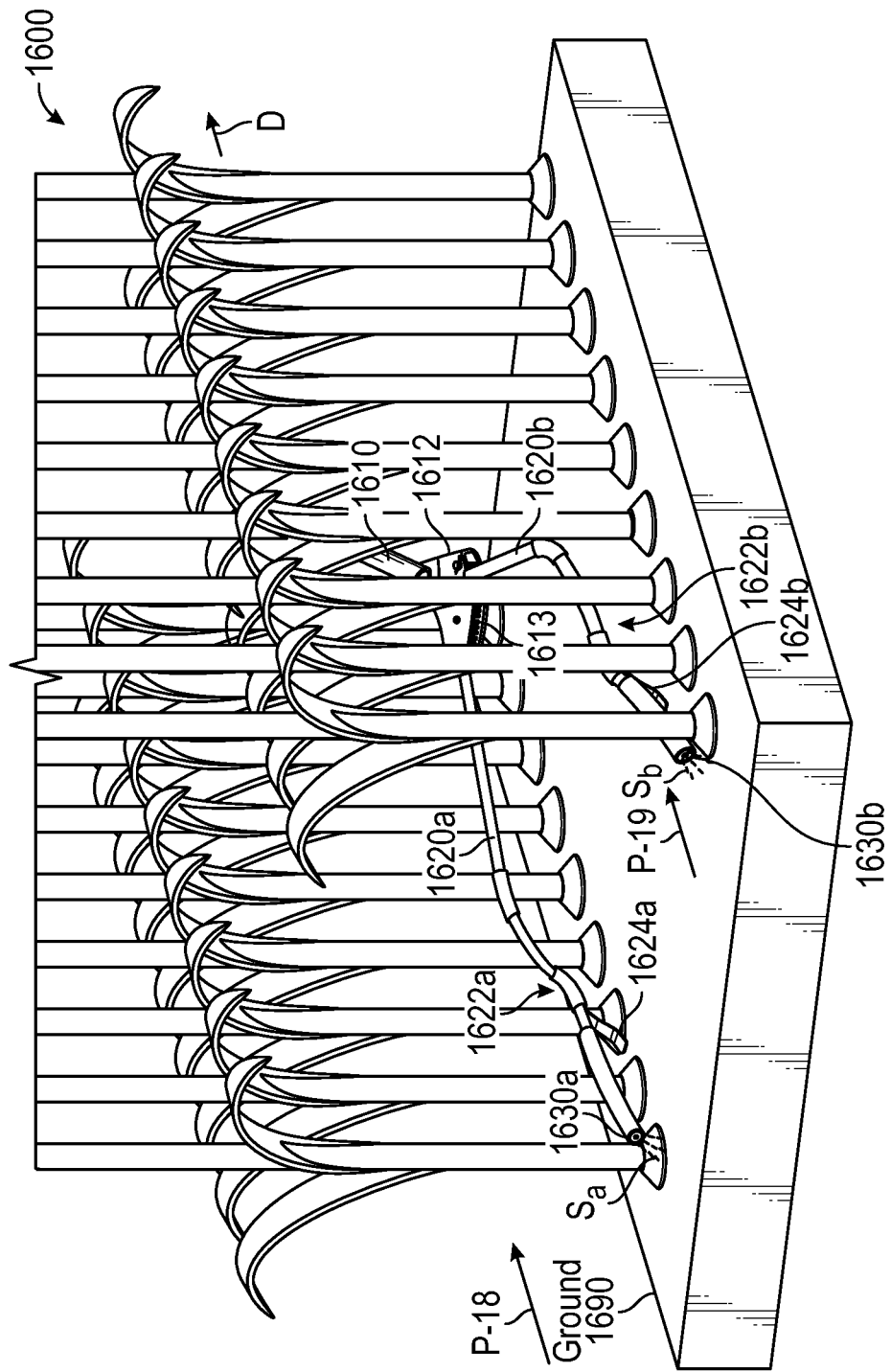
FIG. 16 illustrates an isometric view of an application unit 1600 positioned in proximity to rows of plants in accordance with one embodiment.

FIG. 16 illustrates an isometric view of an application unit 1600 positioned in proximity to rows of plants in accordance with one embodiment. The application unit 1600 includes similar components and functionality in comparison to the application unit 1500 of FIG. 15. The application unit 1600 is preferably mounted to a transversely extending bar 10 (not shown in FIG. 16) drawn by a tractor or other implement. A frame 1610 (e.g., 1510, 1511) is coupled to the bar 10, and a base 1612. The base 1612 includes a biasing element 1613 (e.g., spring) to bias or position linkage members 1620*a*, 1620*b* outwards towards rows of plants P-18, P-19. The linkage members 1620*a*, 1620*b* are coupled to flexible members 1622*a*, 1622*b* respectively. The flexible members can be any type of flexible material (e.g., hoses) or can be replaced with pipes. In one example, the ground contacting members 1624*a*, 1624*b* (e.g., ski, skid, wear element, etc.) at least partially contact the ground 1690 while in operation with the application unit 1600 moving in a direction D that is substantially parallel with respect to rows of plants P-18 and P-19. The ground contacting members 1624*a*, 1624*b* substantially prevent the flexible members 1622*a*, 1622*b* from contacting the ground and thus reduce wear on the flexible members 1622*a*, 1622*b*. The ground contacting members 1624*a*, 1624*b* also position the flexible members 1622*a*, 1622*b* to be slightly elevated (e.g., 0 to 3 inches) above the ground.

Fluid outlets 1630*a*, 1630*b* (e.g., spray nozzle, drip mechanism) are positioned with respect to a distal end of flexible members for spraying a fluid in close proximity to the plants. In one example, the fluid outlets generate spray Sa, Sb that sprays in a downward direction towards a base region of plants P-18, P-19, respectively. It should be appreciated that each fluid outlet in the various embodiments described herein is preferably in fluid communication with a source (e.g., tank 250) containing an application (e.g., fluid application, crop inputs such as fertilizer, fungicide, herbicide or insecticide).

FIG. 17A illustrates an isometric view of an application unit 1700 for mounting to a coulter fertilizer disc 1790. Coulter fertilizer disc 1790 has a toolbar arm 1799 for connection to bar 10. Attached to toolbar arm 1799 is a bracket 1793 for connecting coulter mounting arm 1792. At the opposing end, disc 1791 is mounted to coulter mounting arm 1792 along with blade mounting arm 1794 disposed rearward of the direction of travel of coulter fertilizer disc 1790. Connected to blade mounting arm 1794 is a blade 1795 (or a sprayer not shown) with fluid line 1796. Application unit 1700 has a bracket 1701 (generally shown with a U shape) that connects to where blade 1795 (or sprayer) connects to blade mounting arm 1794 with a closed end of the bracket 1702 forward of disc 1791. Application unit 1700 is used in conjunction with the embodiments of FIGS. 17B to 19C below, which show application unit 1700 in partial.

Figure 17B:
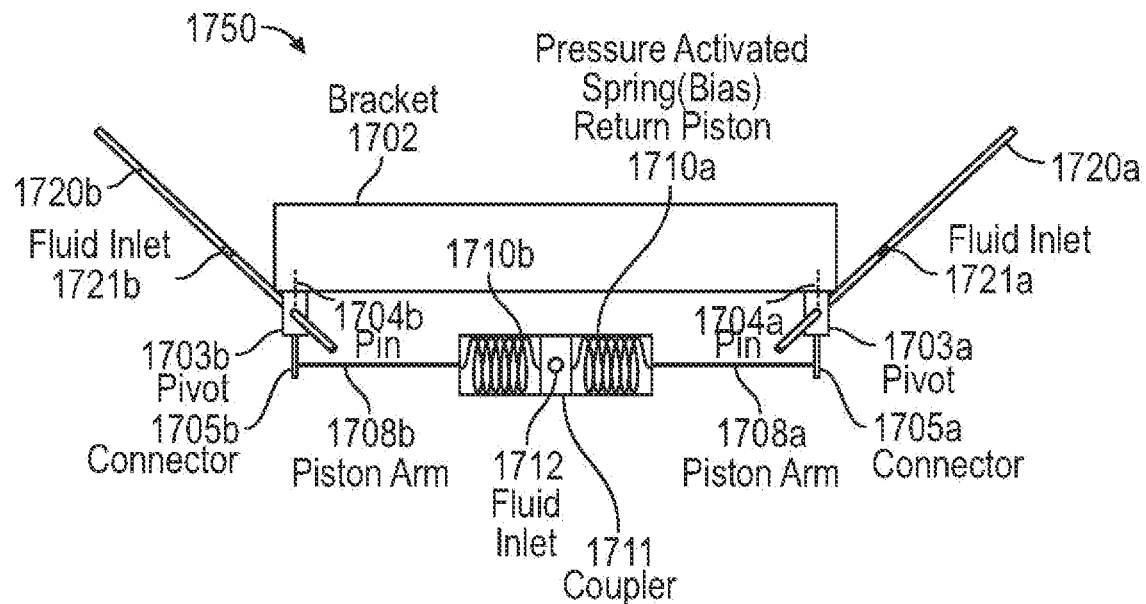
FIG. 17B illustrates an isometric view of an application unit 1750 in accordance with one embodiment.
Figure 17C:
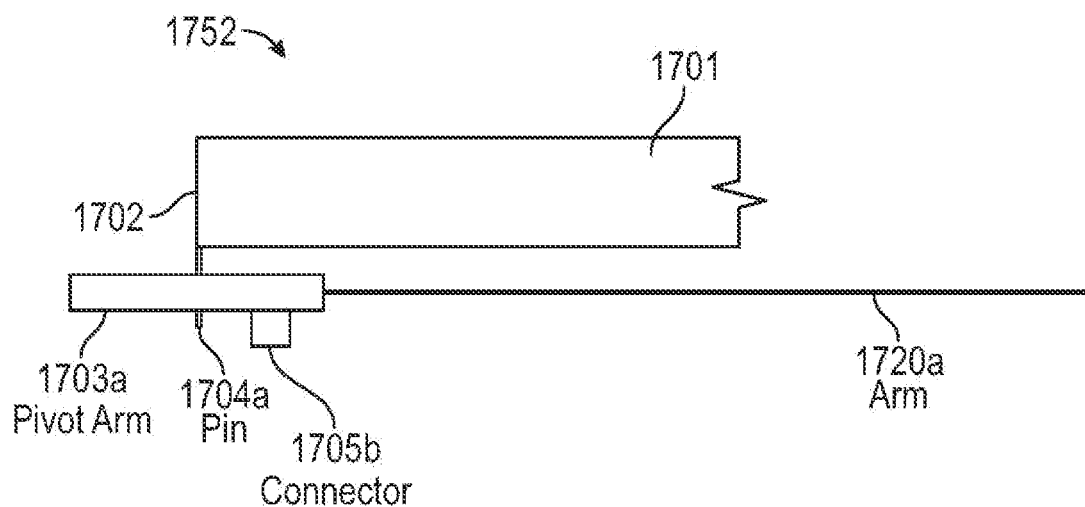
FIG. 17C illustrates a side view of an application unit 1752 in accordance with one embodiment.

Disposed near closed end of the bracket 1702 are pivots 1703a and 1703b that are disposed on bracket 1701 through pins 1704a and 1704b, respectively as illustrated in isometric view 1750 of FIG. 17B and side view 1752 of FIG. 17C in accordance with one embodiment. Actuating the pivots 1703a and 1703b are pressure actuated biased return pistons 1710a and 1710b, respectively. Pressure actuated biased return pistons 1710a and 1710b can directly connect to pivots 1703a and 1703b as shown in FIG. 15B for pressure actuated biased return pistons 1540a and 1540b to pivots 1543a and 1543b. Alternatively, pressure actuated biased return pistons 1710a and 1710b can connect through piston arms 1708a and 1708b, respectively, and connectors 1705a and 1705b, respectively, to pivots 1703a and 1703b, respectively. In either embodiment, the connection on the side of the pins 1704a and 1704b is away from closed end of the bracket 1702. Disposed between pressure actuated biased return pistons 1710a and 1710b is a coupler 1711 having a fluid inlet 1712. Connected to pivots 1703a and 1703b are linkages 1720a and 1720b, respectively. Linkages 1720a and 1720b (e.g., arms) have fluid inlets 1721a and 1721b, respectively, and are in fluid communication with the fluid system.

The fluid to drive the pistons is described above for application unit 1500.

Figure 17D:
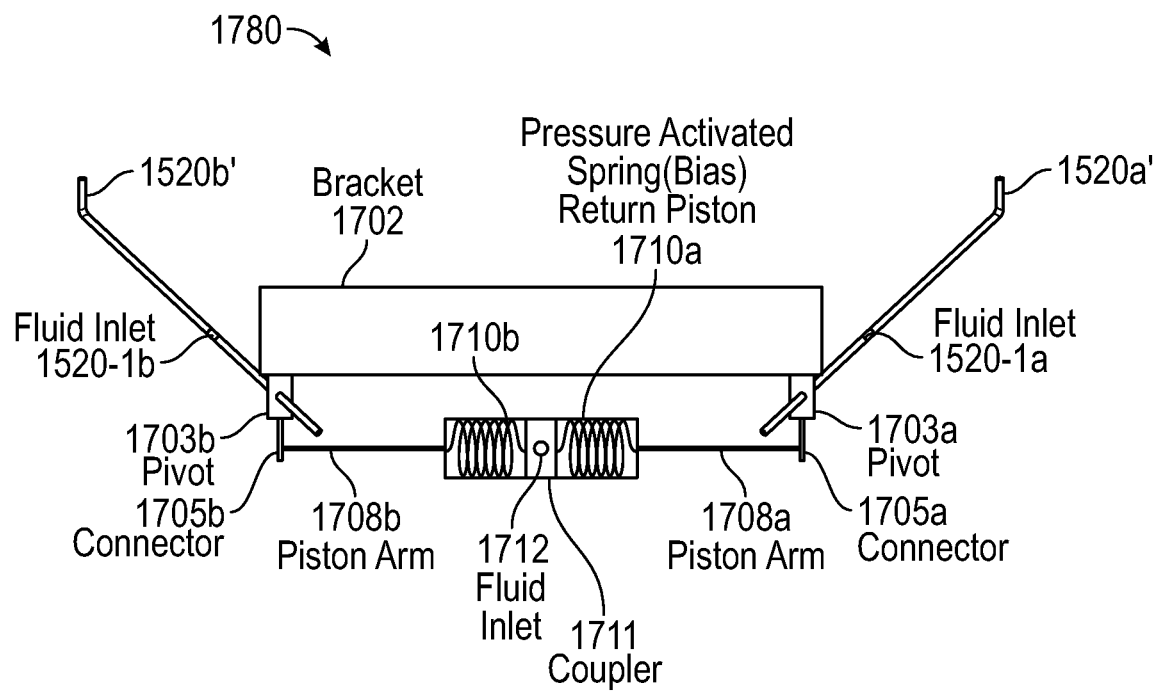
FIG. 17D illustrates an isometric view of an application unit 1780 in accordance with another embodiment.

FIG. 17D illustrates an isometric view of an application unit 1780 in accordance with another embodiment. This application unit 1780 includes similar components in comparison to the components of application unit 1750 of FIG. 17B, except that linkage members 1520a' and 1520b' include distal portions that curve inwards towards each other. Any of the other embodiments discussed herein may also have linkage members 1520a and 1520b having a similar inwards curvature.

Figure 18A:
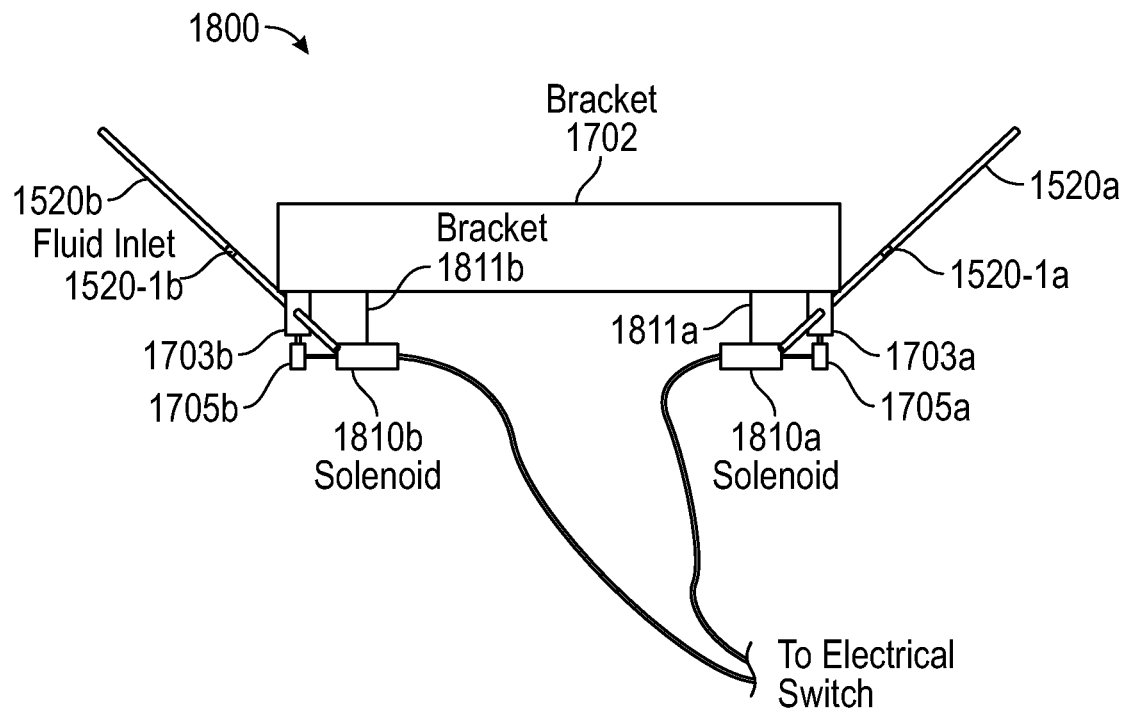
FIG. 18A illustrates an isometric view of a solenoid actuated system for use with application unit 1700 in accordance with one embodiment.
Figure 18B:
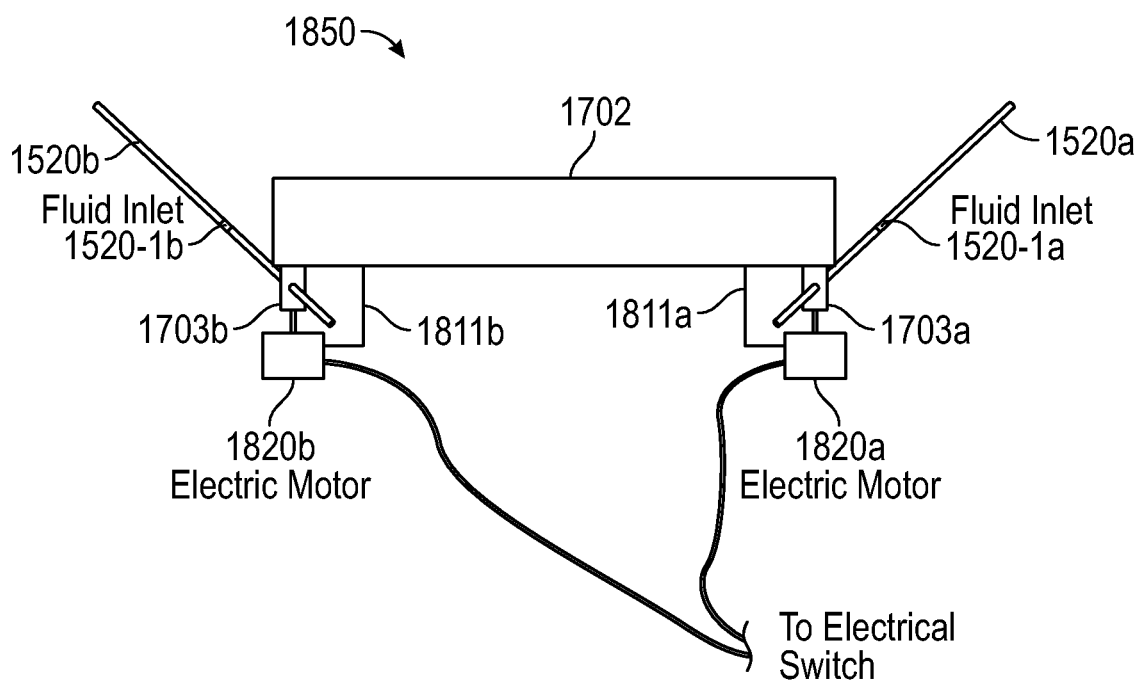
FIG. 18B illustrates an isometric view of a motor actuated system for use with application unit 1700 in accordance with one embodiment.

In other alternatives shown in FIGS. 18A and 18B, the fluid actuation with the pressure actuated biased return pistons 1710a and 1710b are replaced by solenoids 1810a and 1810b, which are disposed on bracket 1702 via brackets 1811a and 1811b, respectively, as illustrated in application unit 1800 of FIG. 18A. Solenoids 1810a and 1810b are activated by an electrical switch (not shown). In place of solenoids 1810a and 1810b can be electric motors 1820a and 1820b, respectively, as illustrated in application unit 1850 of FIG. 18B.

Figure 19A:
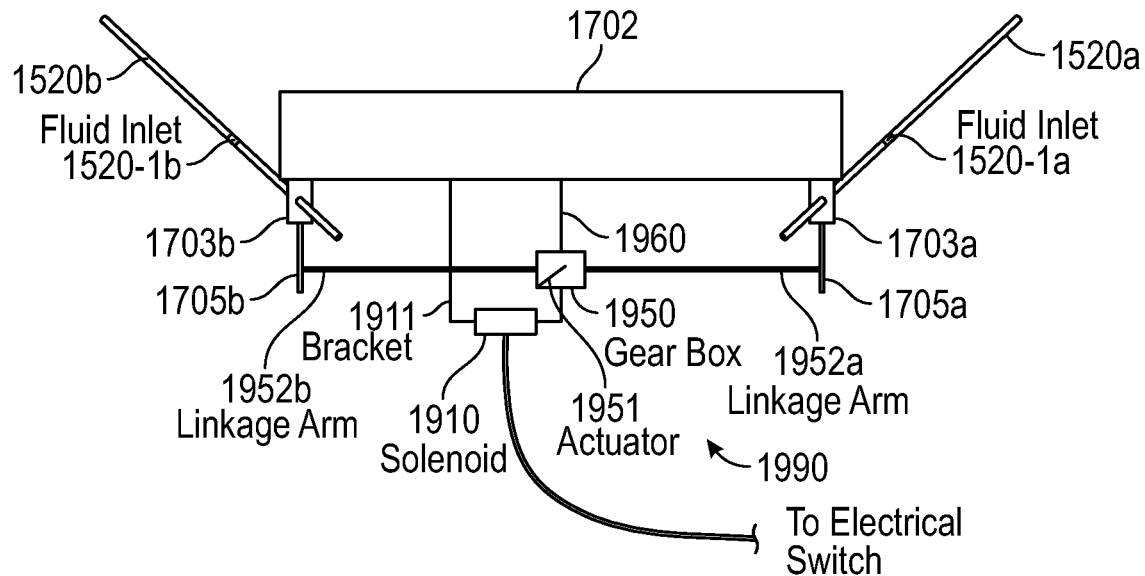
FIG. 19A illustrates an isometric view of a linkage system actuated with a solenoid for use with application unit 1700 in accordance with one embodiment.
Figure 19B:
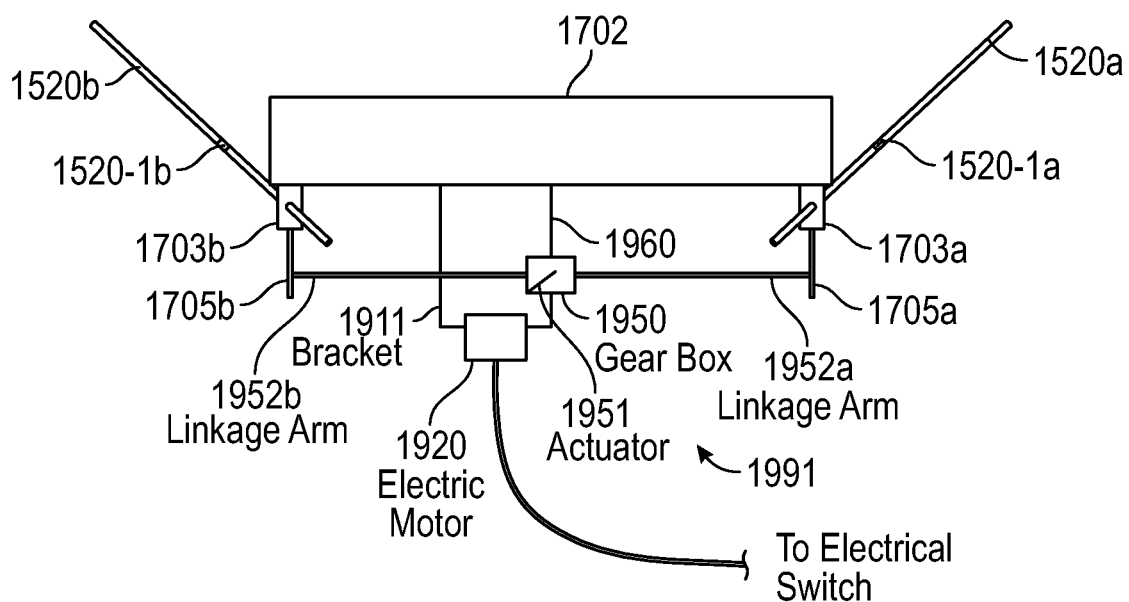
FIG. 19B illustrates an isometric view of a linkage system actuated with a motor for use with application unit 1700 in accordance with one embodiment.
Figure 19C:
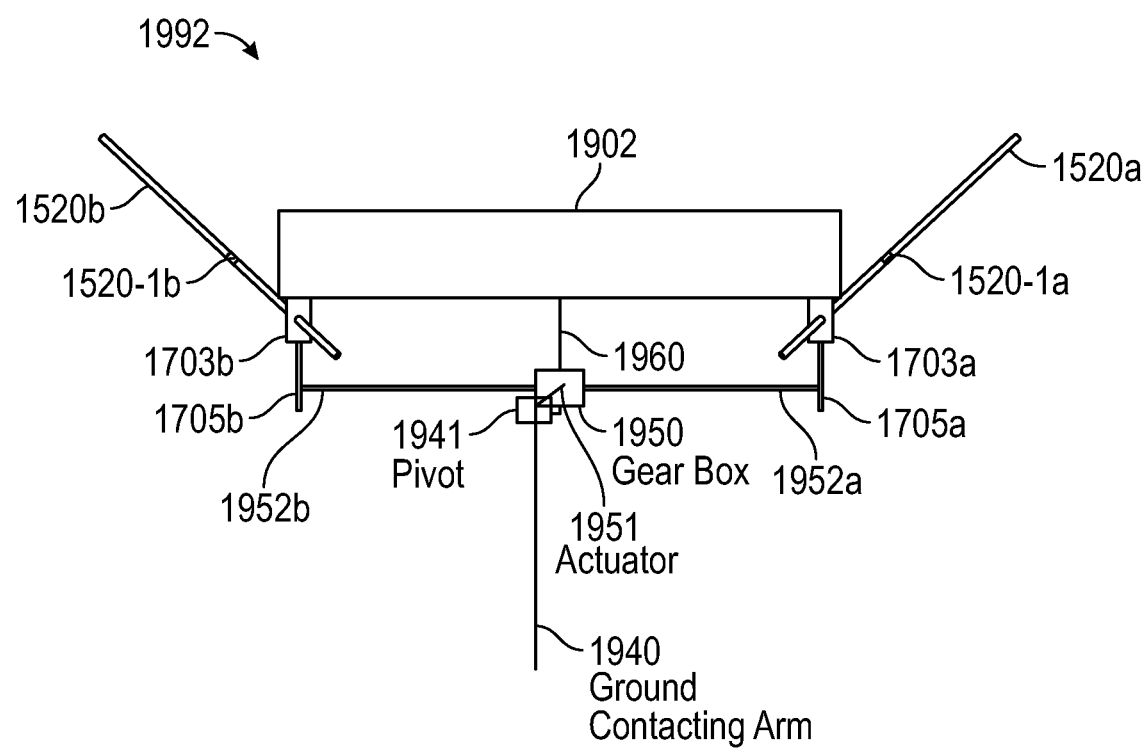
FIG. 19C illustrates an isometric view of a linkage system actuated with a ground contacting arm for use with application unit 1700 in accordance with one embodiment.

In other alternatives shown in linkage systems 1990-1992 of FIGS. 19A to 19C, respectively, the fluid actuation with the pressure actuated biased return pistons 1710a and 1710b are replaced by linkage system 1990, which is disposed on bracket 1702 via bracket 1960. Linkage system 1990 has an actuator 1951 in communication with gear box 1950 for acting on linkage arms 1952a and 1952b. Linkage arms 1952a and 1952b are connected to connectors 1705a and 1705b, respectively, or directly to pivots 1703a and 1703b, respectively (not shown). Actuator 1951 can be actuated by solenoid 1910 in FIG. 19A or electrical motor 1920 of linkage system 1991 in FIG. 19B, which are disposed on bracket 1702 via bracket 1911. Solenoid 1910 and electrical motor are activated by an electrical switch (not shown). Alternatively, actuator 1951 can be actuated by ground contacting arm 1940 of linkage system 1992 as illustrated in FIG. 19C. When ground contacting arm 1940 contacts the ground, ground contacting arm causes pivot 1941 to pivot and actuate actuator 1951.

The linkage members (arms) discussed herein can be actuated with solenoids, electrical motors, or via a linkage using at least one solenoid, motor, or ground contact. The electrical switch in the above embodiments can be a separate switch activated by an operator when coulter fertilizer disc 1790 is lowered to the ground, or the electrical switch can activated when the coulter fertilizer disc 1790 is commanded to be lowered. Alternatively, the electrical switch can be activated by ground contact.

The following examples pertain to further embodiments. Specifics in the examples may be used anywhere in one or more embodiments.

For example, in one embodiment, an application unit includes a frame to be positioned in operation between first and second rows of plants, a first plant contacting member being pivotally coupled to the frame in operation such that the first plant contacting member to be deflected rearwardly with respect to a direction of motion of the frame upon the first plant contacting member contacting at least one of the plants of the first row of plants which causes a first change in orientation of the first plant contacting member with respect to the frame. A first outlet applies a fluid application to the first row of plants with the first outlet being mechanically linked to the first plant contacting member. The first change in orientation causes a corresponding second change in orientation of the first outlet with respect to the frame.

In another example, the application unit further includes a second plant contacting member being pivotally coupled to the frame in operation such that the second plant contacting member to be deflected rearwardly with respect to the direction of motion of the frame upon the second plant contacting member contacting at least one of the plants of the second row of plants which causes a third change in orientation of the second plant contacting member with respect to the frame. A second outlet applies a fluid application to the second row of plants with the second outlet being mechanically linked to the second plant contacting member. The third change in orientation causes a corresponding fourth change in orientation of the second outlet with respect to the frame.

In another embodiment, an application unit includes a frame to be positioned in operation between two rows of plants and a base member coupled to the frame. The base member to be positioned in proximity to a ground surface while in operation. First and second plant guidance members are coupled to the base member in operation such that the first and second plant guidance members guide a lateral position of the base member to be approximately equidistant from the two rows of plants based upon whether at least one of the first and second plant guidance members contacts one or more plants of the two rows of plants.

In one example, the application unit further includes first and second outlets coupled to the base member in operation such that a change in lateral position of the base member causes a corresponding change in position of the first and second outlets for applying a fluid application to the plants.

Figure 20D:
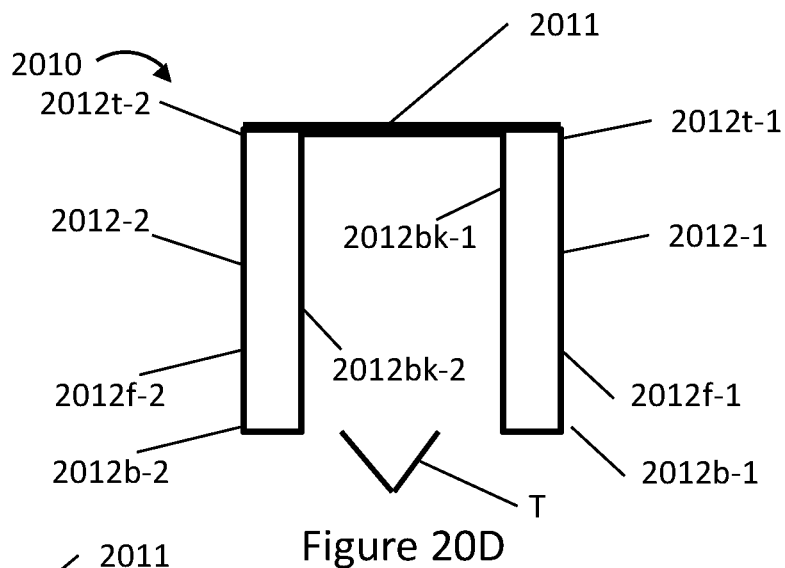
FIG. 20D is a rear view of the closer of FIG. 20A according to one embodiment in which the back of the arms are closer to the axis through the trench than the front of the arms.

In another embodiment, a closer 2010 or closer 2020 can be disposed after coulter fertilizer disk 1790 in a direction of travel DT of the coulter fertilizer disk 1790. Different embodiments of closer 2010 are illustrated in FIGS. 20A to 20F, and closer 2020 is illustrated in FIGS. 21A to 21B. FIG. 20A is a side elevation view of a closer on a coulter wheel according to one embodiment. FIG. 20B is a rear view of the closer of FIG. 20A according to one embodiment in which the top and bottom of the arms are equidistant to the axis through the trench and the front and back of the arms are equidistant to the axis through the trench. FIG. 20C is a rear view of the closer of FIG. 20A according to one embodiment in which the bottom of the arms are closer to the axis through the trench than the top of the arms. FIG. 20D is a rear view of the closer of FIG. 20A according to one embodiment in which the back of the arms are closer to the axis through the trench than the front of the arms.

Figure 20E:
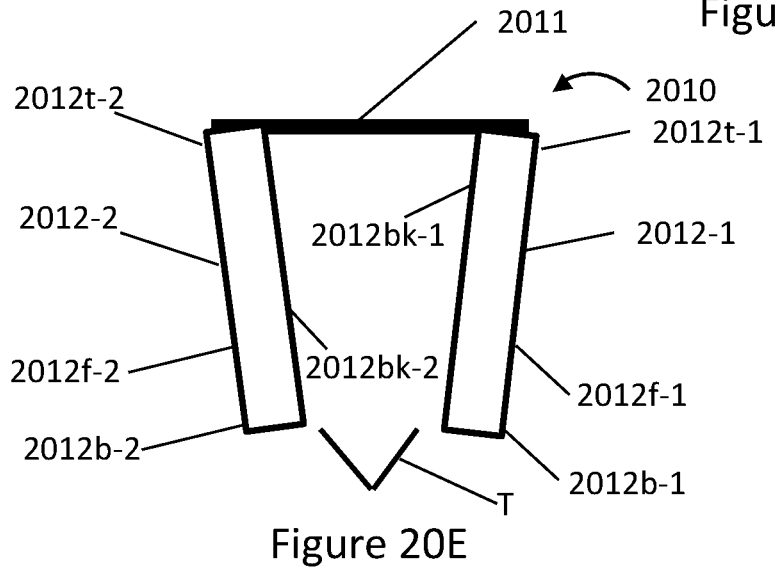
FIG. 20E is a rear view of the closer of FIG. 20A according to one embodiment in which the bottom of the arms are closer to the axis through the trench than the top of the arms and the back of the arms are closer to the axis through the trench than the front of the arms.
Figure 20F:
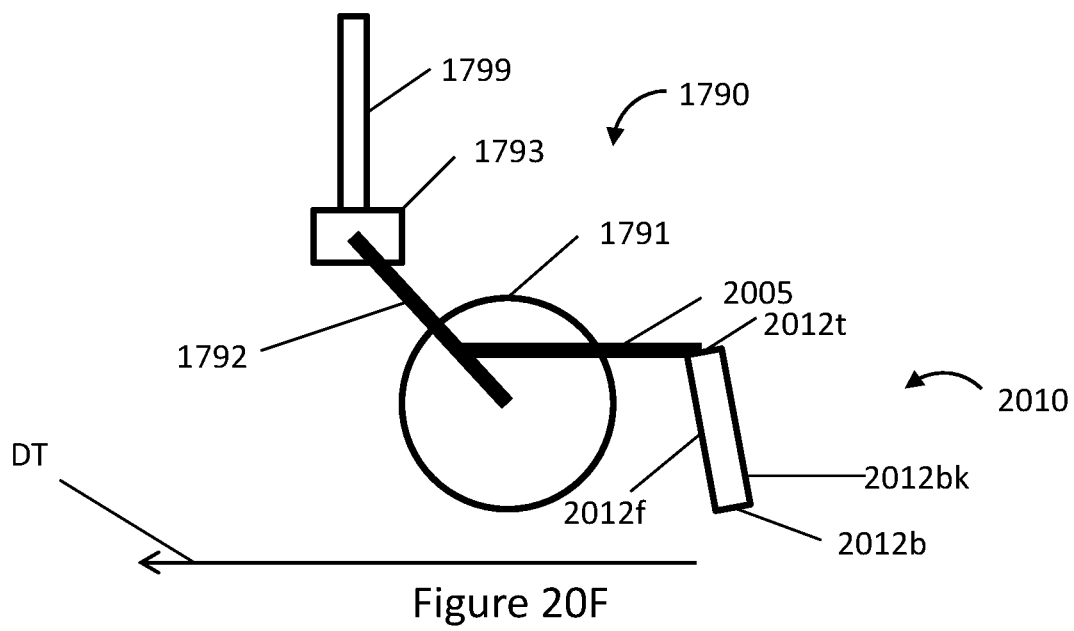
FIG. 20F is a side view of the closer of FIG. 20B according to one embodiment in which the bottom of the arm is at least partially disposed behind the top of the arm in a direction of travel.
Figure 21A:
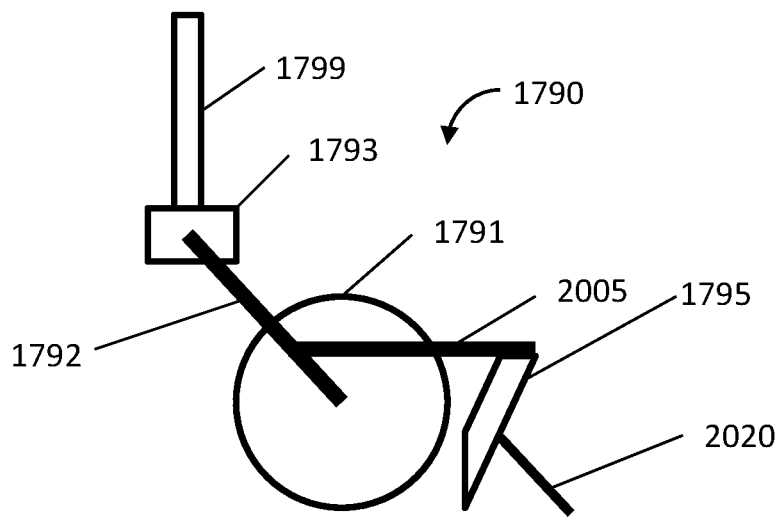
FIG. 21A is a side elevation view of an alternative closer disposed on a blade according to one embodiment.
Figure 21B:
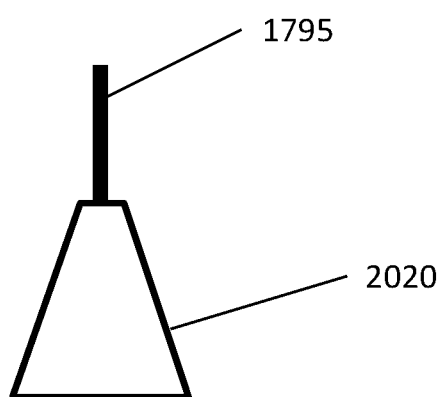
FIG. 21B is a rear elevation view of the blade and closer of FIG. 21A.

FIG. 20E is a rear view of the closer of FIG. 20A according to one embodiment in which the bottom of the arms are closer to the axis through the trench than the top of the arms and the back of the arms are closer to the axis through the trench than the front of the arms. FIG. 20F is a side view of the closer of FIG. 20B according to one embodiment in which the bottom of the arm is at least partially disposed behind the top of the arm in a direction of travel.

FIG. 21A is a side elevation view of an alternative closer disposed on a blade according to one embodiment.

FIG. 21B is a rear elevation view of the blade and closer of FIG. 21A.

The embodiments of closer 2010 or closer 2020 can all be used with the embodiment illustrated in FIG. 17A, which further includes blade 1795. Closer 2010 or closer 2020 can be disposed behind blade 1795 of FIG. 17A in a direction of travel DT of the coulter fertilizer disk 1790 by attachment to blade mounting arm 1794 or attachment to blade 1795. Also, blade 1795 from FIG. 17A can be disposed on mounting arm 2005 instead of blade mounting arm 1794.

Closer 2010 has a top bar 2011 and at least one arm 2012 disposed downwardly from top bar 2011. Top bar 2011 can be disposed on mounting arm 2005 by any suitable attachment, such as welding, bolting, or riveting. Top bar 2011 can be generally horizontal, and extends transversely across a trench T created by disk 1791 and/or blade 1795. In one embodiment, there can be two arms 2012-1 and 2012-2 disposed on top bar 2011 as illustrated in FIG. 20B.

Arm 2012 has a top edge 2012*t*, a bottom edge 2012*b*, a front edge 2012*f*, and a back edge 2012*bk*. Arm 2012 (or arms 2012-1 and 2012-2 having the same top edge 2012*t*-1, 2012*t*-2; bottom edge 2012*b*-1, 2012*b*-2; front edge 2012*f*-1, 2012*f*-2; and back edge 2012*bk*-1, 2012*bk*-2) can be disposed according to one or more of the following configurations with respect to an axis through trench T along a direction of travel DT of coulter fertilizer disk 1790: the bottom edge 2012*b* (2012*b*-1, 2012*b*-2) and the top edge 2012*t* (2012*t*-1, 2012*t*-2) are equidistant to the axis (illustrated in FIG. 20B); the bottom edge 2012*b* (2012*b*-1, 2012*b*-2) is closer to the axis than the top edge 2012*t* (2012*t*-1, 2012*t*-2) (illustrated in FIG. 20C); the back edge 2012*bk* (2012*bk*-1, 2012*bk*-2) is closer to the axis than the front edge 2012*f* (2012*f*-1, 2012*f*-2) (illustrated in FIG. 20D); both the bottom edge 2012*b* (2012*b*-1, 2012*b*-2) is closer to the axis than the top edge 2012*t* (2012*t*-1, 2012*t*-2) and the back edge 2012*bk* (2012*bk*-1, 2012*bk*-2) is closer to the axis than the front edge 2012*f* (2012*f*-1, 2012*f*-2) (illustrated in FIG. 20E); or the bottom edge 2012*b* (2012*b*-1, 2012*b*-2) is disposed at least partially behind the top edge 2012*t* (2012*t*-1, 2012*t*-2) along a direction of travel DT (illustrated in FIG. 20F using the embodiment from FIG. 20B. While illustrated with the embodiment from FIG. 20B, the embodiment from FIG. 20F can be used with any of the embodiments illustrated in any of FIGS. 20C, 20D, and 20E.

As illustrated in FIGS. 21A and 21B, closer 2010 can be replaced with closer 2020. In this embodiment, closer 2020 is disposed on blade 1795. Closer 2020 has a planer shape and a width that extends over the trench T created by disk 1791. As coulter fertilizer disk 1790 traverses a field and creates a trench T, closer 2020 levels soil displaced by disk 1791 and/or blade 1795.

As shown, closer 2010 or closer 2020 is connected to mounting arm 2005 or knife 1795, respectively. Alternative, closer 2010, closer 2020 can be connected to bar 10 by a mounting arm (not shown).

Figure 22A:
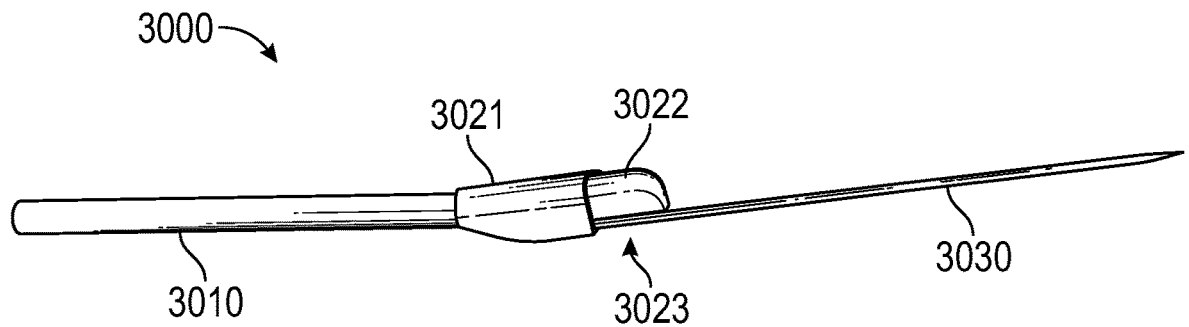
FIG. 22A is a side elevation view of an alternative nozzle having a biasing ski according to one embodiment.
Figure 22B:
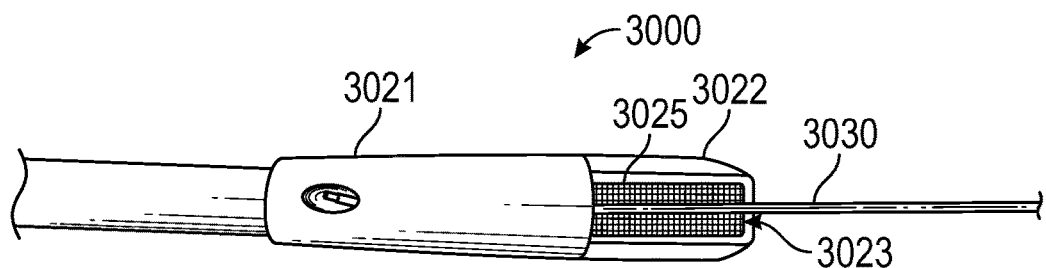
FIG. 22B is a bottom view of the nozzle of FIG. 22A with the biasing ski removed for clarity.

FIGS. 22A and 22B illustrate a nozzle 3000 that can be disposed at the end of the fluid lines described herein (such as flexible member 922, flexible member 982, flexible member 1022, flexible member 1522, linkage member 1520, or fluid outlets 1530). Fluid line 3010 is connected to a nozzle housing 3021. Nozzle housing 3021 has a nozzle 3022 disposed opposite to the fluid line 3010. Nozzle housing 3021 and nozzle 3022 can be a unitary part or separate parts. Nozzle 3022 has an outlet 3023 disposed in nozzle 3022 for dispensing fluid. As shown, outlet 3023 is disposed downward towards the ground. Also, outlet 3023 can be disposed on the side facing towards plants (not shown). Outlet 3023 can optionally have an aerator 3025 disposed in itself to regulate the flow fluid. Nozzle housing 3021 further includes a ski 3030 (such as a spring wire) disposed through nozzle housing 3021 and extending backward away from nozzle housing 3021 for engaging the ground to keep the nozzle outlet 3023 from contacting the ground to improve fluid flow.

Figure 23:
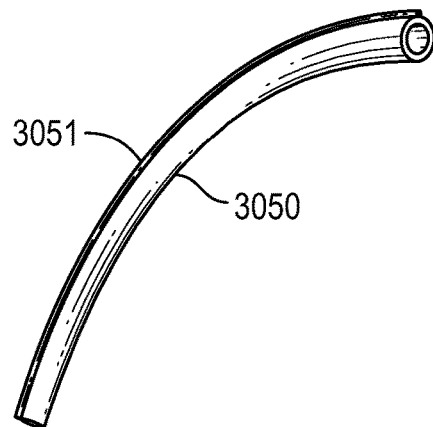
FIG. 23 is a top view of a flexible member having a reinforcement disposed thereon according to one embodiment.

FIG. 23 illustrates a flexible member 3050 that includes a reinforcement 3051 disposed on or in flexible member 3050. This embodiment can be used with any flexible member described herein (such as flexible member 922, flexible member 982, flexible member 1022, or flexible member 1522). An unreinforced flexible member, such as a hose, can flop around while being drawn through a field. This can cause fluid to not be dispensed in the selected area. Reinforcement 3051 can add stiffness to flexible member 3050 and to keep flexible member 3050 biased against plants. In one embodiment, reinforcement 3051 is a wire.

Figure 24A:
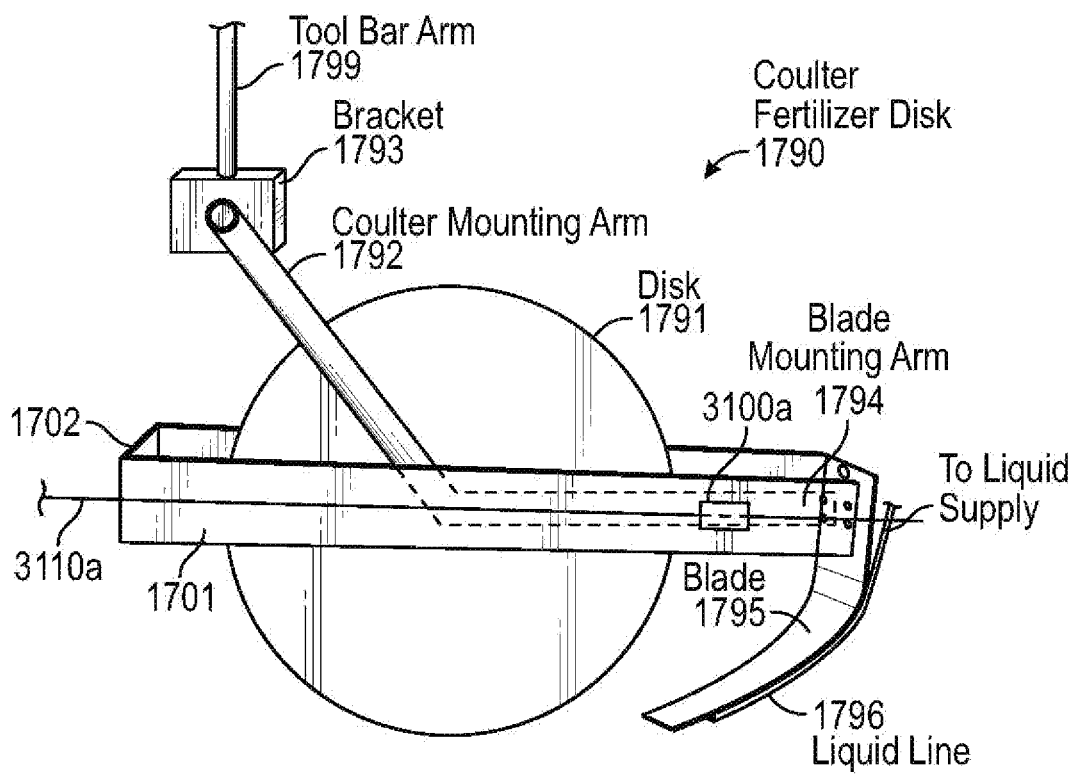
FIG. 24A is a side elevation view of a cradle disposed on a bracket according to one embodiment.
Figure 24B:
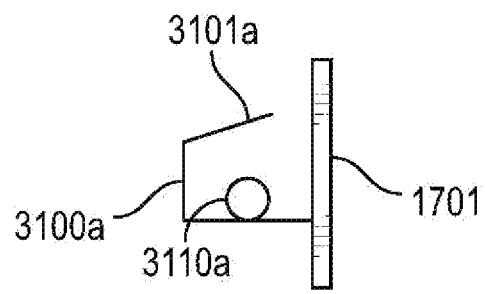
FIG. 24B is a rear elevation view of the cradle of FIG. 24A.

Illustrated in FIGS. 24A and 24B is a cradle 3100*a*, which can be used to hold member 3110*a* (such as flexible member 922, flexible member 982, flexible member 1022, flexible member 1522, linkage member 1520, or fluid outlets 1530) when used in conjunction with any of the application units 1700, 1750, 1752, 1780, 1800, 1850, or 1992 as illustrated in FIGS. 17A to 19C. When disk 1791 is raised for transport, member 3110*a* will tend to drag towards the ground under the pull of gravity. Cradle 3100*a* can be disposed on bracket 1701 transverse to the direction of travel. Member 3110*a* can be stored in cradle 3100*a*. Optionally, member 3110*a* is latchable in cradle 3100*a* with latch 3101*a*, which is hingeably engaged with cradle 3100*a*. Side a is illustrated, but side b has the same configuration on the other side.

Figure 25:
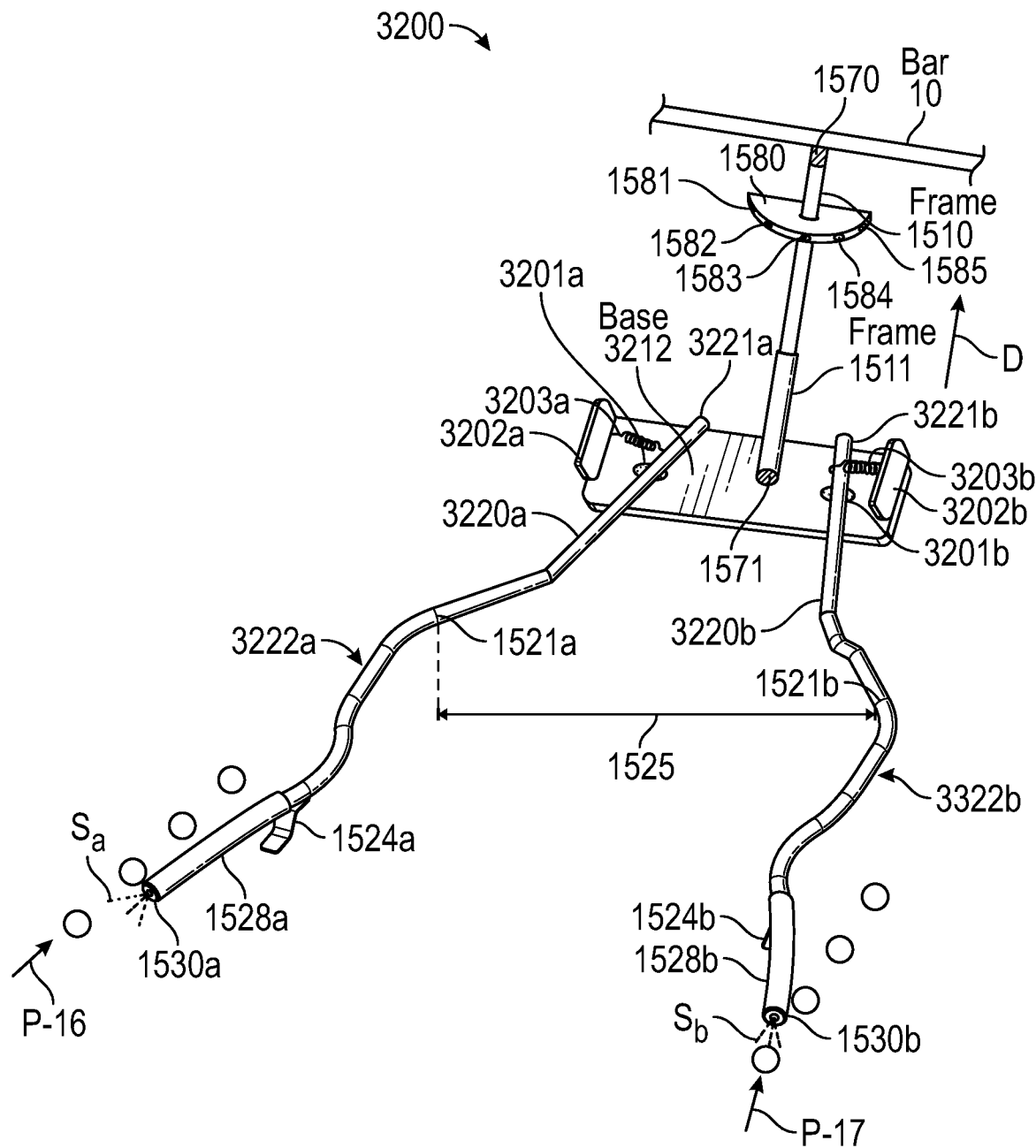
FIG. 25 is an alternative embodiment of an application unit 3200 according to one embodiment.

FIG. 25 illustrates an application unit 3200 as an alternative embodiment for application unit 1500 illustrated in FIG. 15A. Base 1512 is replaced with base 3212, and linkage members 1520*a*, 1520*b* are replaced by linkage members 3220*a*, 3220*b*, respectively. Linkage members 3220*a*, 3220*b* are pivotally connected to base 3212 through pivots 3201*a*, 3201*b*, respectively. Linkage members 3220*a*, 3220*b* have a portion 3221*a*, 3221*b* that extend forward of base 3212 in a direction of travel. Base 3212 has walls 3202*a*, 3202*b* extending forward of base 3212 in a direction of travel. Biasing members 3203*a*, 3203*b* (such as a spring) are disposed between walls 3202*a*, 3202*b* and portions 3221*a*, 3221*b*, respectively, to bias portions 3221*a*, 3221*b* away from walls 3202*a*, 3202*b* so that flexible members 3222*a*, 3222*b* are biased towards the plants.

Figure 26:
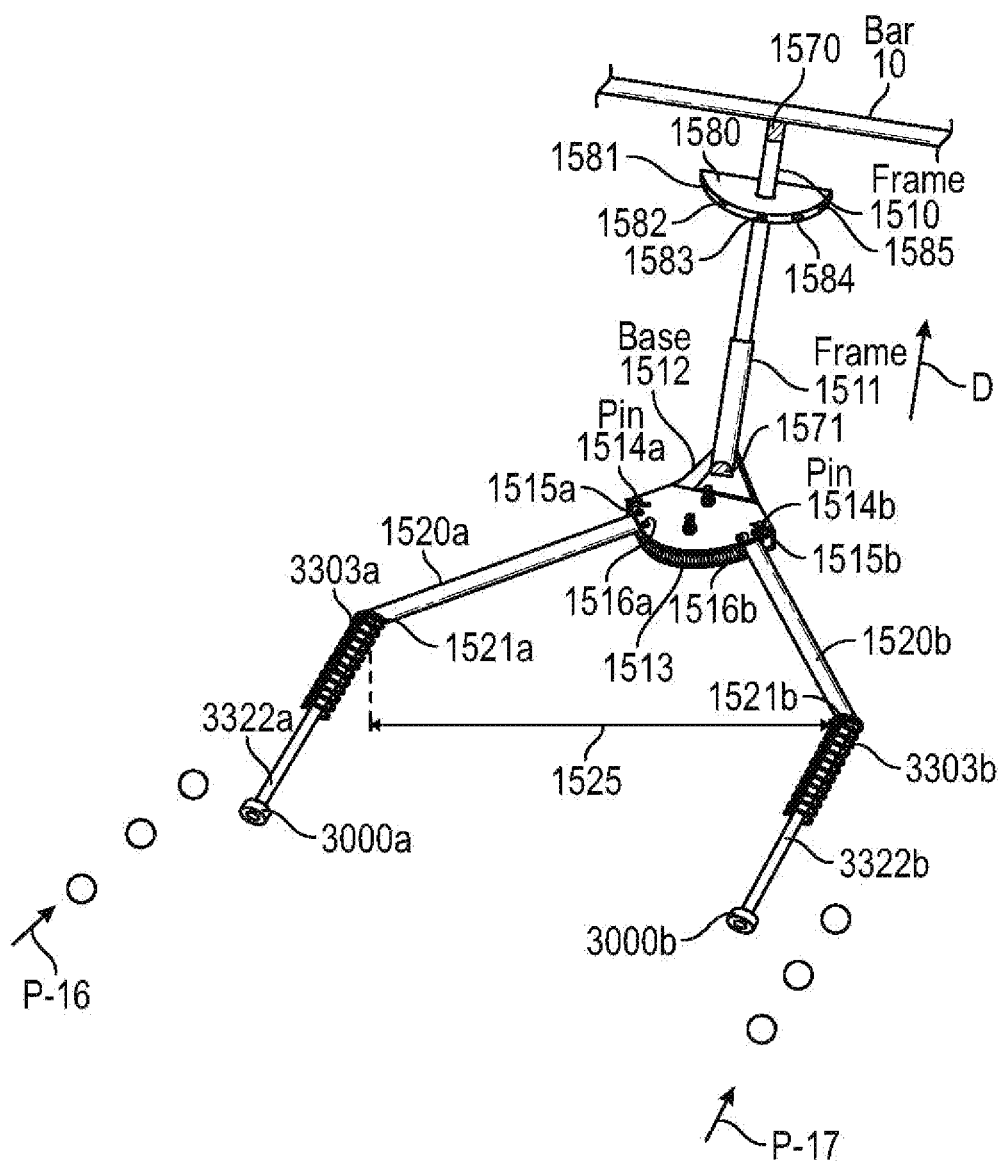
FIG. 26 is an alternative embodiment for a spring disposed over a flexible member.

FIG. 26 illustrates an embodiment in which a flexible member 3322 (such as flexible member 922, flexible member 982, flexible member 1022, or flexible member 1522) has a spring 3303a, 3303b disposed over flexible member 3322 (e.g., 3322a, 3322b) proximate to the end opposite of the discharge of flexible member 3322. Spring 3303 can be the only biasing in the application unit, or spring 3303 can be used with any other biasing described herein. Components of the nozzle 3000 of FIG. 22A are coupled to the flexible member 3322a and 3322b. The nozzle 3000 includes fluid line 3010 (e.g., 3010a, 3010b) that is connected to a nozzle housing 3021 (e.g., 3021a, 3021b). Nozzle housing 3021 has a nozzle 3022 (e.g., 3022a, 3022b) disposed opposite to the fluid line 3010. Nozzle housing 3021 and nozzle 3022 can be a unitary part or separate parts. Nozzle 3022 has an outlet 3023 (e.g., 3023a, 3023b) disposed in nozzle 3022 for dispensing fluid. As shown, outlet 3023 is disposed downward towards the ground. Also, outlet 3023 can be disposed on the side facing towards plants. Outlet 3023 can optionally have an aerator 3025 disposed in itself to regulate the flow fluid (not shown).

FIGS. 27A to 27G illustrate another embodiment for an application unit 2700. Application unit 2700 is connected to a vertical support 2799, which is connected to a transversely extending bar 10 (e.g., toolbar or boom) drawn by a tractor or other implement. Vertical support 2799 can have a length such that application unit 2700 is disposed at the bottom of vertical support 2799 proximate to the ground. An optional coulter assembly 2780 can also be connected to vertical support 2799 posterior to application unit 2700 in a direction of travel. In one embodiment that does not include coulter assembly 2780, vertical support 2799 can have a length so that application unit 2700 is proximate to the ground. Or vertical support 2799 can have a length that extends to where coulter assembly 2780 attaches, and application unit 2700 attaches to vertical support proximate to where coulter assembly attaches. Even when coulter assembly 2780 is not included, there is an advantage to having application unit 2700 disposed above the ground and not proximate to the ground to avoid having application unit 2700 from impacting the ground as contoured terrain is encountered.

Application unit 2700 includes a bracket 2701 for connecting to vertical support 2799. Connected to bracket 2701 is a pivot 2705 having a vertical axis to permit application unit 2700 to pivot in a horizontal plane. This allows application unit 2700 to freely pivot to provide self-alignment between adjacent rows of plants in the event that application unit 2700 is not centered between the rows during operation. Optionally, a deflector 2710 is disposed on the front of application unit 2700 in the direction of travel. Deflector 2710 is connected via a deflector bracket 2711 to bracket 2701. In one embodiment, deflector bracket 2711 has arms 2712a, 2712b, which can be a unitary part or separate parts.

The description below is for both sides of application unit 2700. For clarity, one side of application unit is illustrated in the drawings. It is understood, that the same parts are also disposed on the other side of application unit 2700.

Disposed below pivot 2705 is bracket base 2702. Pivotally connected to bracket base 2702 is bracket assembly 2740 (2740a, 2740b) through pivot 2747 (2747a, 2747b) on a horizontal axis to permit vertical rotation of bracket assembly 2740 (2740a, 2740b). Pivotally connected to bracket assembly 2740 (2740a, 2740b) is bracket assembly 2730 (2730a, 2730b) through pivot 2737 (2737a, 3737b) to permit rotation transverse to the direction of travel.

Figure 27A:
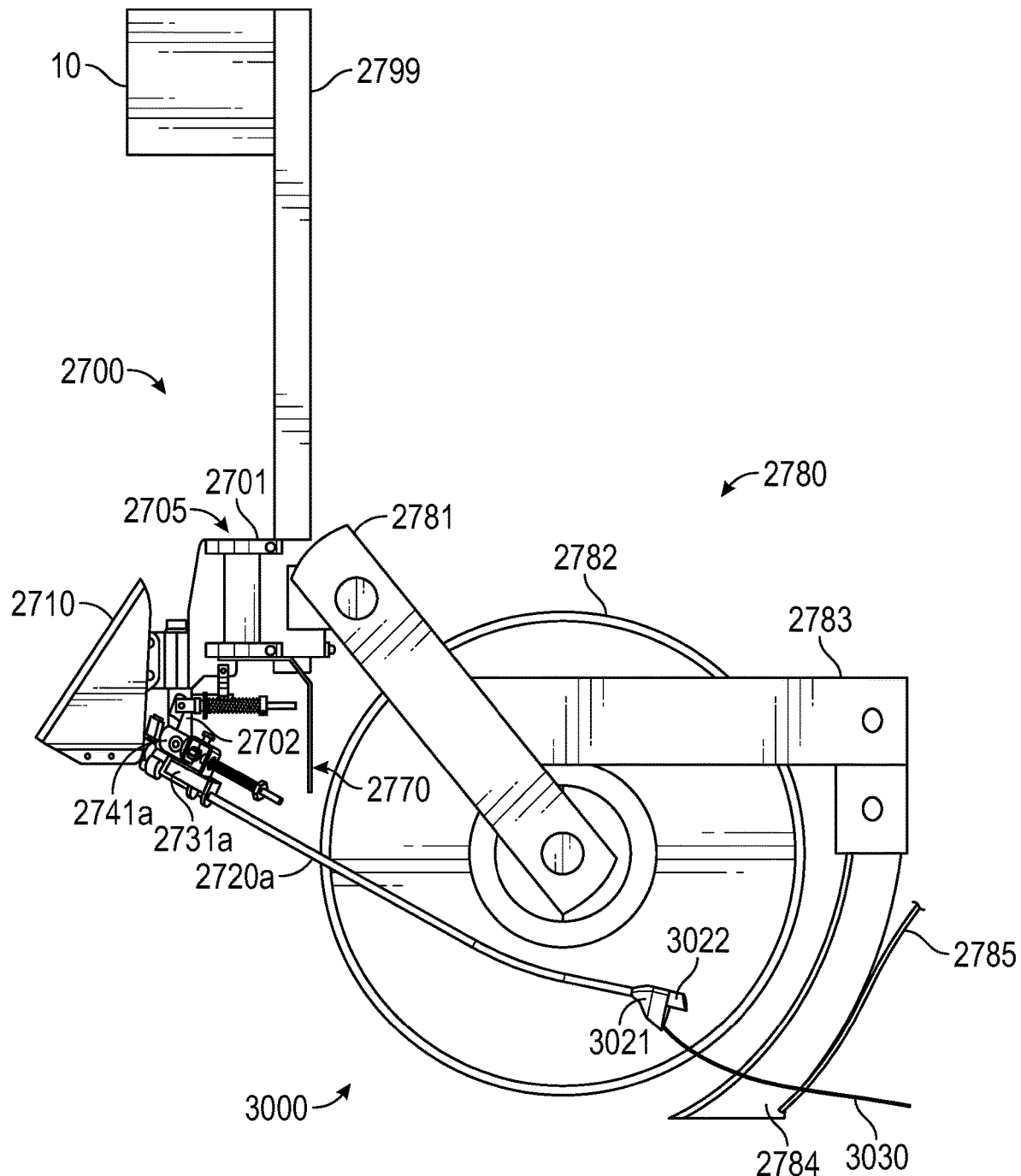
FIG. 27A illustrates a side elevation view of an application unit 2700 according to one embodiment.
Figure 27B:
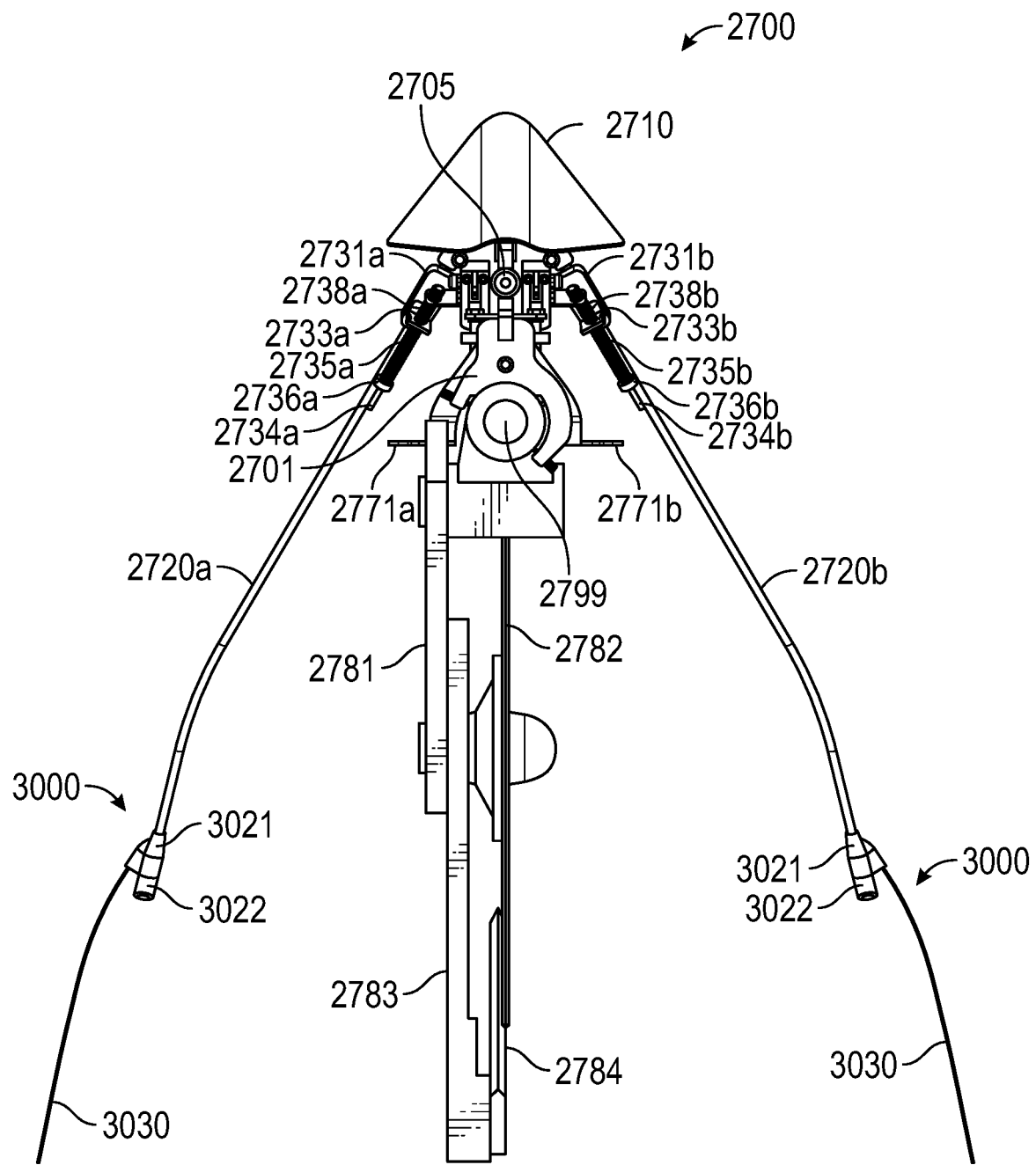
FIG. 27B is a top plan view of the embodiment of FIG. 27A.
Figure 27C:
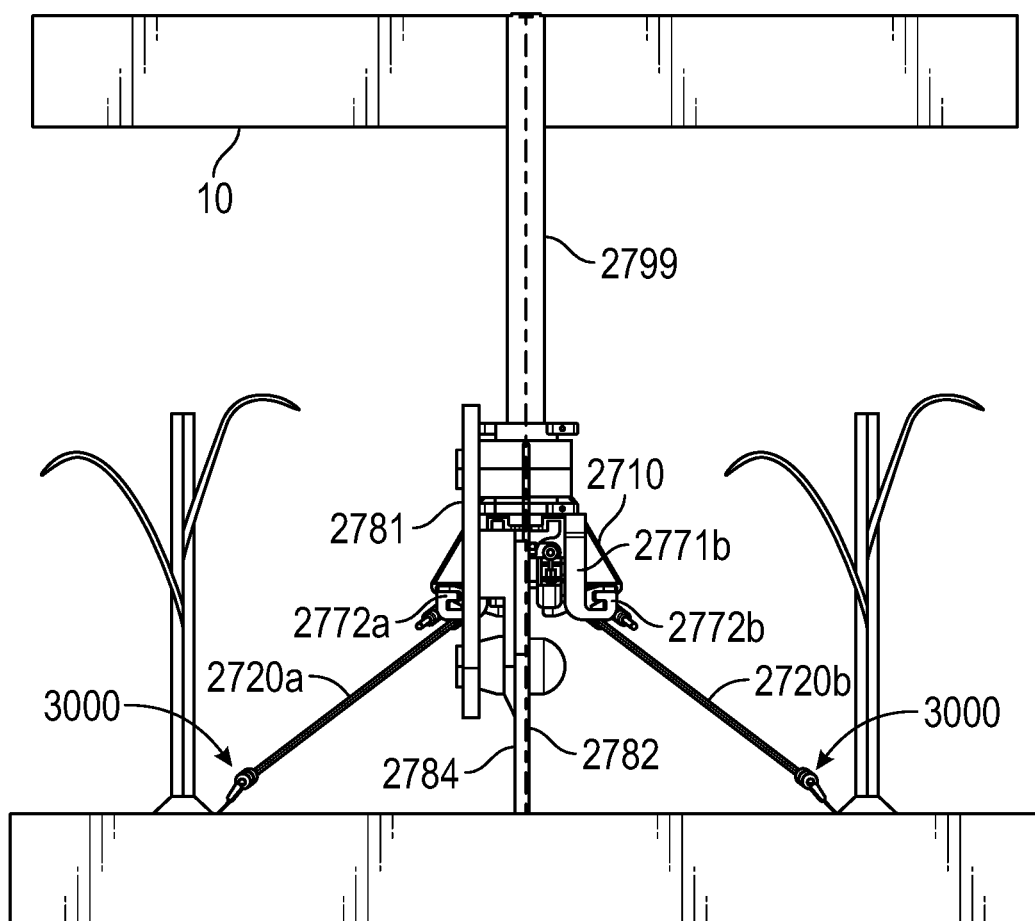
FIG. 27C is a rear elevation view of the embodiment of FIG. 27A traversing a field with plants in rows.
Figure 27D:
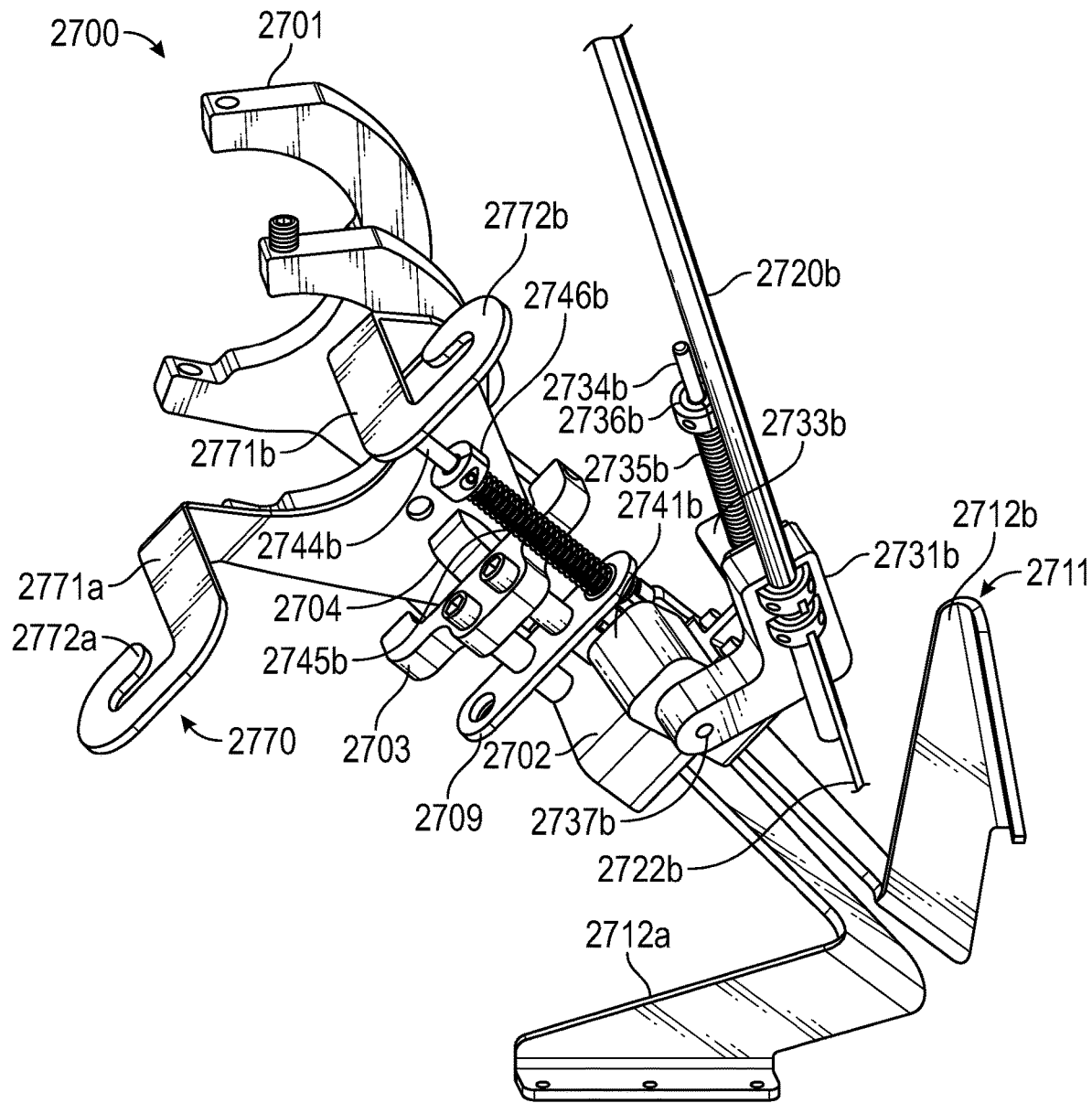
FIG. 27D is a partial perspective view from the bottom of the embodiment of FIG. 27A with some components removed for clarity.
Figure 27E:
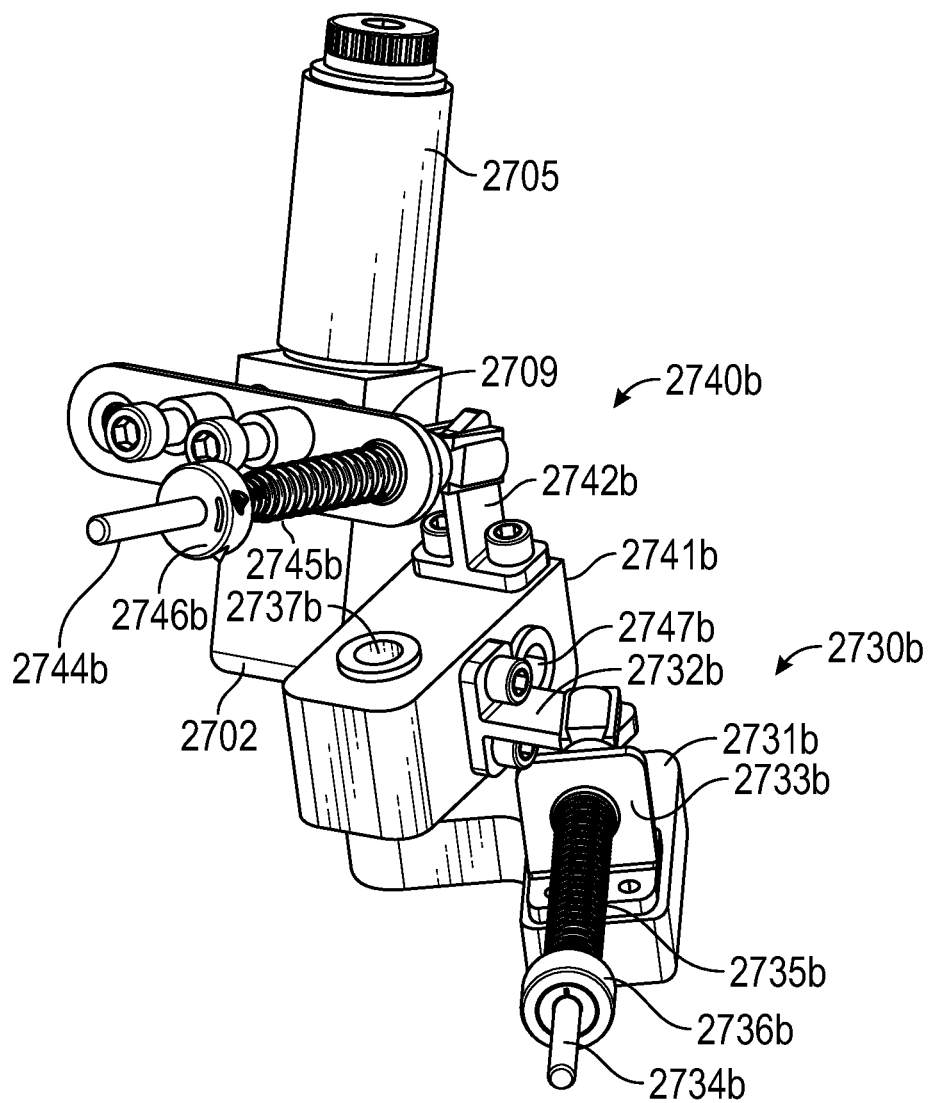
FIG. 27E is a partial perspective view of the embodiment of FIG. 27A with some components removed for clarity.
Figure 27F:
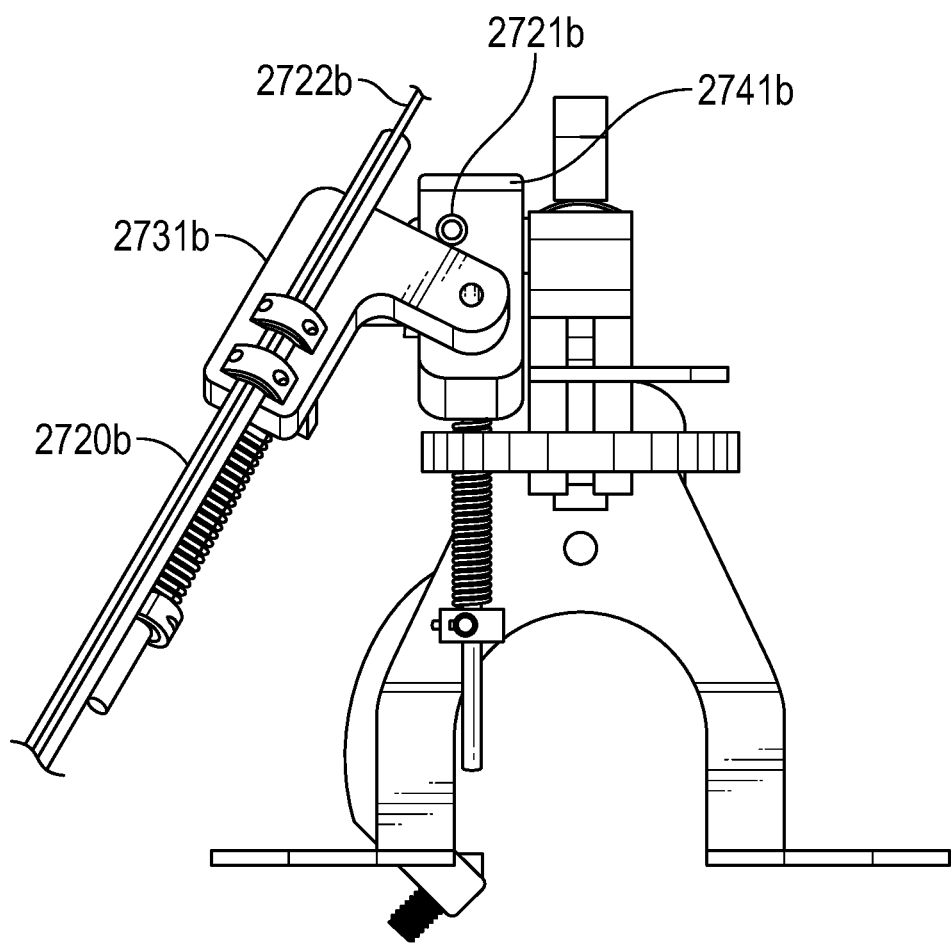
FIG. 27F is a partial bottom view of the embodiment of FIG. 27A with an optional stop with some components removed for clarity.
Figure 27G:
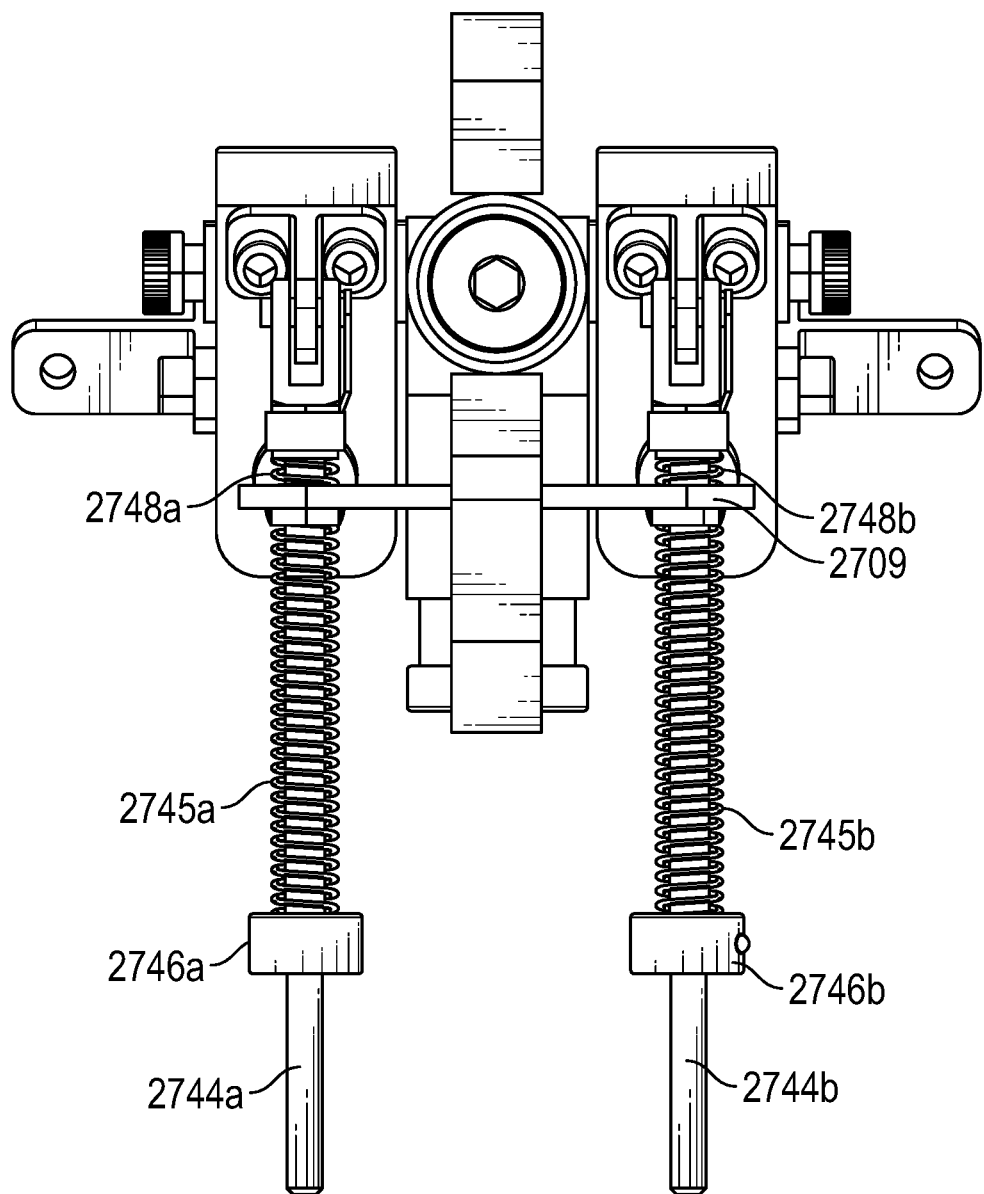
FIG. 27G is a partial top view of the embodiment of FIG. 27A showing optional bias element 2748.

Bracket assembly 2730 (2730a, 2730b) has a bracket base 2731 (2731a, 2731b). Connected to bracket base 2731 (2731a, 2731b) is a fluid arm 2720 (2720a, 2720b). Connected to fluid arm 2720 (2720a, 2720b) is a fluid line 2722 (2722a, 2722b), which is fluid communication with a fluid source (e.g., tank 250). Bracket base 2731 (2731a, 2731b) is biased outward by bias element 2735 (2735a, 2735b). Bias element 2735 (2735a, 2735b), such as a spring, is disposed over element 2734 (2734a, 2734b), which is connected to a bracket 2732 (2732a, 2732b), which is connected to bracket base 2741 (2741a, 2741b). Element 2734 (2734a, 2734b) is disposed through a bracket 2733 (2733a, 2733b). Bias element 2735 (2735a, 2735b) is disposed over element 2734 (2734a, 2734b) between a stop 2736 (2736a, 2736b) and a side of bracket 2733 (2733a, 2733b) away from bracket 2732 (2732a, 2732b). Bracket assembly 2740 (2740a, 2740b) includes a bracket base 2741 (2741a, 2741b). Bias element 2745 (2745a, 2745b), such as a spring, is disposed over element 2744 (2734a, 2744b), which is connected to a bracket 2742 (2742a, 2742b), which is connected to bracket base 2741 (2741a, 2741b). Element 2744 (2744a, 2744b) is disposed through a bracket 2709, which is connected to bracket base 2702. Bias element 2745 (2745a, 2745b) is disposed over element 2744 (2744a, 2744b) between a stop 2746 (2746a, 2746b) and a side of bracket 2709 away from bracket 2742 (2742a, 2742b). Optionally, as illustrated in FIG. 27G, bias element 2748 (2748a, 2748b) is disposed over element 2744 (2744a, 2744b) on a side of bracket 2709 opposite to biasing element 2745 (2745a, 2745b). Balancing the amount of bias between bias element 2745 (2745a, 2745b) and bias element 2748 (2748a, 2748b) can determine the amount of down rotation.

As illustrated, application unit 2700 has two degrees for biasing fluid arms 2720a, 2720b outward and down. In another embodiment, such as when application unit 2700 is disposed proximate to the ground, down biasing is not needed. In this embodiment, bracket assembly 2730 (2730a, 2730b) is pivotally connected to bracket base 2702, bracket 2732 (2732a, 2732b) is connected to bracket base 2702, and bracket assembly 2740 (2740a, 2740b) and member 2709 are not included (not shown).

Optionally, disposed on the discharge end of fluid arms 2720a, 2720b is nozzle 3000. In one embodiment, the rotation of fluid arms 2720a, 2720b outward towards the plant transverse to the direction of travel can be limited by stop 2721 (2721a, 2721b), which is disposed on bracket base 2741 (2741a, 2741b) to limit the rotation of bracket base 2731 (2731a, 2731b). In another embodiment, a tab 2704 is disposed on the underside of bracket 2701. A stop 2703, which can have a U shape, is connected to bracket base 2702, and which limits the rotation of application unit 2700 when tab 2704 contacts stop 2703. In another embodiment, counteracting forces from bias element 2738 (2738a, 2738b) can limit the rotation of bracket base 2731 (2731a, 2731b) by being disposed over element 2734 (2734a, 2734b) on a side of bracket 2733 (2733a, 2733b) opposite to biasing element 2735 (2735a, 2735b). In one embodiment illustrated in FIG. 27C, nozzle 3022 does not contact the plants, and the contact is made by ski 3030a, 3030b.

Optionally, coulter assembly 2780 can be connected to vertical support 2799. Coulter bracket arm 2781 is connected to vertical support 2799 at a first end, and at the opposite end, coulter 2782 is rotationally connected to coulter bracket arm 2781. Optionally, an extension arm 2783 is connected to coulter bracket arm 2781 and disposed rearwardly along a direction of travel. A knife 2784 is disposed downwardly from extension arm 2783 to engage the ground posterior to coulter 2782. Optionally, a fluid application line 2785 is disposed on knife 2784 for depositing fluid into the ground. As shown, application line 2785 is disposed on the posterior side of knife 2784 in the direction of travel, but application line 2785 can be disposed on any side of knife 2784.

Optionally, a cradle 2770 can be connected to bracket 2701 and disposed rearwardly in the direction of travel. Cradle 2770 has arms 2771*a*, 2771*b* and each has a receiver 2772*a*, 2772*b*, respectively (with an opening disposed upwards) for holding and retaining arms, respectively, when not in use, such as during transport. Arms 2771*a*, 2771*b* can be made as a unitary part or separate parts.

In addition to any of the application units described above, at least one sprayer may be further included. An example of a sprayer can be found in US20170049043, which is incorporated herein by reference.

In another embodiment, dampers can be included to dampen the motion of any member that contact plants. Examples of members include parts 922, 982, 1522, 1528, 1520, 1720, 3030, and 3110. In any of the embodiments illustrated in FIGS. 28A to 28D, the fluid application members are in fluid communication with a fluid source (not shown).

Figure 28A:
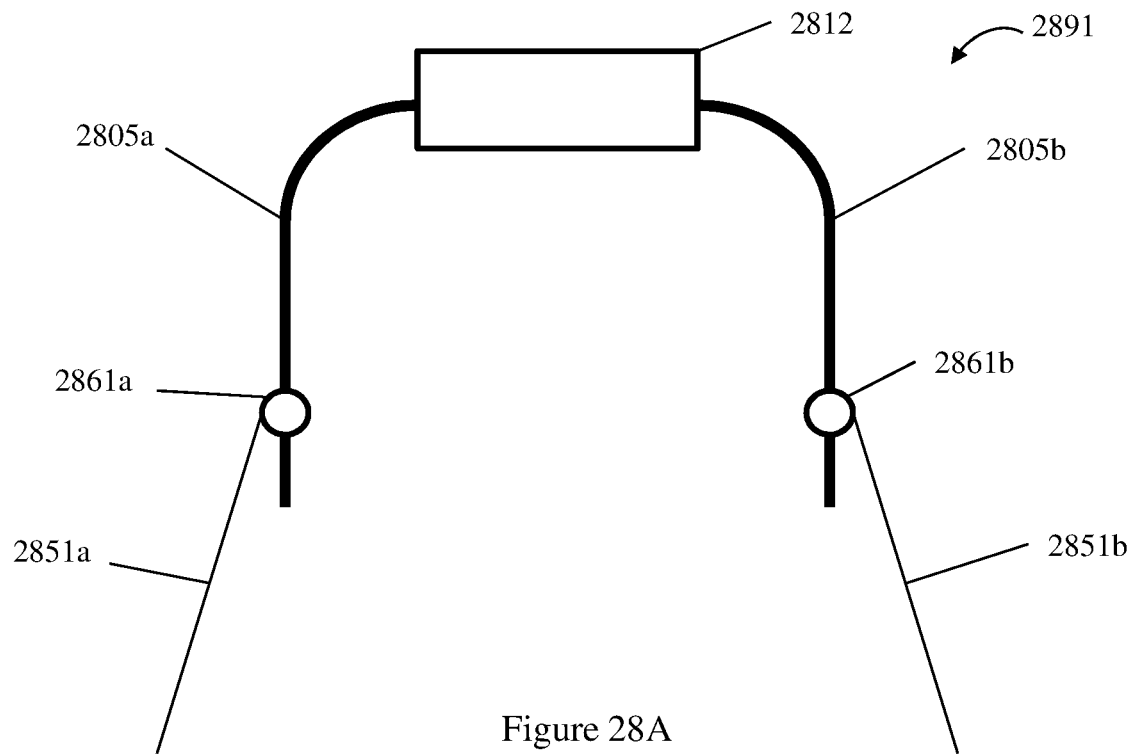
FIG. 28A is a top view of an application unit with a damper according to one embodiment.

Illustrated in FIG. 28A, application unit 2891 includes a base 2812 with fluid application member 2805 (2805*a*, 2805*b*) for dispensing fluid. Damper 2861 (2861*a*, 2861*b*), such as a coil spring, is disposed about fluid application member 2805. Plant contacting member 2851 (2851*a*, 2851*b*) is connected to and extends from damper 2861 to contact plants. Plant contacting member 2851 can be a wire. Vibrations in plant contacting member 2851 are dampened by damper 2861.

Figure 28B:
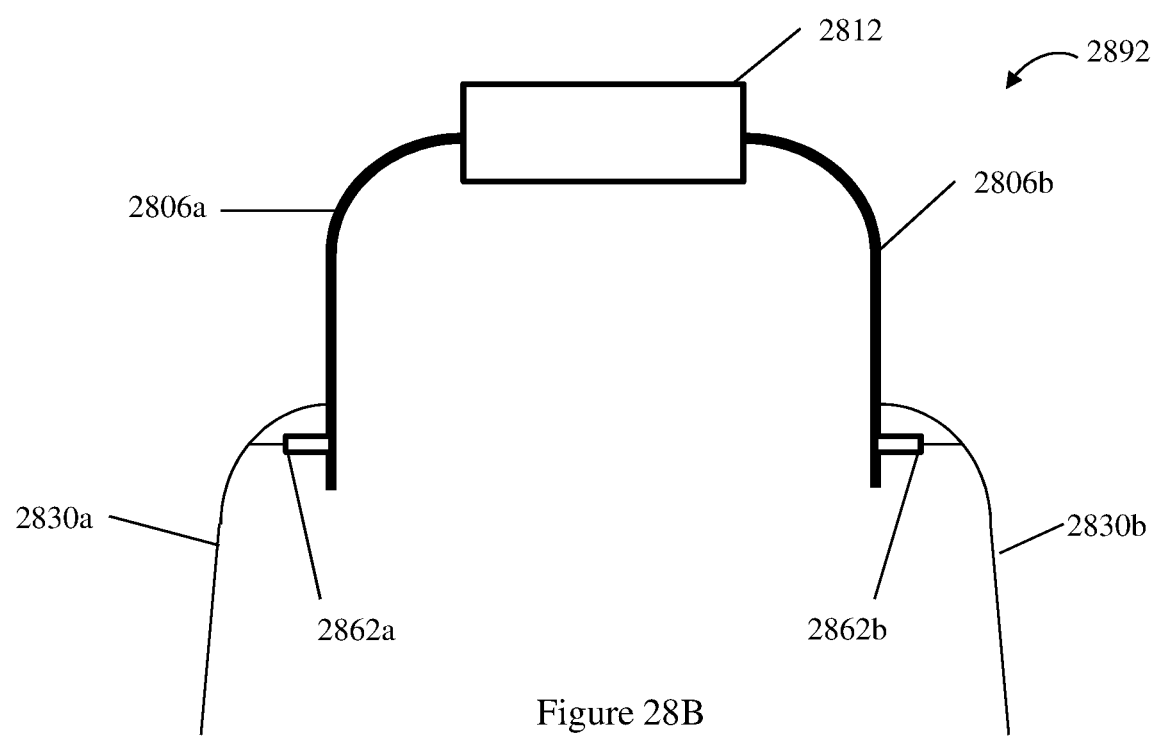
FIG. 28B is a top view of an application unit with a damper according to one embodiment.

Illustrated in FIG. 28B, application unit 2892 includes base 2812 with fluid application member 2806 (2806*a*, 2806*b*) for dispensing fluid. Connected to fluid application member 2806 is a plant contacting member 2830 (2830*a*, 2830*b*) for extending to and contacting plants. Disposed between plant contacting member 2830 and fluid application member 2806 is a damper 2862 (2862*a*, 2862*b*) for dampening vibrations caused by plant contacting member 2830 contacting plants. Examples of damper 2862 include, but are not limited to, shock absorber and dashpot.

Figure 28C:
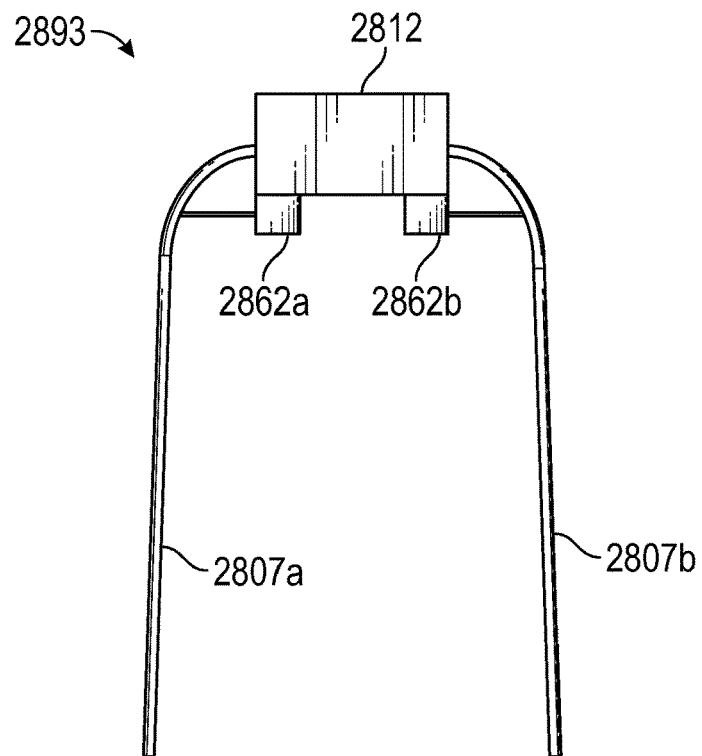
FIG. 28C is a top view of an application unit with a damper according to one embodiment.

Illustrated in FIG. 28C, application unit 2893 includes a base 2812 with fluid application member 2807 (2807*a*, 2807*b*) that extend from base 2812 to deliver fluid and contact plants. Connected to base 2812 and disposed to contact fluid application member 2807 is damper 2862 (2862*a*, 2862*b*).

Figure 28D:
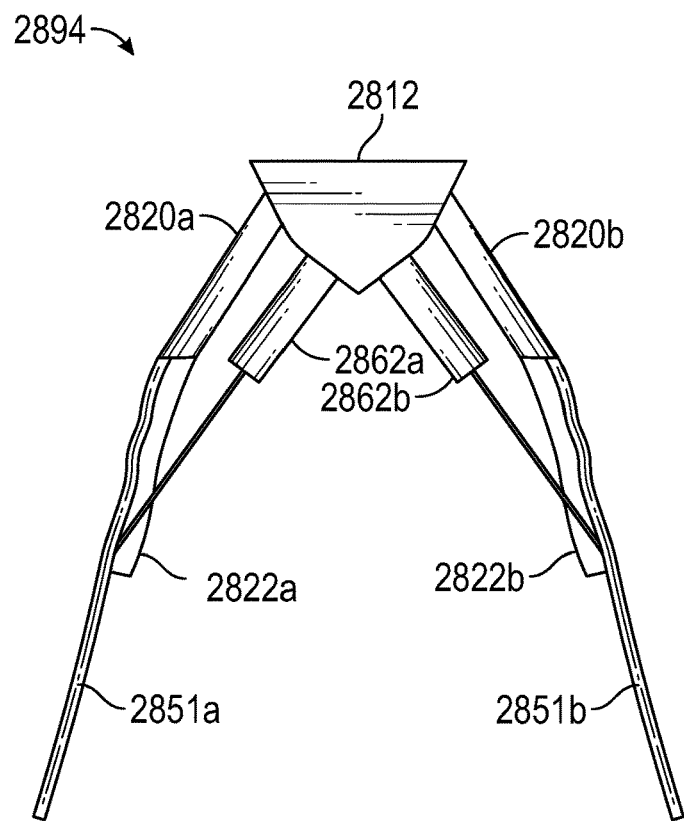
FIG. 28D is a top view of an application unit with a damper according to one embodiment.

Illustrated in FIG. 28D, application unit 2894 includes a base 2812 and linkage member 2820 (2820*a*, 2820*b*) for conveying fluid. Connected to linkage member 2820 is fluid application member 2822 (2822*a*, 2822*b*). Fluid application member can be a hose. Attached to fluid application member 2822 and extending to and contacting plants is plant contacting member 2851 (2851*a*, 2851*b*). Plant contacting member 2851 can be a wire or other flexible material. Connected to base 2812 and disposed to contact plant contacting member 2851 is damper 2862 (2862*a*, 2862*b*).

In another embodiment, with or without the damper, any of members that contact plants (such as 922, 982, 1522, 1528, 1520, 1720, 2851, 2830, 2807, 3030, 3110) have a length such that the member is in contact with at least two plants. Being in contact with at least two plants minimizes the outward flexing of the member.

While not shown, it is understood that any application unit described herein is in fluid communication with a source (e.g., tank 250) containing an application (e.g., fluid application, crop inputs such as fertilizer, fungicide, herbicide or insecticide).

In another embodiment, any of the embodiments in FIGS. 17A or 27A-27G with a coulter 1791, 2782 the coulter can be replaced or any of the embodiments in FIGS. 15A-15B, 17B-17C, 18A-18B, 19A-19C, 25, 26, 27A-27G, or 28A-28D can further include an in-row fluid application apparatus 8000. The in-row fluid application apparatus 8000 can be a nozzle 8010 that applies fluid to the rhizosphere and the middle of the row, and/or in-row fluid application apparatus 8000 can be a separate fluid apparatus 8100.

FIGS. 29A to 29C illustrate nozzle 8010 that can be disposed at the end of the fluid lines described herein (such as flexible member 922, flexible member 982, flexible member 1022, flexible member 1522, linkage member 1520, or fluid outlets 1530), such as is done with nozzle 3000. Nozzle 8010 has a housing 8014, a nozzle 8011 having a first outlet 8012 and a second outlet 8013. First outlet 8012 is directed to the rhizosphere. Second outlet 8013 is directed towards the middle of the row. If nozzle 8010 is disposed in the rhizosphere, then first outlet 8012 can be disposed through the bottom of nozzle 8011, similar to outlet 3023 in nozzle 3000 as illustrated in FIGS. 29A and 29B. If nozzle 8010 is not disposed in the rhizosphere, then first outlet 8012 is disposed on a side of nozzle 8011 directed towards the rhizosphere as illustrated in FIG. 29C. Second outlet 8013 is disposed on a side of nozzle 8011 directed towards the middle of the row. Note, different nozzles 8010 are needed depending on which side of a row the nozzle 8010 is used so that the first outlet 8012 and the second outlet 8013 are each directed the correct way. An aerator 3025 can be disposed at first outlet 8012 and/or at second outlet 8013. First outlet 8012 and second outlet 8013 are orificed to divide the fluid flow to provide a selected amount to the rhizosphere and a selected amount to the middle of the row. The amounts can be the same, or one can be greater than the other, such as to the middle of the row. Also, when nozzle 8010 is disposed in the rhizophere, second outlet 8013 can be orificed to dispense fluid at least 10.2 cm (4 inches) from the row of plants towards the middle of the row. Also, ski 3030 can be included with nozzle 8010 as was done with nozzle 3000.

Figure 30:
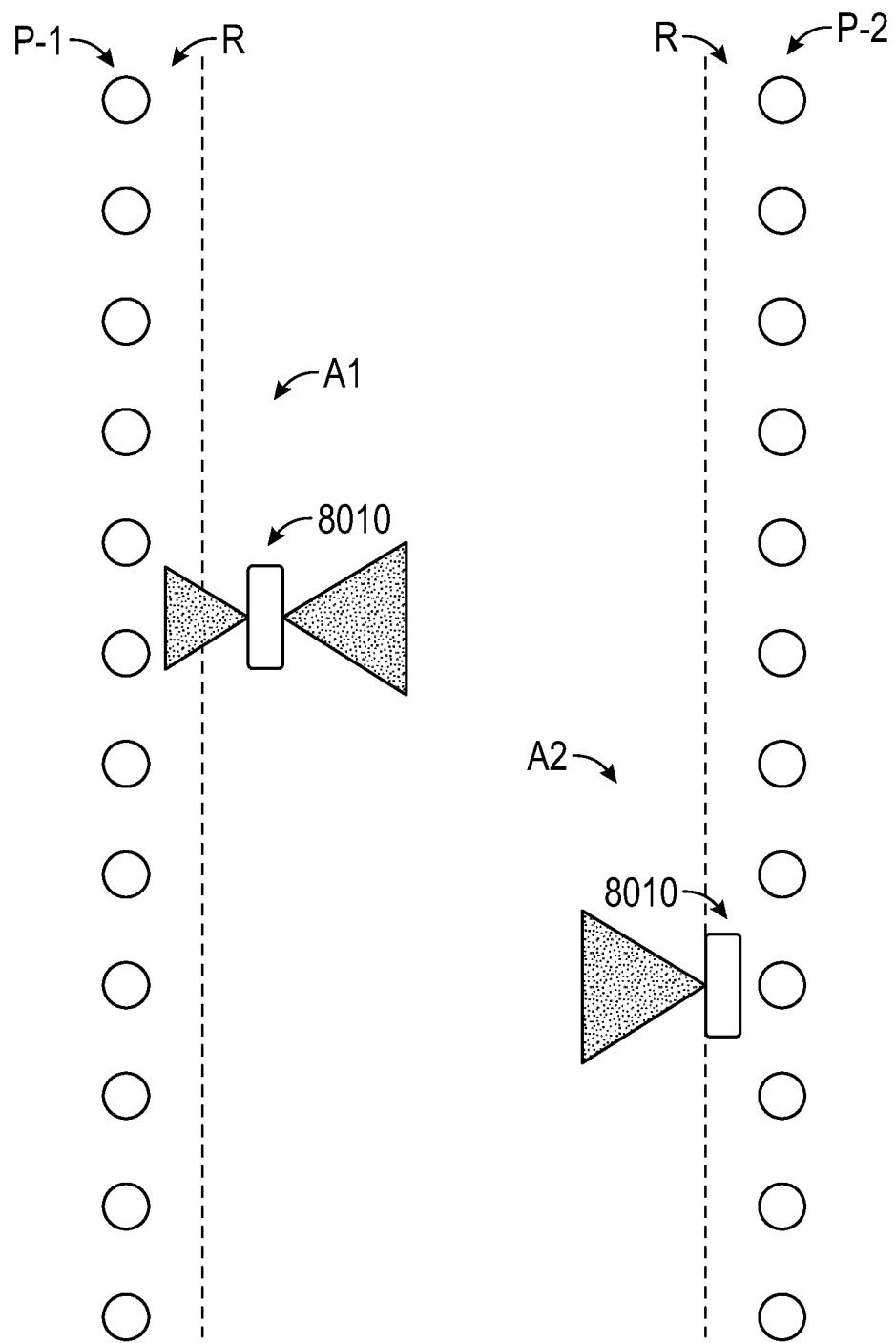
FIG. 30 illustrates a top view of nozzle 8010 dispensing to both the rhizosphere and middle of the row in two different arrangements according to some embodiments.

FIG. 30 illustrates the placement and dispensing of the embodiments from FIGS. 29A to 29C. Nozzle 8010 can be disposed outside of the rhizosphere R as in Placement A1 and first outlet 8012 and second outlet 8013, as illustrated in FIG. 29C, are disposed on opposite sides of each other. Nozzle 8010 can be disposed in the rhizosphere R as in Placement A2 and first outlet is disposed on the bottom of nozzle 8011.

Fluid apparatus 8100 applies fluid to the middle of the row. FIGS. 31A to 35 illustrate disposing fluid apparatus 8100 on the embodiments illustrated in FIGS. 27A, 27B, 15A, 15B, 17C, and 25, respectively, with the coulter assembly 2780 removed from FIGS. 27A and 27B. Fluid apparatus has a first portion 8110 that is connected to a fluid source and disposed on vertical support 2799 (in FIGS. 31A, 31B, 34) or frames 1510 and 1511 (in FIGS. 32, 33, 35). A second portion 8111 is connected to the first portion 8110 and extends into the middle of the row. Second portion 8111 can be rigid or flexible. Any of the nozzles (3000, 8010, 8200, 8300, or 8400) described herein can be disposed at the outlet of second portion 8111.

Figure 31A:
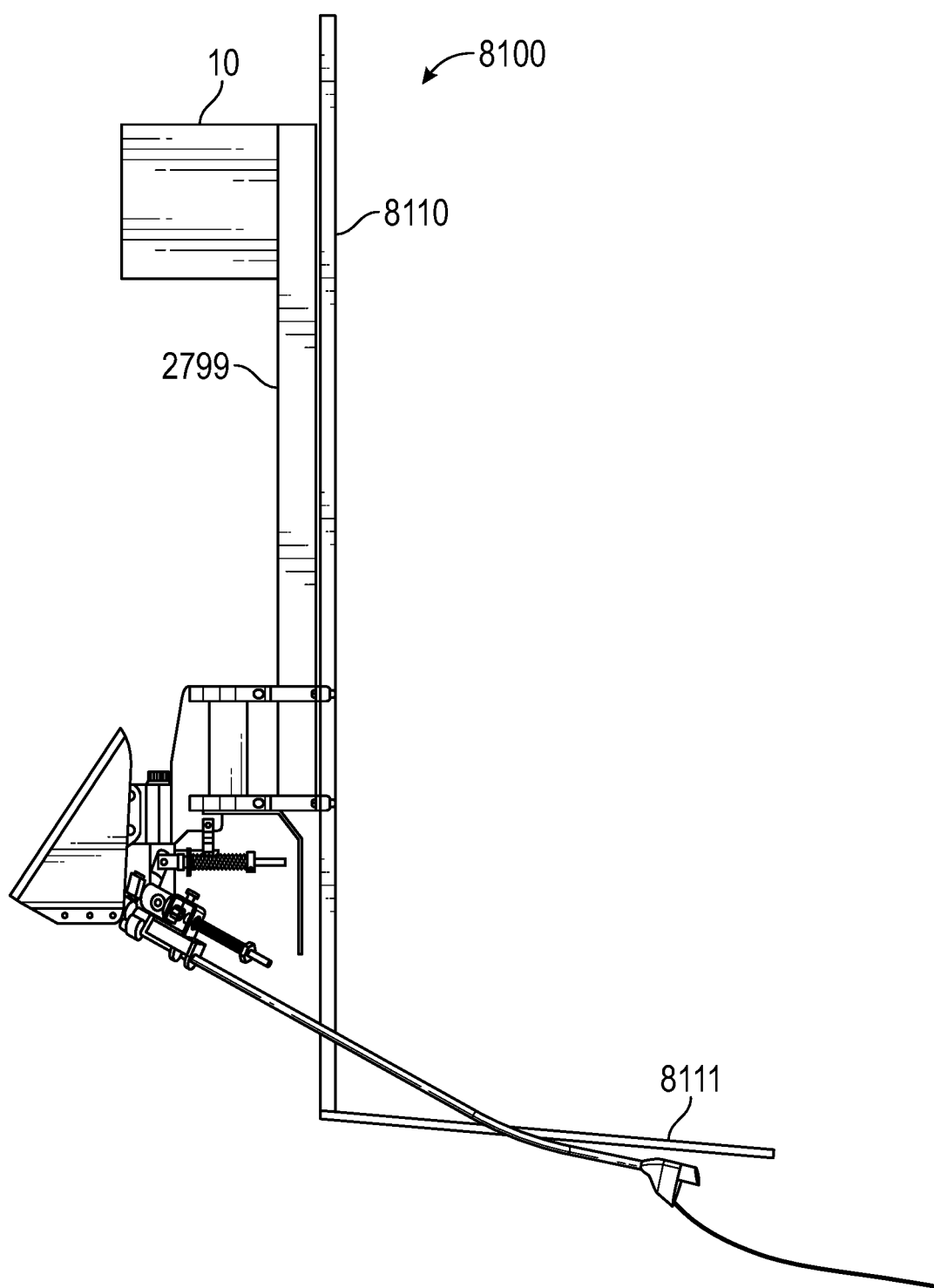
FIG. 31A illustrates a side elevation view of a fluid apparatus disposed on an application unit 2700 from FIG. 27A with the coulter assembly removed according to one embodiment.
Figure 31B:
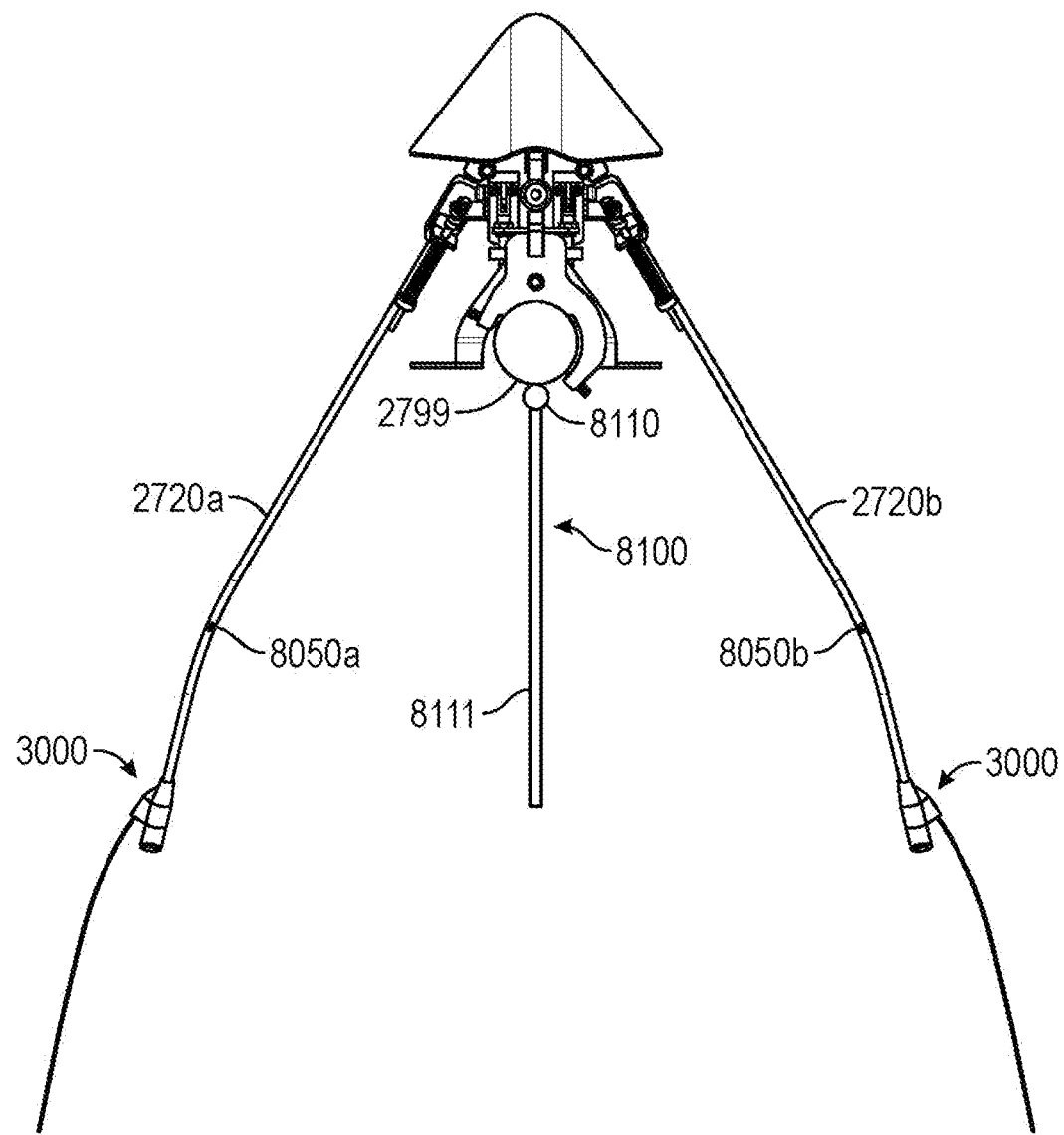
FIG. 31B is a top plan view of the embodiment of FIG. 31A.
Figure 32:
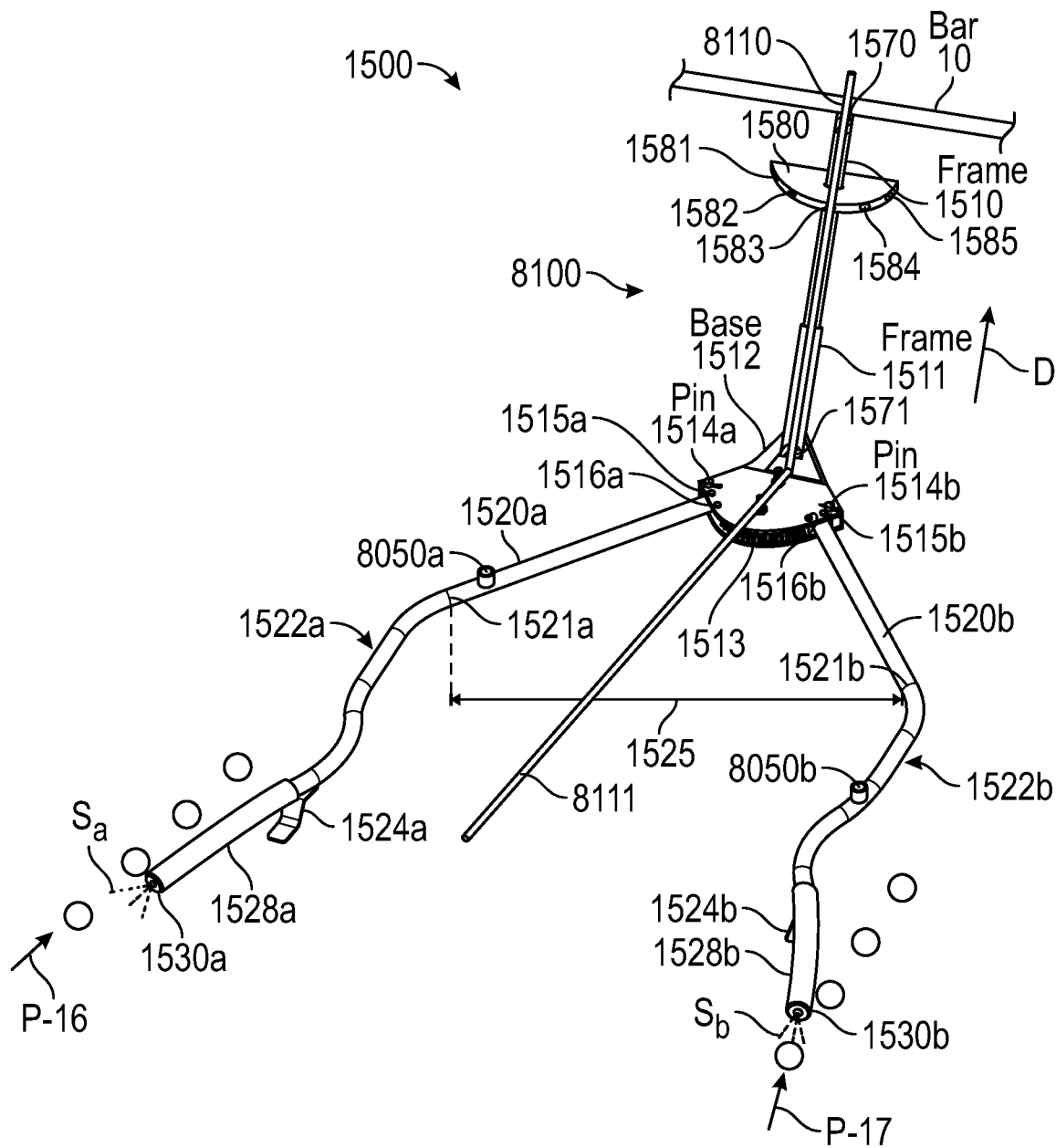
FIG. 32 is a perspective view of a fluid apparatus disposed on an application unit 1500 from FIG. 15A according to one embodiment.
Figure 33:
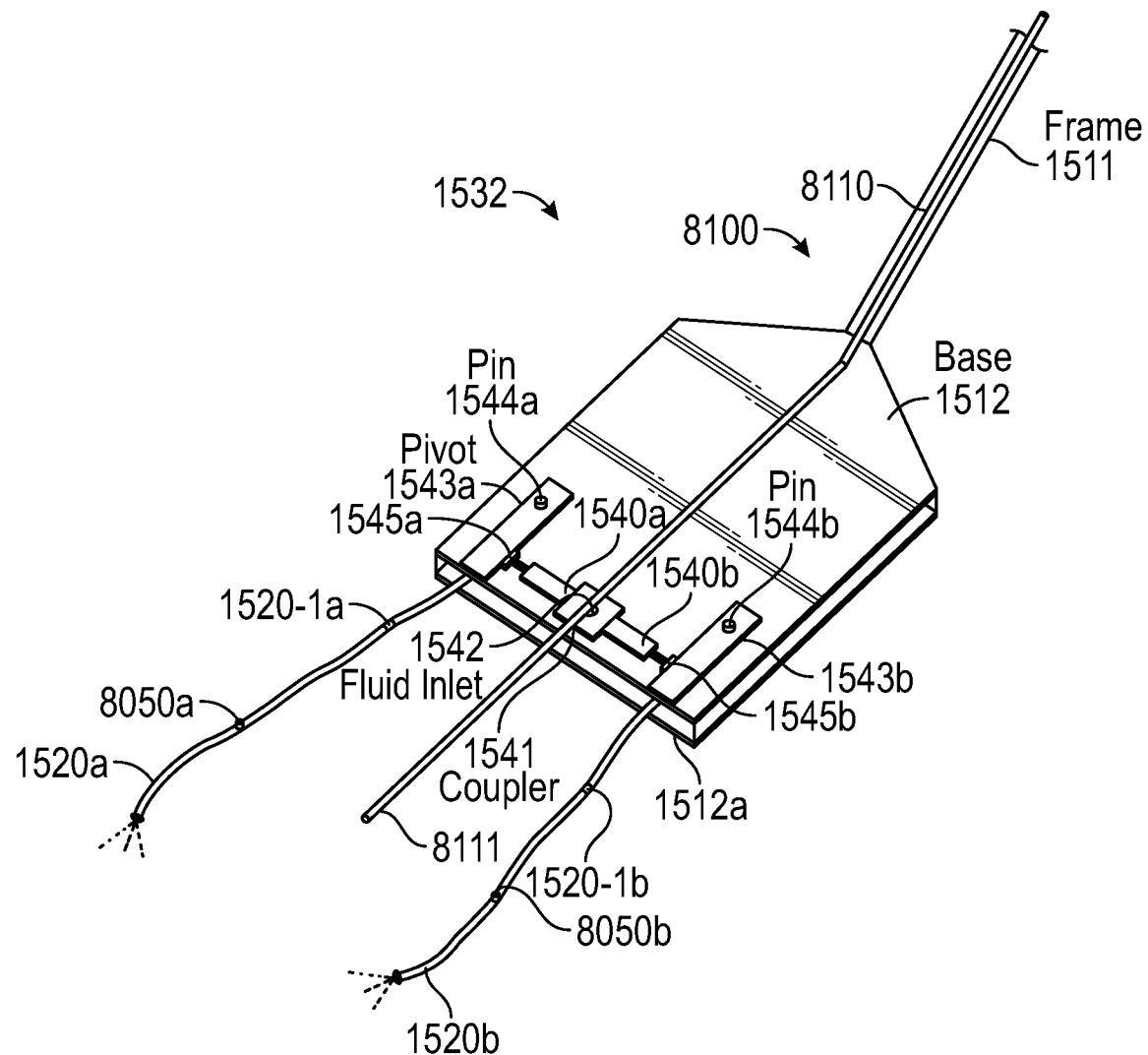
FIG. 33 is a perspective view of a fluid apparatus disposed on an application unit 1532 from FIG. 15B according to one embodiment.
Figure 34:
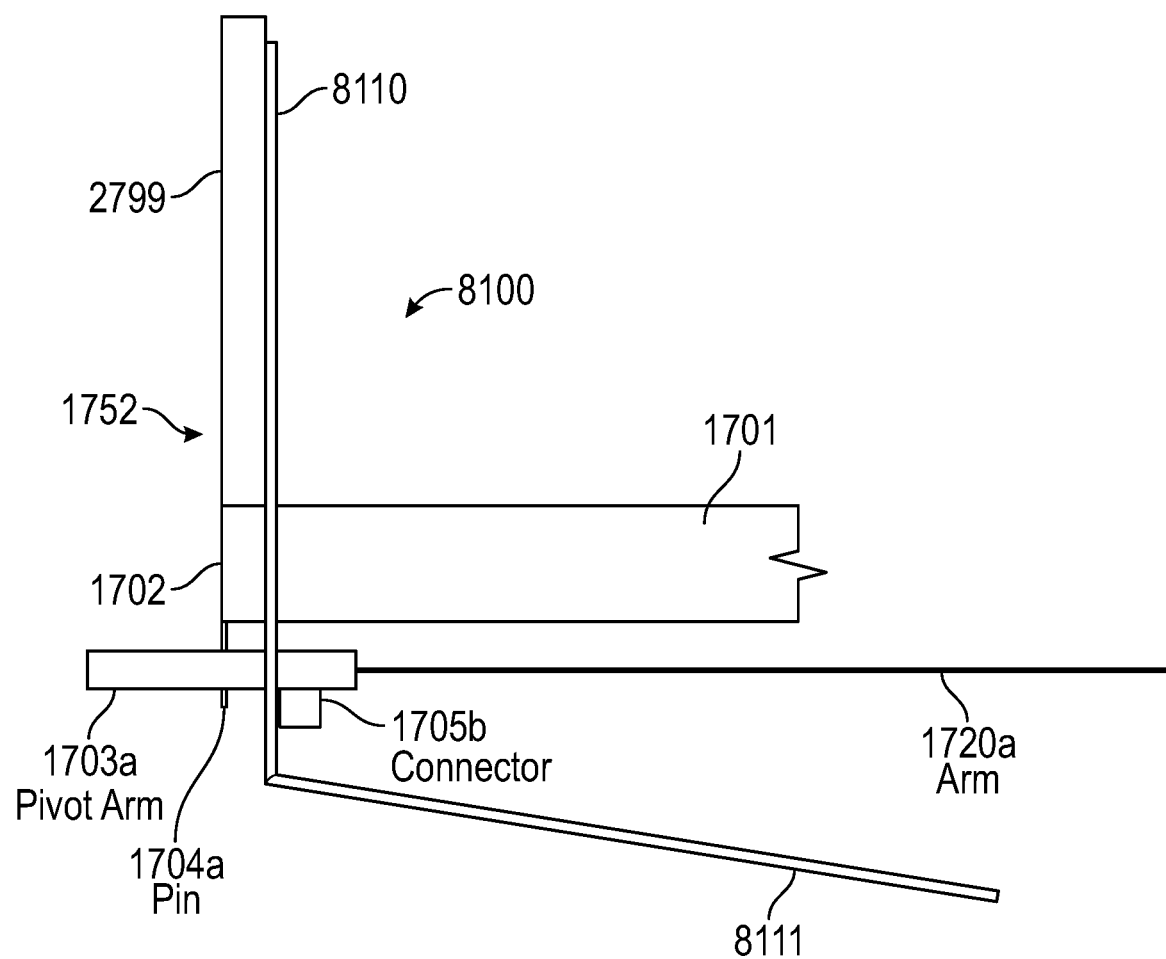
FIG. 34 is a side elevation view of a fluid apparatus disposed on an application unit from FIG. 17C according to one embodiment.
Figure 35:
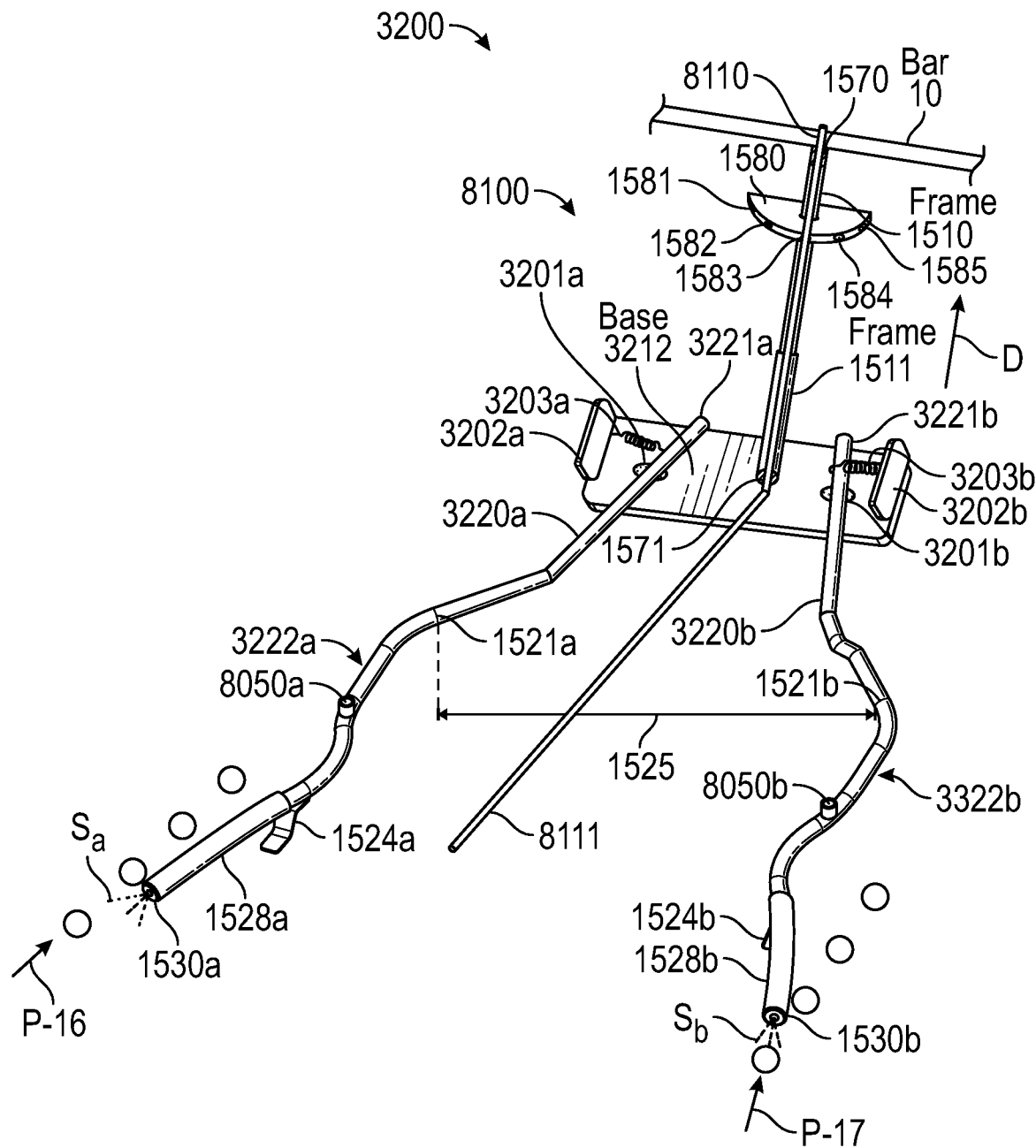
FIG. 35 is a perspective view of a fluid apparatus disposed on an application unit 3200 from FIG. 25 according to one embodiment.

Another embodiment for dispensing to the middle of the row is illustrated in FIGS. 31B, 32, 33, 35, and 36 with nozzle 8050 (8050*a*, 8050*b*). While illustrated with fluid apparatus 8100 in these Figures to reduce the number of drawings, nozzle 8050 can be used independently from fluid apparatus 8100 or in combination with fluid apparatus 8100. Nozzle 8050 is disposed at any point along a member before the outlet. As illustrated, nozzle 8050(8050*a*, 8050*b*) is disposed in fluid arm 2720 (2720*a*, 2720*b*) in FIG. 31B, in linkage member 1520 (1520*a*, 1520*b*) or flexible member 1522 (1522*a*, 1522*b*) in FIG. 32, linkage member 3220 (3220*a*, 3220*b*) in FIG. 33, in arm 1720 (1720*a*, 1720*b*) (not shown in FIG. 34), linkage member 3220 (3220*a*, 3220*b*) or flexible member 3222 (3222*a*, 3222*b*) in FIG. 35, or linkage member 1520 (1520*a*, 1520*b*) or flexible member 1522 (1522*a*, 1522*b*) in FIG. 36. Nozzle 8050 can be disposed on one (a side or b side only) or both (a side and b side) of any of the preceding members. When disposed on both sides, nozzle 8050*a* and nozzle 8050*b* can be disposed at the same distance along a member, or they can be offset from each other. FIG. 31B illustrates nozzles 8050*a* and nozzle 8050*b* being disposed at a same distance along fluid arms 2720*a* and 2720*b*. FIG. 32 illustrates nozzle 8050*a* and nozzle 8050*b* being offset. Nozzle 8050 and any nozzle disposed at an outlet (3000, 8010, 8200, 8300, or 8400) are orificed to divide the flow as selected to the middle of the row and to the rhizosphere.

In any embodiment, the amount of fluid delivered to the middle of the row and the amount of fluid delivered to the rhizosphere can be divided by any selected division. For example, 75% of total fluid can be applied to the middle of the row and 25% of total fluid can be applied to the rhizosphere, which is split equally.

Figure 36:
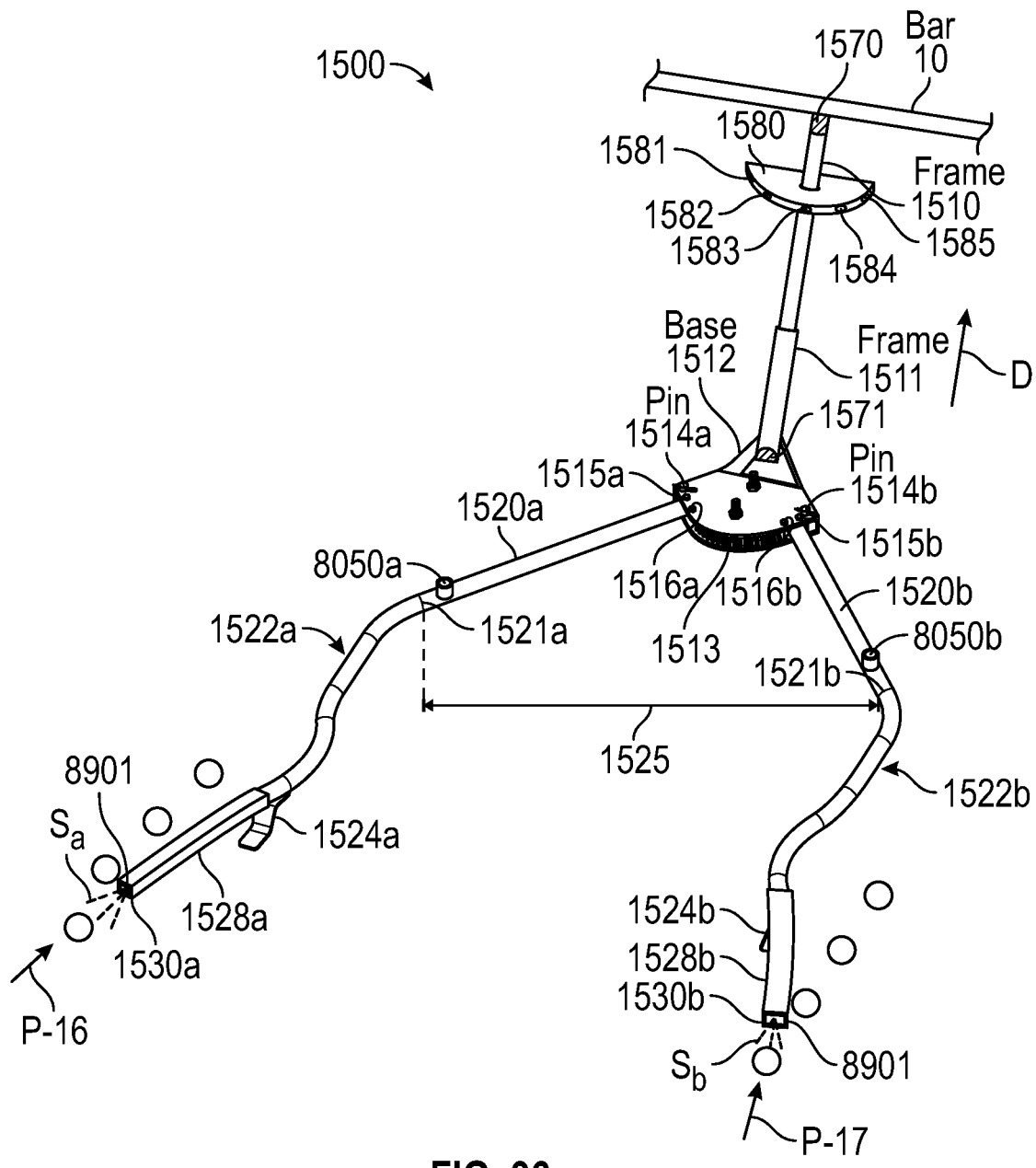
FIG. 36 is a perspective view of a variable orifice valve or check valve disposed at an outlet according to one embodiment.

In another embodiment, any of the fluid outlets (ends of the fluid lines described herein, such as flexible member 922, flexible member 982, flexible member 1022, flexible member 1522, linkage member 1520, or fluid outlets 1530), fluid outlet 8801, or nozzles (3000 or 8010) can further include a variable orifice valve 8901 or a check valve 8902. As a representative illustration, FIG. 36 illustrates a variable orifice valve 8901 disposed at fluid outlet 1530.

In some embodiments, the pressure is controlled at the point of dispensing to prevent burping. Placing variable orifice valve 8901 or check valve 8902 allows pressure to be maintained throughout the entire system until it is dispensed.

Figure 37A:
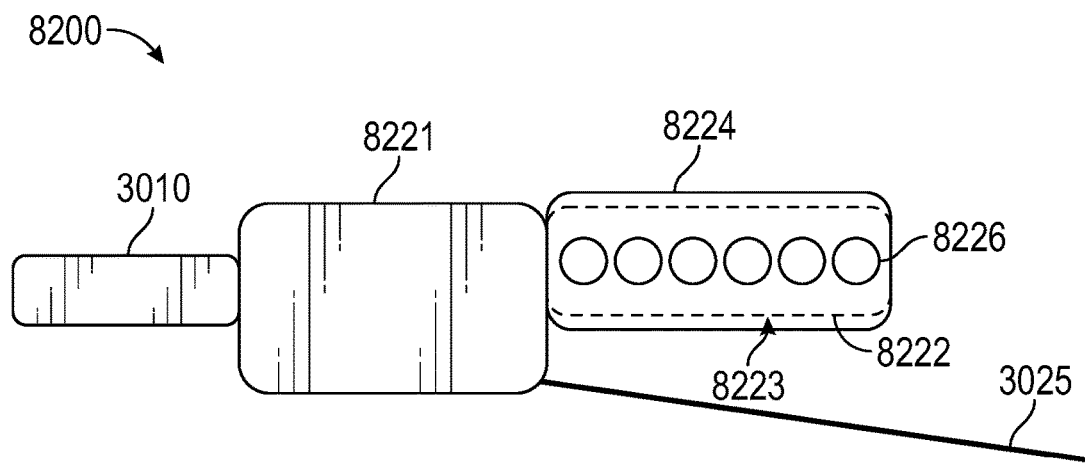
FIG. 37A is a side elevation view of a nozzle according to one embodiment.
Figure 37B:
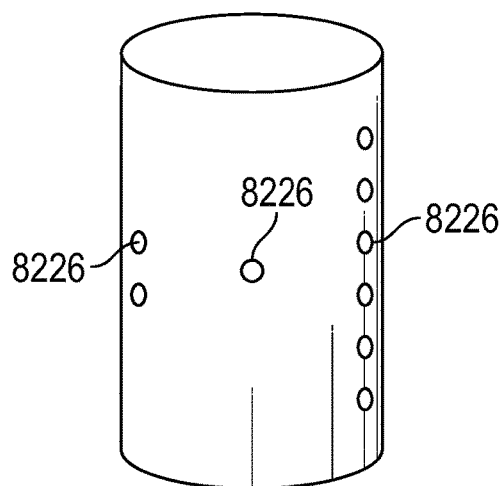
FIG. 37B is a perspective view of the cover from FIG. 37A.
Figure 37C:
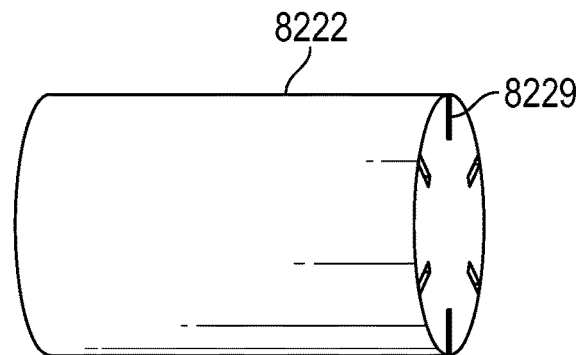
FIG. 37C is a side elevation view of the nozzle from FIG. 37A.
Figure 37D:
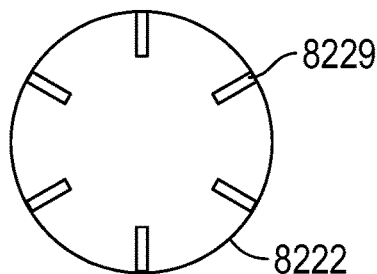
FIG. 37D is an end view of the nozzle from FIG. 37C.
Figure 37E:
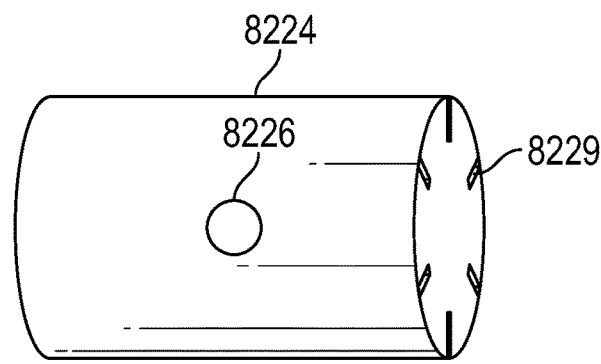
FIG. 37E is a side elevation view of the nozzle from FIG. 37B.
Figure 38A:
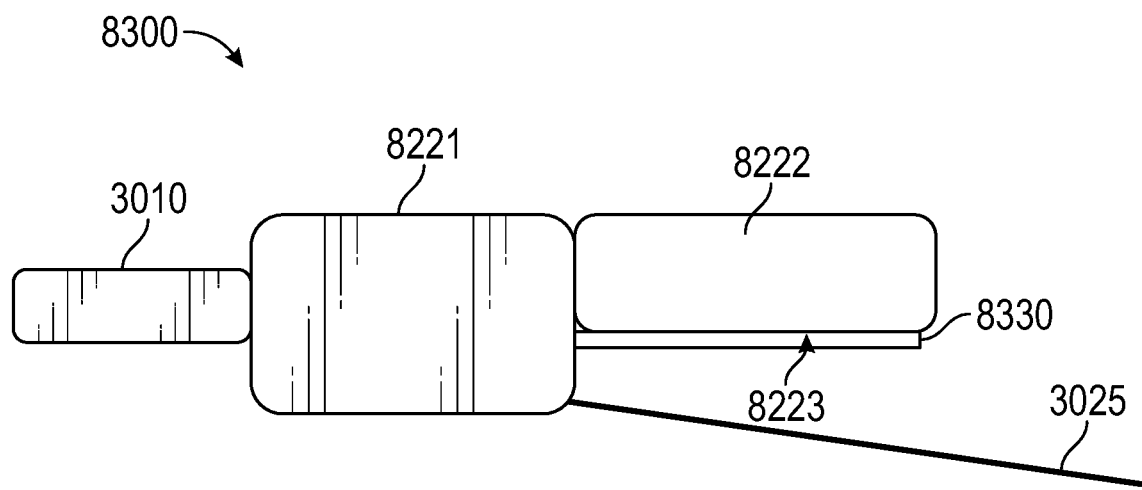
FIG. 38A is a side elevation view of a nozzle according to one embodiment.
Figure 38B:
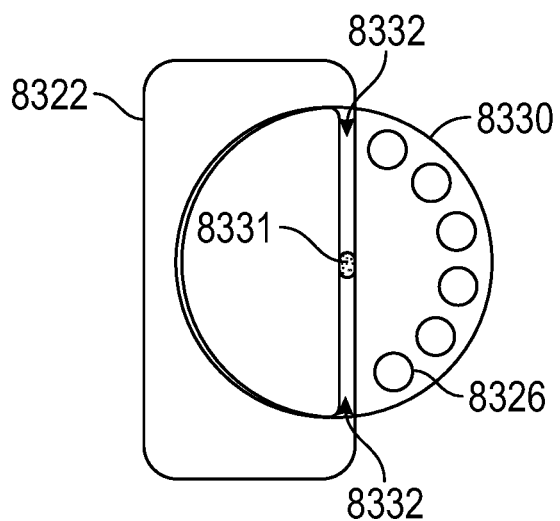
FIG. 38B is a bottom plan view of the nozzle and selector of FIG. 38A.
Figure 38C:
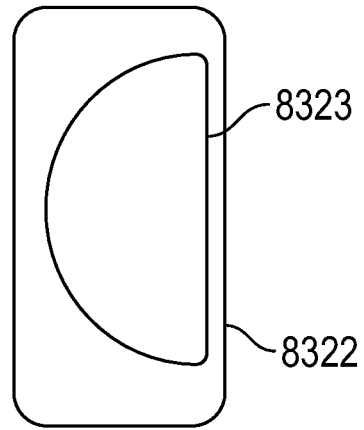
FIG. 38C is a bottom plan view of the nozzle of FIG. 38A.

Other embodiments for nozzles that can restrict flow to maintain pressure are described here. Nozzle 3000 can be modified to have variable fluid output to control backpressure. One embodiment is illustrated in FIGS. 37A-37E. Nozzle 8200 has a nozzle body 8221, nozzle 8222 and outlet 8223. Disposed over nozzle 8222 and rotating about 8222 is cover 8224. Cover 8224 has a plurality of openings 8226 disposed through cover 8224 to provide fluid communication from outlet 8223 to the ground. Openings 8226 are disposed to individually provide a different number of openings 8226 to outlet 8223. As illustrated in FIG. 37B, cover 8224 has six different positions to have from one to six openings providing fluid communication to outlet 8223. While illustrated with six different positions, cover 8224 can have any number from one up to an amount that can be disposed about cover 8224 to provide discrete fluid communication (e.g., not flowing through a position with one opening 8226 and the position with two openings 8226). To hold cover 8224 in place about nozzle 8222, there can be detents 8229 disposed at the interface between nozzle 8222 and cover 8224 as illustrated in FIGS. 37C to 37E. Openings 8226 can be equally sized with respect to each other, or they can have different sizes. The change from one selection of openings 8226 to another selection of openings 8226 can be linear (all are sized the same) or non-linear (different sizes).

Nozzle 8300 modifies nozzle 8200 with nozzle 8322, opening 8323 in nozzle 8322, and selector 8330 having a plurality of openings 8326. Selector 8330 is rotatably connected to nozzle 8322 at connection 8331. Detents 8332 can be disposed between nozzle 8322 and selector 8330 to fix the position of selector 8330 until a new selection is selected. Selector 8330 can be rotated to provide one to a plurality of openings 8326 over opening 8323 to provide fluid communication from opening 8323 to the ground. Openings 8326 can be sized with the same selection as described for openings 8226.

Nozzle 8400 is similar to nozzle 8300 except that openings 8426 are disposed in nozzle 8422 and opening 8423 is disposed in selector 8430. Selector 8430 is rotated to expose openings 8426. Openings 8426 can be sized with the same selection as described for openings 8226.

Figure 40A:
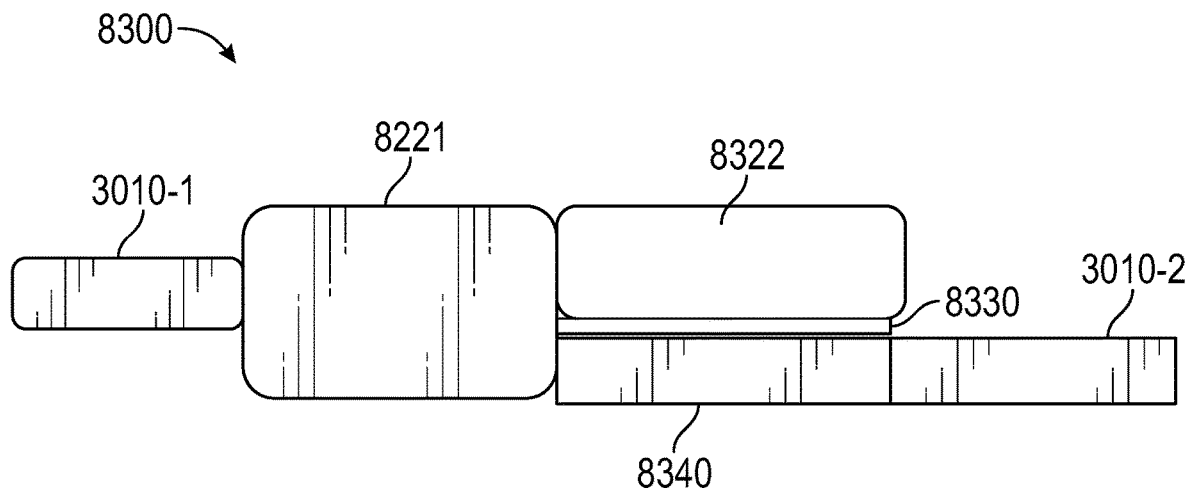
FIG. 40A is a side elevation view of a nozzle disposed in a fluid line according to one embodiment.
Figure 40B:
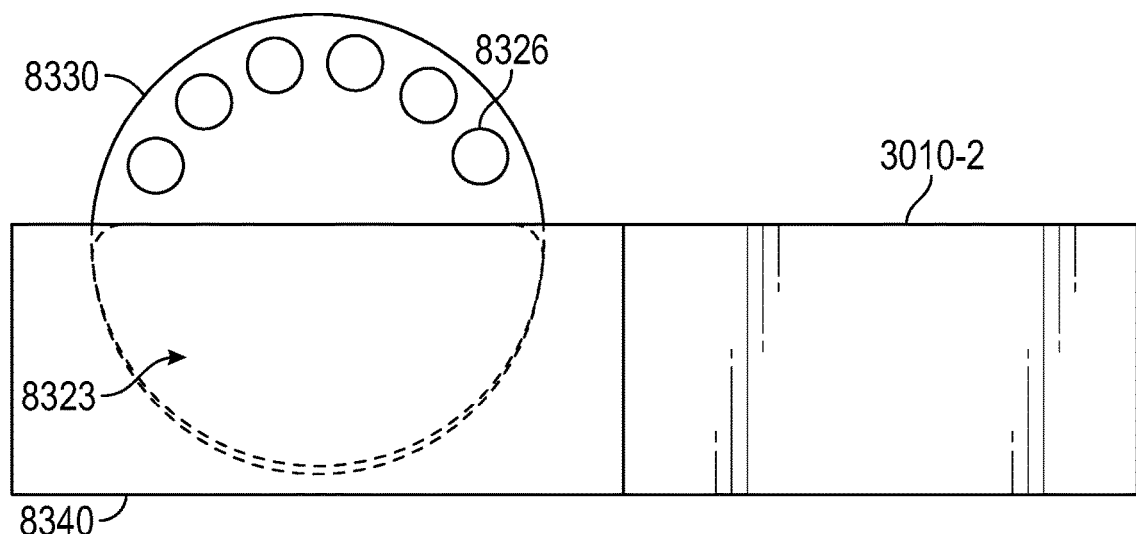
FIG. 40B is a bottom plan view of the nozzle of FIG. 40A.

In another embodiment, the variable orifice nozzles (such as 8200, 8300, or 8400) can be disposed in-line in a fluid line (such as 3010). FIGS. 40A and 40B illustrate nozzle 8300 disposed in fluid line 3010, but nozzle 8400 could also be used. Fluid line 3010 has a first portion 3010-1 delivering fluid to nozzle 8300 and a second portion 3010-2 for fluid flowing out of nozzle 8300. Fluid flowing through selector 8330 enters second portion 3010-2. To create a seal between nozzle 8322 with a connection to second portion 3010-2, nozzle 8300 can further include a connector 8340 to connect nozzle 8322 with second portion 3010-2 and have selector 8330 rotate at an interface between nozzle 8322 and connector 8340. It should be appreciated that the term nozzle has been used in this description to be consistent with the prior description of the nozzle but that when the nozzle is used in-line, the nozzle actually functions as a valve.

Any of the following examples can be combined into a single embodiment or these examples can be separate embodiments. In one example, an application unit comprises a frame to be positioned in operation between first and second rows of plants, a first plant contacting member being pivotally coupled to the frame in operation such that the first plant contacting member to be deflected rearwardly with respect to a direction of motion of the frame upon the first plant contacting member contacting at least one of the plants of the first row of plants which causes a first change in orientation of the first plant contacting member with respect to the frame, and a first outlet for applying a liquid application to the first row of plants with the first outlet being mechanically linked to the first plant contacting member, wherein the first change in orientation causes a corresponding second change in orientation of the first outlet with respect to the frame.

In another example, the application unit further comprises a second plant contacting member being pivotally coupled to the frame in operation such that the second plant contacting member to be deflected rearwardly with respect to the direction of motion of the frame upon the second plant contacting member contacting at least one of the plants of the second row of plants which causes a third change in orientation of the second plant contacting member with respect to the frame and a second outlet for applying a liquid application to the second row of plants with the second outlet being mechanically linked to the second plant contacting member. The third change in orientation causes a corresponding fourth change in orientation of the second outlet with respect to the frame.

In another example, the first plant contacting member is disposed above the first outlet.

In another example the first plant contacting member is disposed below the first outlet.

In another example, the first plant contacting member is connected to the first outlet by a rigid link.

In another example, the first plant contacting member is connected to the first outlet through a gear that raises or lowers the first outlet as the first plant contacting member is deflected rearwardly.

In another example, the application unit further comprises a biasing element to bias the first plant contacting member forward when not contacting a plant, and the gear raises the first outlet.

In another example, the frame further comprises a ground engaging element disposed on the frame and disposed to contact the ground during operation.

In another example, the ground engaging element is a wheel.

In another example, the ground engaging element is a ski.

In another example, the application unit further comprises at least one opening disc connected to the frame for opening a trench.

In another example, the application unit further comprises a fluid conduit for applying fluid to the trench.

In another example, the application unit further comprises at least one trench forming member connected to the frame to open at least one secondary trench.

In another example, the opening disc is disposed to open the trench under the frame, and the at least one trench forming member is disposed to open the second trench between the trench and the row of plants.

In another example, the at least one trench forming member comprises a first trench forming member and a second trench forming member. The first trench forming member forms a first secondary trench between the trench and a row of plants on a first side and the second trench forming member forms a second secondary trench between the trench and a row of plants on a second side.

In another example, the application unit further comprising a first fluid conduit for dispensing fluid into the trench, a second fluid conduit for dispensing fluid into the first secondary trench, and a third fluid conduit for dispensing fluid into the second secondary trench.

In one example, an application unit comprises a frame to be positioned in operation between two rows of plants and a base member coupled to the frame. The base member to be positioned in proximity to a ground surface while in operation and first and second plant guidance members coupled to the base member in operation such that the first and second plant guidance members guide a lateral position of the base member to be approximately equidistant from the two rows of plants based upon whether at least one of the first and second plant guidance members contacts one or more plants of the two rows of plants.

In another example, the application unit further comprises first and second outlets coupled to the base member in operation such that a change in lateral position of the base member causes a corresponding change in position of the first and second outlets for applying a liquid application to the plants.

In another example, the first and second plant guidance members are flexible.

In another example the first and second plant guidance members comprise a first portion extending outwardly and rearwardly toward the rows of plants, a second portion extending parallel to the row of plants, and a third portion extending inwardly and rearwardly away from the rows of plants.

In another example, all base members in the application unit adjust their position between the rows of plants.

In one example, an application unit comprises a frame to be positioned in operation between two rows of plants, a base member coupled to the frame, and at least one linkage member for conveying fluid coupled to a biasing element of the base member in operation such that the biasing element biases an angular position of the at least one linkage member.

In another example, the at least one linkage member comprises a first linkage member and a second linkage member.

In another example, the biasing element biases angular positions of the first and second linkage members such that distal ends of the first and second linkage members have a spacing that is similar to a row spacing of the two rows of plants.

In another example, the application unit further comprises first and second flexible members coupled to the first and second linkage members, respectively. The first and second linkage members to position the first second flexible members in proximity to the two rows of plants for applying a fluid application to the plants.

In one example, an application unit comprises a frame to be positioned in operation between two rows of plants and a first plurality of flexible members coupled to the frame in operation such that the first plurality of flexible members guide a lateral position of the frame to be approximately equidistant from the two rows of plants based upon whether at least one of the first plurality of flexible members contacts one or more plants of the two rows of plants.

In another example, the application unit further comprises a base member coupled to the frame. The base member to be positioned in proximity to a ground surface while in operation and a second plurality of flexible members to guide a lateral position of the base member to be approximately equidistant from the two rows of plants based upon whether at least one of the second plurality of flexible members contacts one or more plants of the two rows of plants.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A fluid applicator for applying fluid to plants in rows having a row between a first row of plants and a second row of plants that is directly adjacent to the first row of plants in a field comprising:
    a vertical support or a frame to be positioned during an operation between the first row of plants and the second row of plants;
    at least one applicator arm having a fluid line disposed along a length of the at least one applicator arm, the at least one applicator arm connected to the vertical support or the frame;
    a first nozzle disposed on the at least one applicator arm to apply fluid to a rhizosphere of the first row of plants during the operation; and
    a second nozzle disposed on the at least one applicator arm to apply fluid towards a middle of the row between the first row of plants and the second row of plants.

2. The fluid applicator of claim 1, wherein the second nozzle is disposed on the at least one applicator arm to spray the fluid towards the middle of the row between the first row of plants and the second row of plants, and the first nozzle is disposed at a discharge end of the at least one applicator arm to spray the fluid to the rhizosphere of the plants.

3. The fluid applicator of claim 1, wherein the second nozzle is disposed on the applicator arm, and the first nozzle is disposed at a discharge end of the applicator arm.

4. The fluid applicator of claim 1, wherein the first nozzle is orificed to deliver a first selected amount of fluid to the rhizosphere of the plants, and the second nozzle is orificed to deliver a second selected amount of fluid to the row between the plants.

5. The fluid applicator of claim 4, wherein the second selected amount of fluid is greater than the first selected amount of fluid.

6. The fluid applicator of claim 1, wherein the plants in rows comprises the first row of plants and the second row of plants, wherein the at least one applicator arm comprises a first applicator arm for delivering fluid to the rhizosphere of the first row of plants and a second applicator arm for delivering fluid to the rhizosphere of the second row of plants.

7. The implement of claim 1, wherein the at least one applicator arm is actuated by an actuator to move the applicator arm from a position in the row between the first row of plants and the second row of plants to a position adjacent to the first row of plants to apply the fluid with the first nozzle to the rhizosphere.

8. The implement of claim 7, wherein the at least one applicator arm comprises a first applicator arm actuated by a first actuator and a second applicator arm actuated by a second actuator.

9. The implement of claim 7, wherein the at least one applicator arm comprises a first applicator arm and a second applicator arm, both the first applicator arm and the second applicator arm are actuated by the actuator, wherein the actuator is connected to a gear box, and the first applicator arm and the second applicator arm are connected to the gear box and actuate synchronously with each other.

10. The implement of claim 7, wherein the at least one applicator arm is connected to a pivot arm disposed about a pivot, the actuator actuates the pivot arm to pivot about the pivot, wherein the pivot is disposed on a frame or a base.

11. The implement of claim 7, wherein the at least one applicator arm comprises
  a first applicator arm connected to a first pivot arm disposed about a first pivot,
  a second applicator arm connected to a second pivot arm disposed about a second pivot,
  a first actuator for actuating the first pivot arm to pivot about the first pivot, and
  a second actuator for actuating the second pivot arm to pivot about the second pivot,
  wherein the first pivot and the second pivot are disposed on a frame or a base.

12. The implement of claim 7, wherein the actuator is a fluid actuator, wherein the fluid actuator includes a fluid inlet connected to a fluid source, the fluid actuator includes a piston actuating a piston arm, the piston arm connected to a pivot arm, a bias biasing the piston in an opposite direction to the fluid, such that when fluid is flowing to the applicator arm, fluid is flowing into the fluid actuator to bias the applicator arm towards the plants.

13. The implement of claim 7, wherein the actuator is a solenoid.

14. The implement of claim 7, wherein the actuator is an electric motor.

15. The application unit of claim 7, further comprising:
  a gear box connected to the actuator.

16. The fluid applicator of claim 15, wherein the at least one applicator arm is connected to the gear box and the actuator.

17. The fluid applicator of claim 16, wherein the actuator is a solenoid.

18. The fluid applicator of claim 16, wherein the actuator is an electric motor.

19. The fluid applicator of claim 16, further comprising:
  a ground contacting arm that is connected to the actuator, and the actuator is actuated when the ground contacting arm contacts ground.

20. The implement of claim 1, wherein the at least one applicator arm has a storage position for transport that is at least one of above ground and in a middle of the row.

21. The fluid applicator of claim 1, wherein the second nozzle is disposed on the at least one applicator arm to apply fluid only to the middle of the row between the first row of plants and the second row of plants.

22. The fluid applicator of claim 1, wherein the first nozzle and the second nozzle are both disposed on a combination nozzle having a first outlet and a second outlet, and the combination nozzle is disposed at an outlet of the applicator arm.

23. The fluid applicator of claim 22, wherein the at least one applicator arm is disposed directly adjacent to the rhizosphere, and the second nozzle is disposed on a bottom of the combination nozzle, and the first nozzle is disposed on a side of the combination nozzle.

24. The fluid applicator of claim 22, wherein the at least one applicator arm is disposed in a position between the first row of plants and second row of plants, the second nozzle is disposed on a first side of the combination nozzle, and the first nozzle is disposed on a second side of the combination nozzle opposite the first side.

* * * * *